US010887585B2

(12) United States Patent
Sugio et al.

(10) Patent No.: US 10,887,585 B2
(45) Date of Patent: Jan. 5, 2021

(54) IMAGE DECODING METHOD, IMAGE CODING METHOD, IMAGE DECODING APPARATUS, IMAGE CODING APPARATUS, AND IMAGE CODING AND DECODING APPARATUS

(71) Applicant: Panasonic Intellectual Property Corporation of America, Torrance, CA (US)

(72) Inventors: Toshiyasu Sugio, Osaka (JP); Takahiro Nishi, Nara (JP); Youji Shibahara, Tokyo (JP); Kyoko Tanikawa, Osaka (JP); Hisao Sasai, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 14/725,180

(22) Filed: May 29, 2015

(65) Prior Publication Data
US 2015/0271489 A1   Sep. 24, 2015

Related U.S. Application Data

(62) Division of application No. 13/536,309, filed on Jun. 28, 2012.
(Continued)

(51) Int. Cl.
*H04N 19/105* (2014.01)
*H04N 19/147* (2014.01)
(Continued)

(52) U.S. Cl.
CPC ......... *H04N 19/105* (2014.11); *H04N 19/147* (2014.11); *H04N 19/176* (2014.11);
(Continued)

(58) Field of Classification Search
CPC .... H04N 19/52; H04N 19/513; H04N 19/593; H04N 19/503; H04N 19/159; H04N 19/105
(Continued)

(56) References Cited

U.S. PATENT DOCUMENTS

| 5,905,535 A | 5/1999 | Kerdranvat |
| 5,995,080 A | 11/1999 | Biro et al. |

(Continued)

FOREIGN PATENT DOCUMENTS

| CN | 1525762 | 9/2004 |
| CN | 1537390 | 10/2004 |

(Continued)

OTHER PUBLICATIONS

Li et al., "On Merge Candidate Construction," JCTVC-E146, Joint Collaborative Team on Video Coding (JCT-VC) of ITU-T, G16 WP3 and ISO/IEC JTC1/SC29/WG11, Geneva, Switzerland, Mar. 16-23, 2011, pp. 1-5.*

(Continued)

*Primary Examiner* — Daniel Chang
(74) *Attorney, Agent, or Firm* — Wenderoth, Lind & Ponack, L.L.P.

(57) ABSTRACT

An image decoding method for decoding, on a block-by-block basis, image data included in a coded bitstream includes: obtaining a fixed number of merging candidates each of which is a candidate set of a prediction direction, a motion vector, and a reference picture index which are to be referenced in decoding of a current block (S303); and obtaining, from the coded bitstream, an index for identifying a merging candidate for the current block (S304), wherein the fixed number of merging candidates include: one or more first candidates each derived based on a prediction direction, a motion vector, and a reference picture index which have
(Continued)

been used for decoding a neighboring block spatially or temporally neighboring the current block; and one or more second candidates having a predetermined fixed. The fixed number is greater than or equal to two.

2 Claims, 47 Drawing Sheets

Related U.S. Application Data

(60) Provisional application No. 61/503,074, filed on Jun. 30, 2011.

(51) Int. Cl.
*H04N 19/176* (2014.01)
*H04N 19/52* (2014.01)
*H04N 19/96* (2014.01)
*H04N 19/70* (2014.01)
*H04N 19/573* (2014.01)

(52) U.S. Cl.
CPC ............ *H04N 19/52* (2014.11); *H04N 19/573* (2014.11); *H04N 19/70* (2014.11); *H04N 19/96* (2014.11)

(58) Field of Classification Search
USPC ........... 375/240.16, E7.027, E7.123, E7.124, 375/E7.125, E7.164, E7.243, E7.256, 375/240.15
See application file for complete search history.

(56) References Cited

U.S. PATENT DOCUMENTS

| | | | |
|---|---|---|---|
| 6,148,026 A * | 11/2000 | Puri | H04N 19/29 |
| | | | 375/240 |
| 6,192,080 B1 | 2/2001 | Sun et al. | |
| 6,192,148 B1 | 2/2001 | Lin | |
| 6,424,676 B1 | 7/2002 | Kono et al. | |
| 6,427,027 B1 | 7/2002 | Suzuki et al. | |
| 6,594,313 B1 | 7/2003 | Hazra et al. | |
| 6,795,499 B1 | 9/2004 | Kato et al. | |
| 6,842,483 B1 | 1/2005 | Au et al. | |
| 7,154,952 B2 | 12/2006 | Tourapis et al. | |
| 7,266,147 B2 | 9/2007 | Deshpande | |
| 7,301,482 B1 | 11/2007 | Oberg | |
| 7,372,905 B2 | 5/2008 | Foo et al. | |
| 7,394,851 B2 | 7/2008 | Kato et al. | |
| 7,660,354 B2 | 2/2010 | Shi et al. | |
| 7,664,180 B2 | 2/2010 | Kondo et al. | |
| 7,680,186 B2 | 3/2010 | Lee et al. | |
| 7,697,783 B2 | 4/2010 | Lee et al. | |
| 7,702,168 B2 | 4/2010 | Thoreau et al. | |
| 7,742,526 B2 | 6/2010 | Kondo et al. | |
| 7,746,929 B2 | 6/2010 | Valente | |
| 7,801,219 B2 | 9/2010 | Kondo et al. | |
| 7,835,436 B2 | 11/2010 | Aridome et al. | |
| 7,852,936 B2 | 12/2010 | Mukerjee et al. | |
| 7,856,060 B2 | 12/2010 | Kondo et al. | |
| 7,940,845 B2 | 5/2011 | Kondo et al. | |
| 8,005,144 B2 | 8/2011 | Ji et al. | |
| RE43,062 E | 1/2012 | Deshpande | |
| 8,175,444 B2 | 5/2012 | Kang et al. | |
| 8,180,201 B2 | 5/2012 | Kang et al. | |
| 8,190,003 B2 | 5/2012 | Kang et al. | |
| 8,208,541 B2 | 6/2012 | Iguchi et al. | |
| 8,208,544 B2 | 6/2012 | Song et al. | |
| 8,238,433 B2 * | 8/2012 | Maciel De Faria | ......................... |
| | | | H04N 19/577 |
| | | | 375/240.17 |
| 8,249,147 B2 | 8/2012 | Watanabe et al. | |
| 8,275,235 B2 | 9/2012 | Kang et al. | |
| 8,325,819 B2 | 12/2012 | Karczewicz | |
| 8,355,438 B2 | 1/2013 | Shimizu et al. | |
| 8,374,245 B2 | 2/2013 | Tourapis et al. | |
| 8,379,722 B2 | 2/2013 | Tourapis et al. | |
| 8,396,344 B2 | 3/2013 | Kang et al. | |
| 8,538,248 B2 | 9/2013 | Kang et al. | |
| 8,542,977 B2 | 9/2013 | Kang et al. | |
| 8,565,314 B2 | 10/2013 | Karczewicz et al. | |
| 8,599,926 B2 | 12/2013 | Karczewicz | |
| 8,670,486 B2 | 3/2014 | Hannuksela | |
| 8,675,735 B2 | 3/2014 | Shimizu et al. | |
| 8,718,141 B2 | 5/2014 | Kondo et al. | |
| 8,761,258 B2 | 6/2014 | Au et al. | |
| 8,774,280 B2 | 7/2014 | Tourapis et al. | |
| 8,873,630 B2 | 10/2014 | Tourapis et al. | |
| 9,185,427 B2 | 11/2015 | Tourapis et al. | |
| RE45,983 E | 4/2016 | Deshpande | |
| 9,319,700 B2 | 4/2016 | Karczewicz | |
| 2003/0202605 A1 | 10/2003 | Hazra et al. | |
| 2004/0001546 A1 | 1/2004 | Tourapis et al. | |
| 2004/0008786 A1 | 1/2004 | Boyce | |
| 2004/0028134 A1 | 2/2004 | Subramaniyan et al. | |
| 2004/0047418 A1 | 3/2004 | Tourapis et al. | |
| 2004/0052507 A1 | 3/2004 | Kondo et al. | |
| 2004/0086044 A1 | 5/2004 | Kondo et al. | |
| 2004/0136461 A1 | 7/2004 | Kondo et al. | |
| 2004/0146109 A1 | 7/2004 | Kondo et al. | |
| 2004/0179620 A1 | 9/2004 | Foo et al. | |
| 2004/0190606 A1 | 9/2004 | Deshpande | |
| 2004/0223551 A1 | 11/2004 | Hannuksela | |
| 2004/0234143 A1 | 11/2004 | Hagai et al. | |
| 2004/0264566 A1 | 12/2004 | Kato et al. | |
| 2005/0013497 A1 | 1/2005 | Hsu et al. | |
| 2005/0025244 A1 | 2/2005 | Lee et al. | |
| 2005/0062885 A1 | 3/2005 | Kadono et al. | |
| 2005/0078683 A1 | 4/2005 | Page | |
| 2005/0141612 A1 | 6/2005 | Abe et al. | |
| 2005/0152452 A1 | 7/2005 | Suzuki | |
| 2005/0152682 A1 | 7/2005 | Kang et al. | |
| 2005/0185928 A1 | 8/2005 | Kang et al. | |
| 2005/0213828 A1 | 9/2005 | Thoreau et al. | |
| 2005/0243927 A1 | 11/2005 | Hubrich et al. | |
| 2005/0243928 A1 * | 11/2005 | Hubrich | ............... H04N 7/014 |
| | | | 375/240.16 |
| 2006/0023788 A1 | 2/2006 | Otsuka et al. | |
| 2006/0023790 A1 | 2/2006 | Tsai et al. | |
| 2006/0050778 A1 | 3/2006 | Aridome et al. | |
| 2006/0088094 A1 | 4/2006 | Cieplinski et al. | |
| 2006/0088286 A1 | 4/2006 | Shibata et al. | |
| 2006/0165175 A1 | 7/2006 | Yin | |
| 2006/0182436 A1 | 8/2006 | Tabuchi et al. | |
| 2006/0204228 A1 | 9/2006 | Kang et al. | |
| 2006/0209963 A1 | 9/2006 | Valente | |
| 2006/0215999 A1 | 9/2006 | Kang et al. | |
| 2006/0216000 A1 | 9/2006 | Kang et al. | |
| 2006/0233530 A1 | 10/2006 | Kang et al. | |
| 2006/0239358 A1 | 10/2006 | Soh et al. | |
| 2006/0269153 A1 | 11/2006 | Shi et al. | |
| 2006/0280253 A1 | 12/2006 | Tourapis et al. | |
| 2006/0291556 A1 | 12/2006 | Watanabe et al. | |
| 2007/0014358 A1 | 1/2007 | Tourapis et al. | |
| 2007/0014360 A1 | 1/2007 | Botzko et al. | |
| 2007/0025444 A1 | 2/2007 | Okada et al. | |
| 2007/0025621 A1 | 2/2007 | Lee et al. | |
| 2007/0030899 A1 | 2/2007 | Iguchi et al. | |
| 2007/0041452 A1 | 2/2007 | Kondo et al. | |
| 2007/0110156 A1 | 5/2007 | Ji et al. | |
| 2007/0154103 A1 | 7/2007 | Au et al. | |
| 2007/0183499 A1 | 8/2007 | Kimata et al. | |
| 2007/0200949 A1 | 8/2007 | Walker | |
| 2007/0286286 A1 * | 12/2007 | Heng | ..................... H04N 19/61 |
| | | | 375/240.16 |
| 2008/0063060 A1 | 3/2008 | Kondo et al. | |
| 2008/0063061 A1 | 3/2008 | Kondo et al. | |
| 2008/0063075 A1 | 3/2008 | Kondo et al. | |
| 2008/0069231 A1 | 3/2008 | Kondo et al. | |
| 2008/0069232 A1 | 3/2008 | Kondo et al. | |
| 2008/0084927 A1 | 4/2008 | Rosenzweig et al. | |
| 2008/0089420 A1 | 4/2008 | Karczewicz | |
| 2008/0089422 A1 | 4/2008 | Karczewicz | |

(56) References Cited

U.S. PATENT DOCUMENTS

| | | |
|---|---|---|
| 2008/0089423 A1 | 4/2008 | Karczewicz |
| 2008/0089424 A1 | 4/2008 | Karczewicz et al. |
| 2008/0117978 A1 | 5/2008 | Kapasi et al. |
| 2008/0175491 A1 | 7/2008 | Kondo |
| 2008/0219350 A1 | 9/2008 | Guo et al. |
| 2008/0240245 A1 | 10/2008 | Lee et al. |
| 2009/0067505 A1* | 3/2009 | Tourapis ............ H04N 19/573 375/240.16 |
| 2009/0074069 A1 | 3/2009 | Jeon |
| 2009/0147855 A1 | 6/2009 | Song et al. |
| 2009/0304084 A1 | 12/2009 | Hallapuro et al. |
| 2010/0086053 A1 | 4/2010 | Okada et al. |
| 2010/0118939 A1 | 5/2010 | Shimizu et al. |
| 2010/0124273 A1 | 5/2010 | Divorra Escoda et al. |
| 2010/0135387 A1 | 6/2010 | Divorra Escoda et al. |
| 2010/0177824 A1 | 7/2010 | Koo et al. |
| 2010/0284465 A1 | 11/2010 | Benzler et al. |
| 2011/0038420 A1 | 2/2011 | Lee et al. |
| 2011/0080954 A1 | 4/2011 | Bossen et al. |
| 2011/0090969 A1 | 4/2011 | Sung et al. |
| 2011/0113451 A1 | 5/2011 | Kang et al. |
| 2011/0176612 A1 | 7/2011 | Tsai et al. |
| 2011/0194608 A1 | 8/2011 | Rusert et al. |
| 2011/0194609 A1 | 8/2011 | Rusert et al. |
| 2011/0206123 A1 | 8/2011 | Panchal et al. |
| 2011/0261882 A1 | 10/2011 | Zheng et al. |
| 2011/0286527 A1 | 11/2011 | Kadono et al. |
| 2012/0008688 A1 | 1/2012 | Tsai et al. |
| 2012/0106645 A1 | 5/2012 | Lin et al. |
| 2012/0128060 A1 | 5/2012 | Lin et al. |
| 2012/0128071 A1 | 5/2012 | Celetto et al. |
| 2012/0128072 A1 | 5/2012 | Kobayashi et al. |
| 2012/0134415 A1* | 5/2012 | Lin ................. H04N 19/52 375/240.16 |
| 2012/0163466 A1 | 6/2012 | Sugio et al. |
| 2012/0195368 A1 | 8/2012 | Chien et al. |
| 2012/0207221 A1 | 8/2012 | Aono et al. |
| 2012/0230408 A1* | 9/2012 | Zhou ................ H04N 19/105 375/240.15 |
| 2012/0236942 A1 | 9/2012 | Lin et al. |
| 2012/0243609 A1 | 9/2012 | Zheng et al. |
| 2012/0257678 A1 | 10/2012 | Zhou et al. |
| 2012/0263235 A1 | 10/2012 | Sugio et al. |
| 2012/0275522 A1 | 11/2012 | Kim et al. |
| 2012/0281763 A1 | 11/2012 | Suzuki |
| 2012/0300846 A1 | 11/2012 | Sugio et al. |
| 2012/0307902 A1 | 12/2012 | Sugio et al. |
| 2012/0307903 A1 | 12/2012 | Sugio et al. |
| 2012/0307905 A1 | 12/2012 | Kim et al. |
| 2012/0320969 A1 | 12/2012 | Zheng et al. |
| 2012/0320984 A1 | 12/2012 | Zhou |
| 2012/0328021 A1 | 12/2012 | Sugio et al. |
| 2013/0003843 A1 | 1/2013 | Guo et al. |
| 2013/0010869 A1 | 1/2013 | Sugio et al. |
| 2013/0023801 A1 | 1/2013 | Wang et al. |
| 2013/0034161 A1 | 2/2013 | Sugio et al. |
| 2013/0101038 A1 | 4/2013 | Shimizu et al. |
| 2013/0107959 A1 | 5/2013 | Park et al. |
| 2013/0148737 A1 | 6/2013 | Tourapis et al. |
| 2013/0156335 A1 | 6/2013 | Lim et al. |
| 2013/0208798 A1 | 8/2013 | Tourapis et al. |
| 2013/0272404 A1 | 10/2013 | Park et al. |
| 2014/0037003 A1 | 2/2014 | Kadono et al. |
| 2014/0037009 A1 | 2/2014 | Kadono et al. |
| 2014/0105302 A1 | 4/2014 | Takehara et al. |
| 2014/0140408 A1 | 5/2014 | Lee et al. |
| 2014/0190606 A1 | 7/2014 | Takemoto |
| 2014/0241434 A1 | 8/2014 | Lin et al. |
| 2014/0301472 A1 | 10/2014 | Kadono et al. |
| 2015/0016527 A1 | 1/2015 | Tourapis et al. |
| 2015/0131725 A1 | 5/2015 | Sugio et al. |
| 2015/0288968 A1 | 10/2015 | Kadono et al. |
| 2015/0312585 A1 | 10/2015 | Kadono et al. |
| 2015/0382013 A1 | 12/2015 | Lim et al. |
| 2016/0088311 A1 | 3/2016 | Kadono et al. |
| 2016/0094857 A1 | 3/2016 | Kadono et al. |
| 2016/0094858 A1 | 3/2016 | Kadono et al. |
| 2016/0134890 A1 | 5/2016 | Tourapis et al. |
| 2016/0269741 A1 | 9/2016 | Kim et al. |
| 2017/0019681 A1 | 1/2017 | Park et al. |
| 2017/0105021 A1 | 4/2017 | Lim et al. |
| 2019/0007697 A1 | 1/2019 | Lim et al. |

FOREIGN PATENT DOCUMENTS

| | | |
|---|---|---|
| CN | 1578469 | 2/2005 |
| CN | 1833259 | 9/2006 |
| CN | 101090491 | 12/2007 |
| CN | 101198064 | 6/2008 |
| CN | 101379816 | 3/2009 |
| CN | 101600114 | 12/2009 |
| CN | 101860754 | 10/2010 |
| CN | 102439978 | 5/2012 |
| EP | 0 314 018 | 5/1989 |
| EP | 1 414 245 | 4/2004 |
| EP | 1 521 477 | 4/2005 |
| EP | 1 906 676 | 4/2008 |
| EP | 1 980 112 | 10/2008 |
| EP | 2 250 816 | 11/2010 |
| EP | 2 448 266 | 5/2012 |
| EP | 2 717 573 | 4/2014 |
| JP | 08-251601 | 9/1996 |
| JP | 10-224800 | 8/1998 |
| JP | 2002-152750 | 5/2002 |
| JP | 2002-534014 | 10/2002 |
| JP | 2005-136979 | 5/2005 |
| JP | 2005-318576 | 11/2005 |
| JP | 2006-519517 | 8/2006 |
| JP | 2007-028617 | 2/2007 |
| JP | 2007-67796 | 3/2007 |
| JP | 2007-142637 | 6/2007 |
| JP | 2008-11455 | 1/2008 |
| JP | 2008-211697 | 9/2008 |
| JP | 2008-283490 | 11/2008 |
| JP | 2009-124748 | 6/2009 |
| JP | 2010-529811 | 8/2010 |
| JP | 2013-517853 | 5/2013 |
| JP | 2013-543286 | 11/2013 |
| JP | 2014-514814 | 6/2014 |
| KR | 10-2007-0120416 | 12/2007 |
| KR | 10-2008-0088040 | 10/2008 |
| KR | 1020090058954 | 6/2009 |
| KR | 10-2011-0045908 | 5/2011 |
| RU | 2 310 231 | 11/2007 |
| RU | 2 381 630 | 2/2010 |
| RU | 2 387 093 | 4/2010 |
| RU | 2009114363 | 10/2010 |
| RU | 2 419 244 | 5/2011 |
| TW | 545058 | 8/2003 |
| TW | 200604847 | 2/2006 |
| TW | I259726 | 8/2006 |
| TW | I264227 | 10/2006 |
| TW | 200742443 | 11/2007 |
| TW | I317107 | 11/2009 |
| TW | I325281 | 5/2010 |
| TW | I328357 | 8/2010 |
| TW | I329843 | 9/2010 |
| TW | I330976 | 9/2010 |
| TW | I331877 | 10/2010 |
| TW | I335183 | 12/2010 |
| WO | 2004/014060 | 2/2004 |
| WO | 2004/088988 | 10/2004 |
| WO | 2005/013201 | 2/2005 |
| WO | 2006/019093 | 2/2006 |
| WO | 2007/015126 | 2/2007 |
| WO | 2007/018626 | 2/2007 |
| WO | 2007/092215 | 8/2007 |
| WO | 2008/086197 | 7/2008 |
| WO | 2009/011501 | 1/2009 |
| WO | 2009/051419 | 4/2009 |
| WO | 2009/115901 | 9/2009 |
| WO | 2009/126260 | 10/2009 |
| WO | 2010/090629 | 8/2010 |
| WO | 2010/148919 | 12/2010 |

(56) References Cited

FOREIGN PATENT DOCUMENTS

| | | |
|---|---|---|
| WO | 2011/046008 | 4/2011 |
| WO | 2011/047994 | 4/2011 |
| WO | 2011/061880 | 5/2011 |
| WO | 2011/062392 | 5/2011 |
| WO | 2011/064673 | 6/2011 |
| WO | 2011/103482 | 8/2011 |
| WO | 2012/030193 | 3/2012 |
| WO | 2012/043882 | 4/2012 |
| WO | 2012/095467 | 7/2012 |
| WO | 2012/128903 | 9/2012 |
| WO | 2012/173415 | 12/2012 |
| WO | 2013/001803 | 1/2013 |

OTHER PUBLICATIONS

Extended European Search Report dated Jan. 5, 2016 in European Application No. 12793067.5.

Guillaume Laroche et al., "Competition Based Prediction for Skip Mode Motion Vector Using Macroblock Classification for the H.264 JM KTA Software", Advanced Concepts for Intelligent Vision Systems, Lecture Notes in Computer Science, pp. 789-799, Springer Berlin Heidelberg, Aug. 28, 2007, XP19069087.

Office Action dated Nov. 11, 2015 in Taiwanese Patent Application No. 101123524, with English translation of search report.

Yunfei Zheng et al., "Extended Motion Vector Prediction for Bi predictive Mode", Joint Collaborative Team on Video Coding (JCT-VC) of ITU-T SG16 WP3 and ISO/IEC JTC1/SC29/WG11, JCTVC-E343, WG11 No. m19871, 5th Meeting: Geneva, Mar. 16-23, 2011, pp. 1-4.

Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, JCTVC-F470_r4, WG11 No. m20900, 6th meeting: Torino, IT, Jul. 14-22, 2011.

Extended European Search Report dated Apr. 15, 2016 in European Patent Application No. 12804429.4.

Jung et al., "Proposition for robust parsing with temporal predictor," Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D197, WG11 No. m18957, XP30008237.

Su et al., "On motion vector competition," Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, JCTVC-C257, WG11 No. m18298, XP30007964.

Office Action dated Aug. 13, 2015 in U.S. Appl. No. 13/536,309.

"Advanced Video Coding for Generic Audiovisual Services", ITU-T Recommendation H. 264, Mar. 2010.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 16-23, 2011.

Guillaume Laroche, Christophe Gisquet, Patrice Onno, Edouard Francois, Naël Ouedraogo, Julien Richard "*Robust solution for the AMVP parsing issue*", Joint Collaborative Team on Video, Coding (JCT-VC) of ITU-T SG16 WP3 and ISO/IEC JTC1/SC29/WG11 5$^{th}$ Meeting: Geneva, CH, Mar. 16-23, 2011 [JCTVC-E219].

Minhua Zhou, Vivienne Sze, "*A study on HM2.0 bitstream parsing and error resiliency issue*", Joint Collaborative Team on Video Coding (JCT-VC) of ITU-T SG16 WP3 and ISO/IEC JTC1/SC29/WG11 5$^{th}$ Meeting: Geneva, CH, Mar. 16-23, 2011, [JCTVC-E0118].

Bin Li, Jizheng Xu, Feng Wu, Houqiang Li, "*On merge candidate construction*", Joint Collaborative Team on Video Coding (JCT-VC) of ITU-T SG16 WP3 and ISO/IEC JTC1/SC29/WG11 5$^{th}$ Meeting: Geneva, CH, Mar. 16-23, 2011, [JCTVC-E146].

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver. 8, 5th Meeting: Geneva, CH, Mar. 16-23, 2011.

International Search Report dated May 22, 2012 in International (PCT) Application No. PCT/JP2012/001351.

International Search Report dated Aug. 21, 2012 in International (PCT) Application No. PCT/JP2012/003316.

International Search Report dated Aug. 28, 2012 in International (PCT) Application No. PCT/JP2012/003386.

International Search Report dated Aug. 28, 2012 in International (PCT) Application No. PCT/JP2012/003416.

International Search Report dated Aug. 28, 2012 in International (PCT) Application No. PCT/JP2012/003496.

International Search Report dated Aug. 28, 2012 in International (PCT) Application No. PCT/JP2012/003493.

International Search Report dated Oct. 30, 2012 in International (PCT) Application No. PCT/JP2012/004924.

International Search Report dated Jan. 8, 2013 in International (PCT) Application No. PCT/JP2012/006110.

International Preliminary Report on Patentability dated Dec. 3, 2013 in International (PCT) Application No. PCT/JP2012/004924.

Extended European Search Report dated Feb. 4, 2012 in European Application No. 12771702.3.

International Preliminary Report on Patentability dated Feb. 18, 2014 in International (PCT) Application No. PCT/JP2012/006110.

Extended European Search Report dated Sep. 11, 2014 in European Application No. 12792164.1.

Extended European Search Report dated Oct. 1, 2014 in European Application No. 12789922.7.

Extended European Search Report dated Oct. 2, 2014 in European Application No. 12793588.0.

Extended European Search Report dated Nov. 12, 2014 in European Application No. 12819464.4.

Extended European Search Report dated Nov. 17, 2014 in European Application No. 12793037.8.

Minhua Zhou et al., "A study on HM3.0 parsing throughput issue", Joint Collaborative Team on Video Coding (JCT-VC) of ITU-T SG16 WP3 and ISO/IEC JTC1/SC29/WG11, JCTVC-F068, 6$^{th}$ Meeting: Torino, IT, Jul. 14-22, 2011, pp. 1-17, XP030009091.

Bin Li et al., "An investigation on robust parsing", Joint Collaborative Team on Video Coding (JCT-VC) of ITU-T SG16 WP3 and ISO/IEC JTC1/SC29/WG11, JCTVC-E148, 5$^{th}$ Meeting: Geneva, CH, Mar. 16-23, 2011, XP030008654.

Thomas Wiegand et al., "WD2: Working Draft 2 of High-Efficiency Video Coding", Joint Collaborative Team on Video Coding (JCT-VC) of ITU-T SG16 WP3 and ISO/IEC JTC1/SC29/WG11, JCTVC-D503_rl, 4$^{th}$ Meeting: Daegu, KR, Jan. 20-28, 2011, pp. i-viii, 9-10, and 85-94.

J. Jung et al., "Temporal MV predictor modification for MV-Comp, Skip, Direct and Merge schemes", Joint Collaborative Team on Video Coding (JCT-VC) of ITU-T SG16 WP3 and ISO/IEC JTC1/SC29/WG11, JCTVC-D164, 4$^{th}$ Meeting: Daegu, KR, Jan. 20-28, 2011, pp. 1-5.

Hideki Takehara et al., "Bi-derivative merge candidate", Joint Collaborative Team on Video Coding (JCT-VC) of ITU-T SG16 WP3 and ISO/IEC JTC1/SC29/WG11, JCTVC-F372, 6$^{th}$ Meeting: Torino, IT, Jul. 14-22, 2011, pp. 1-5.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver. 2, 5$^{th}$ Meeting: Geneva, CH, Mar. 16-23, 2011.

J. Jung et al., "Proposition for robust parsing with temporal predictor", Joint Collaborative Team on Video Coding (JCT-VC) of ITU-T SG16 WP3 and ISO/IEC JTC1/SC29/WG11, JCTVC-D197, 4$^{th}$ Meeting: Daegu, KR, Jan. 20-28, 2011.

Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, JCTVC-F470, 6$^{th}$ Meeting: Torino, IT, Jul. 14-22, 2011.

Jianle Chen et al., "MVP index parsing with fixed number of candidates", Joint Collaborative Team on Video Coding (JCT-VC) of ITU-T SG16 WP3 and ISO/IEC JTC1/SC29/WG11, JCTVC-F402, 6$^{th}$ Meeting: Torino, IT, Jul. 14-22, 2011.

Minhua Zhou et al., "A study on HM3.0 parsing throughput issue", Joint Collaborative Team on Video Coding (JCT-VC) of ITU-T

(56) References Cited

OTHER PUBLICATIONS

SG16 WP3 and ISO/IEC JTC1/SC29/WG11, JCTVC-F068, 6th Meeting: Torino, IT, Jul. 14-22, 2011, pp. 1-22.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d2, 6th Meeting: Torino, IT, Jul. 14-22, 2011.
Steffen Kamp et al., "Multihypothesis Prediction using Decoder Side Motion Vector Derivation in Inter Frame Video Coding", Visual Communications and Image Processing, SPIE vol. 7257, San Jose, CA, Jan. 1-22, 2009, XP030081712.
Byeong-Moon Jeon, "New syntax for Bi-directional mode in MH pictures", Joint Video Team (JVT) of ISO/IEC MPEG & ITU-T VCEG (ISO/IEC JTC1/SC29/WG11 and ITU-T SG16 Q.6), JVT-C121, 3rd Meeting: Fairfax, Virginia, USA, May 6-10, 2002, XP030005233.
Yoshinori Suzuki et al., "Extension of uni-prediction simplification in B slices", Joint Collaborative Team on Video Coding (JCT-VC) of ITU-T SG16 WP3 and ISO/IEC JTC1/SC29/WG11, JCTVC-D421, 4th Meeting: Daegu, KR, Jan. 20-28, 2011, XP030047967.
Markus Flierl et al., "Generalized B Pictures and the Draft H.264/AVC Video-Compression Standard", IEEE Transactions on Circuits and Systems for Video Technology, Piscataway, NJ, USA, vol. 13, No. 7, Jul. 1, 2003, pp. 587-597, XP011099251.
Hideaki Kimata et al., "Spatial Temporal Adaptive Direct Prediction for Bi-Directional Prediction Coding on H.264", Picture Coding Symposium, Apr. 23-25, 2003, Saint Malo, FR, XP030080000.
Athanasios Leontaris et al., "Weighted Prediction Methods for Improved Motion Compensation", 16th IEEE International Conference on Image Processing (ICIP), Piscataway, NJ, USA, Nov. 7, 2009, pp. 1029-1032, XP031628457.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d4, 6th Meeting: Torino, IT, Jul. 13-22, 2011.
Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, 3rd Meeting: Guangzhou, CN, Oct. 7-15, 2010, XP030008032.
Thomas Wiegand et al., WD2: Working Draft 2 of High-Efficiency Video Coding, Joint Collaborative Team on Video Coding of ISO/IEC JTC1/SC29/WG11 and ITU-T SG16, JCT-VC Meeting, JCTVC-D503, Apr. 15, 2011, pp. 62-63, XP030113315.
Jaehyun Lim et al., "Extended merging scheme using motion-hypothesis inter prediction", Joint Collaborative Team on Video Coding (JCT-VC) of ITU-T SG16 WP3 and ISO/IEC JTC1/SC29/WG11, JCTVC-B023, 2nd Meeting: Geneva, CH, Jul. 21-28, 2010, XP030007603.
Jungyoup Yang et al., "Motion Vector Coding with Optimal Predictor", International Organisation for Standardisation, MPEG Meeting, Motion Picture Expert Group or ISO/IEC JTC1/SC29/WG11, Lausanne, Switzerland, Jan. 29, 2009, XP030044806.
Toshiyasu Sugio et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, JCTVC-D274, 4th Meeting: Daegu, KR, Jan. 20-28, 2011, XP030008314.
Shijun Sun et al., "Predictive Motion Estimation with Global Motion Predictor", Visual Communications and Image Processing, SPEI vol. 5308, San Jose, CA, Jan. 20, 2004, XP030081305.
B. Bross et al., "CE9: Motion Vector Coding Test Report by Fraunhofer HHI", Joint Collaborative Team on Video Coding (JCT-VC) of ITU-T SG16 WP3 and ISO/IEC JTC1/SC29/WG11, JCTVC-D314, 4th Meeting: Daegu, KE, Jan. 20-28, 2011, XP030008354.
Yi-Jen Chiu et al., "CE1 Subtest1: A joint proposal of candidate-based decoder-side motion vector derivation", Joint Collaborative Team on Video Coding (JCT-VC) of ITU-T SG16 WP3 and ISO/IEC JTC1/SC29/WG11, JCTVC-D448, 4th Meeting: Daegu, KR, Jan. 20-28, 2011, XP030008487.

Edouard Francois et al., "Robust solution for the AMVP parsing issue", Joint Collaborative Team on Video Coding (JCT-VC) of ITU-T SG16 WP3 and ISO/IEC JTC1/SC29/WG11, JCTVC-E219, 5th Meeting: Geneva, CH, Mar. 16-23, 2011, XP030008725.
Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, JCTVC-F470, 6th Meeting: Torino, IT, Jul. 14-22, 2011, XP030009493.
Jianle Chen et al., "MVP index parsing with fixed number of candidates", Joint Collaborative Team on Video Coding (JCT-VC) of ITU-T SG16 WP3 and ISO/IEC JTC1/SC29/WG11, JCTVC-F402, XP030009425.
Yunfei Zheng et al., "Extended Motion Vector Prediction for Bi predictive Mode", Joint Collaborative Team on Video Coding (JCT-VC) of ITU-T SG16 and ISO/IEC JTC1/SC29/WG11, JCTVC-E343, WG11 No. m19871, 5th Meeting: Geneva, Mar. 16-23, 2011, pp. 1-4.
Guillaume Laroche et al., "RD Optimized Coding for Motion Vector Predictor Selection" IEEE Transactions on Circuits and Systems for Video Technology, vol. 18, No. 9, Sep. 2008.
Martin Winken et al., "Description of video coding technology proposal by Fraunhofer HHI" Joint Collaborative Team on Video Coding (JCT-VC) of ITU-T SG16 WP3 and ISO/IEC JTC1/SC29/WG11 1st Meeting: Dresden, DE, Apr. 15-23, 2010 Document: JCTVC-A116.
Sugio T et al., "Parsing Robustness for Merge/AMVP", 97. MPEG Meeting; Jul. 18, 2011-Jul. 22, 2011; Torino, IT, (Motion Picture Expert Group or ISO/IEC JTC1/SC29/WG11) F-470 Version 6, Jul. 22, 2011 XP002758863.
Extended European Search Report dated Jun. 27, 2016 in European Application No. 12841970.2.
Bin Li et al., "Constrained temporal motion vector prediction for error resilience", JCTVC-D139, Daegu, KR, Jan. 20-28, 2011.
Jian-Liang Lin et al., "Syntax for AMVP Parsing Error Control", JCTVC-D126, Daegu, KR, Jan. 20-28, 2011.
Office Action dated Jul. 11, 2016 in U.S. Appl. No. 15/140,949.
Search and Examination Report dated Sep. 26, 2016 in Singapore Application No. 2013078837.
Office Action dated Oct. 19, 2016 in U.S. Appl. No. 13/536,309.
Office Action dated Oct. 26, 2016 in U.S. Appl. No. 15/140,962.
Office Action dated Oct. 6, 2016 in European Patent Application No. 12792164.1.
Office Action dated Oct. 19, 2016 in European Patent Application No. 12819464.4.
Office Action dated Nov. 16, 2016 in U.S. Appl. No. 15/228,009.
Office Action dated Nov. 18, 2016 in U.S. Appl. No. 15/140,921.
Office Action dated Oct. 19, 2016 in European Patent Application No. 12789922.7.
Office Action dated Oct. 19, 2016 in European Patent Application No. 12793588.0.
Office Action dated Oct. 19, 2016 in European Patent Application No. 12793037.8.
Office Action dated Nov. 28, 2016 in U.S. Appl. No. 15/140,949.
Office Action dated Jan. 19, 2017 in U.S. Appl. No. 15/266,004.
Office Action dated Feb. 9, 2017 in U.S. Appl. No. 15/379,993.
Extended European Search Report dated Jan. 27, 2017 in European Patent Application No. 16193061.5.
Office Action dated Mar. 15, 2017 in U.S. Appl. No. 15/140,962.
Office Action dated Apr. 24, 2017 in U.S. Appl. No. 13/652,643.
Office Action with Search Report dated Mar. 14, 2017 in Chinese Patent Application No. 201280023179.1, with English-language translation of Search Report.
Office Action dated May 5, 2017 in U.S. Appl. No. 15/434,094.
Toshio Sugio et al., "Parsing Robustness for Merge/AMVP", Joint Collaborative Team on Video Coding (JCT-VC) of ITU-T SG16 WP3 and ISO/IEC JTC1/SC29/WG11, 6th Meeting, Torino, IT, Jul. 14-22, 2011, JCTVC-F470_r3.
Office Action dated Apr. 17, 2018 in U.S. Appl. No. 15/228,009.
Office Action dated Oct. 30, 2017 in U.S. Appl. No. 13/652,643.
Office Action dated Nov. 22, 2017 in U.S. Appl. No. 15/140,949.
Office Action dated Nov. 22, 2017 in U.S. Appl. No. 15/602,631.
Office Action dated Dec. 8, 2017 in Canadian Application No. 2,830,036.

(56) References Cited

OTHER PUBLICATIONS

Office Action dated Jan. 26, 2018 in U.S. Appl. No. 15/729,006.
Office Action dated Jan. 26, 2018 in U.S. Appl. No. 15/629,101.
Office Action dated Feb. 8, 2018 in Canadian Application No. 2,834,191.
Office Action dated Feb. 14, 2018 in European Application No. 12 793 588.0.
Office Action dated Feb. 14, 2018 in European Application No. 12 793 037.8.
Office Action dated Feb. 20, 2018 in Canadian Application No. 2,834,123.
Office Action dated Feb. 20, 2018 in Canadian Application No. 2,834,125.
Office Action dated Feb. 20, 2018 in Canadian Application No. 2,834,190.
Office Action dated Mar. 16, 2018 in Canadian Application No. 2,836,063.
Summon to attend oral proceedings issued Mar. 5, 2018 in European Application No. 12819464.4.
Office Action dated May 30, 2017 in U.S. Appl. No. 15/228,009.
Office Action dated Jun. 14, 2017 in U.S. Appl. No. 15/228,018.
Summons to attend oral proceedings issued May 24, 2017 in European Application No. 12789922.7.
Office Action dated Jun. 8, 2017 in European Application No. 12793067.5.
Office Action dated Jul. 26, 2017 in U.S. Appl. No. 15/140,949.
Toshiyasu Sugio et at, "Parsing Robustness for Merge/AMVP", Joint Collaborative Team on Video Coding (JCT-VC) of ITU-T SG16 WP3 and ISO/IEC JTC1/SC29/WG11, 6th Meeting, Torino, IT, Jul. 14-22, 2011, JCTVC-F470_r3.
Office Action dated Jun. 27, 2017 in European Application No. 12804429.4.
Benjamin Bross et al., WD4: Working Draft 4 of High-Efficiency Video Coding, Joint Collaborative Team on Video Coding (JCT-VC) of ITU-T SG16 WP3 and ISO/IEC JTC1/SC29/WG11, 6th Meeting, Torino, IT, Jul. 14-22, 2011, JCTVC-F803_d6.
Office Action dated Aug. 30, 2017 in Malaysian Application No. PI2013702134.
Office Action dated May 7, 2018 in U.S. Appl. No. 15/602,631.
Office Action dated Apr. 30, 2018 in Canadian Patent Application No. 2,843,560.
Office Action dated May 18, 2018 in U.S. Appl. No. 15/729,006.
Office Action dated May 18, 2018 in U.S. Appl. No. 15/629,101.
Yoshinori Suzuki et al., "Extension of uni-prediction simplification in B slices", Joint Collaborative Team on Video Coding (JCT-VC) of ITU-T SG16 WP3 and ISO/IEC JTC1/SC29/WG11, 4th Meeting: Daegu, Korea, Jan. 20-28, 2011, Document: JCTVC-D421, WG11 No. m19400.
Office Action dated Jun. 20, 2018 in Canadian Patent Application No. 2,850,595.
Office Action dated Aug. 9, 2018 in U.S. Appl. No. 15/228,009.
Office Action dated Aug. 29, 2018 in U.S. Appl. No. 13/652,643.
Office Action dated Oct. 12, 2018 in U.S. Appl. No. 15/729,006.
Office Action issued for Indian Patent Application No. 8519/CHENP/2013 dated Oct. 25, 2018.
Office Action issued for Canadian Patent Application No. 2,834,123 dated Oct. 16, 2018.
Decision to refuse dated Oct. 26, 2018 in European Patent Application No. 12 819 464.4.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1, 6th Meeting: Torino, IT, Jul. 14-22, 2011.
Office Action issued for Indian Patent Application No. 8520/CHENP/2013 dated Nov. 29, 2018.
Office Action issued for Indian Patent Application No. 729/CHENP/2014 dated Dec. 24, 2018.
Office Action dated Jan. 30, 2019 in U.S. Appl. No. 15/729,006.
Office Action dated Jan. 25, 2019 in U.S. Appl. No. 13/652,643.
Office Action dated Mar. 11, 2019 in Canadian Patent Application No. 2,843,560.
Office Action dated Apr. 9, 2019 in U.S. Appl. No. 16/232,441.
Extended European Search Report issued for European Patent Application No. 19150217.8, dated Apr. 3, 2019.
Summons to attend oral proceedings issued Apr. 1, 2019 in European Patent Application No. 12804429.4.
Summons to attend oral proceedings issued Apr. 16, 2019 in European Patent Application No. 12804429.4.
Office Action dated Jun. 28, 2019 in Indian Patent Application No. 7358/CHENP/2013.
Office Action dated Jul. 30, 2019 in Indian Patent Application No. 2602/CHENP/2014.
Office Action dated Aug. 27, 2019 in Indian Patent Application No. 9134/CHENP/2013.
Office Action dated Jul. 11, 2019 in U.S. Appl. No. 16/008,533.
Office Action dated Jul. 12, 2019 in U.S. Appl. No. 15/729,006.
Office Action dated Jul. 29, 2019 in U.S. Appl. No. 16/224,059.
Iain E. Richardson "H.264 and MPEG-4 Video Compression", Chapter 6, "H.264/MPEG4 Part 10", Oct. 17, 2003 (Oct. 17, 2003) XP03000162.
Office Action dated Apr. 7, 2020 in U.S. Appl. No. 16/217,590.
Office Action dated Sep. 23, 2019 in Indian Patent Application No. 8665/CHENP/2013.
Office Action dated Oct. 3, 2019 in U.S. Appl. No. 16/223,998.
Office Action dated Sep. 9, 2019 in European Application No. 12 793 037.8.
Office Action dated Nov. 7, 2019 in U.S. Appl. No. 16/217,590.
Official Communication dated Nov. 6, 2019 in European Patent Application No. 12 841 970.2.
Official Communication dated Dec. 9, 2019 in U.S. Appl. No. 13/652,643.
Office Action dated Jan. 13, 2020 in U.S. Appl. No. 16/224,209.
Extended European Search Report issued for European Patent Application No. 19203347.0 dated Jan. 16, 2020.
Iain E. Richardson "H.264 and MPEG-4 Video Compression", Chapter 6, "H.264/MPEG4 Part 10", Oct. 17, 2003 (Oct. 17, 2003) XP030001626.
Extended European Search Report issued for European Patent Application No. 19208547.0 dated Feb. 27, 2020.
Summons to attend oral proceedings pursuant to Rule 115(1) EPC dated Jun. 30, 2020 in European Patent Application No. 12 841 970.2.
Office Action dated Aug. 24, 2020 in U.S. Appl. No. 16/795,717.
Advisory Action dated Sep. 24, 2020 in U.S. Appl. No. 16/224,209.
Office Action dated Sep. 21, 2020 in U.S. Appl. No. 16/217,590.
Hearing Notice dated Oct. 1, 2020 in Indian Patent Application No. 8520/CHENP/2013.

\* cited by examiner

FIG. 1B

Reference picture list 0

| Reference picture index 0 | Display order |
|---|---|
| 0 | 2 |
| 1 | 1 |
| 2 | 0 |

FIG. 1C

Reference picture list 1

| Reference picture index 1 | Display order |
|---|---|
| 0 | 1 |
| 1 | 2 |
| 2 | 0 |

FIG. 5

Size of merging block candidate list = 2

| Merging block candidate index | Assigned bit sequence |
|---|---|
| 0 | 0 |
| 1 | 1 |

Size of merging block candidate list = 3

| Merging block candidate index | Assigned bit sequence |
|---|---|
| 0 | 0 |
| 1 | 10 |
| 2 | 11 |

Size of merging block candidate list = 4

| Merging block candidate index | Assigned bit sequence |
|---|---|
| 0 | 0 |
| 1 | 10 |
| 2 | 110 |
| 3 | 111 |

Size of merging block candidate list = 5

| Merging block candidate index | Assigned bit sequence |
|---|---|
| 0 | 0 |
| 1 | 10 |
| 2 | 110 |
| 3 | 1110 |
| 4 | 1111 |

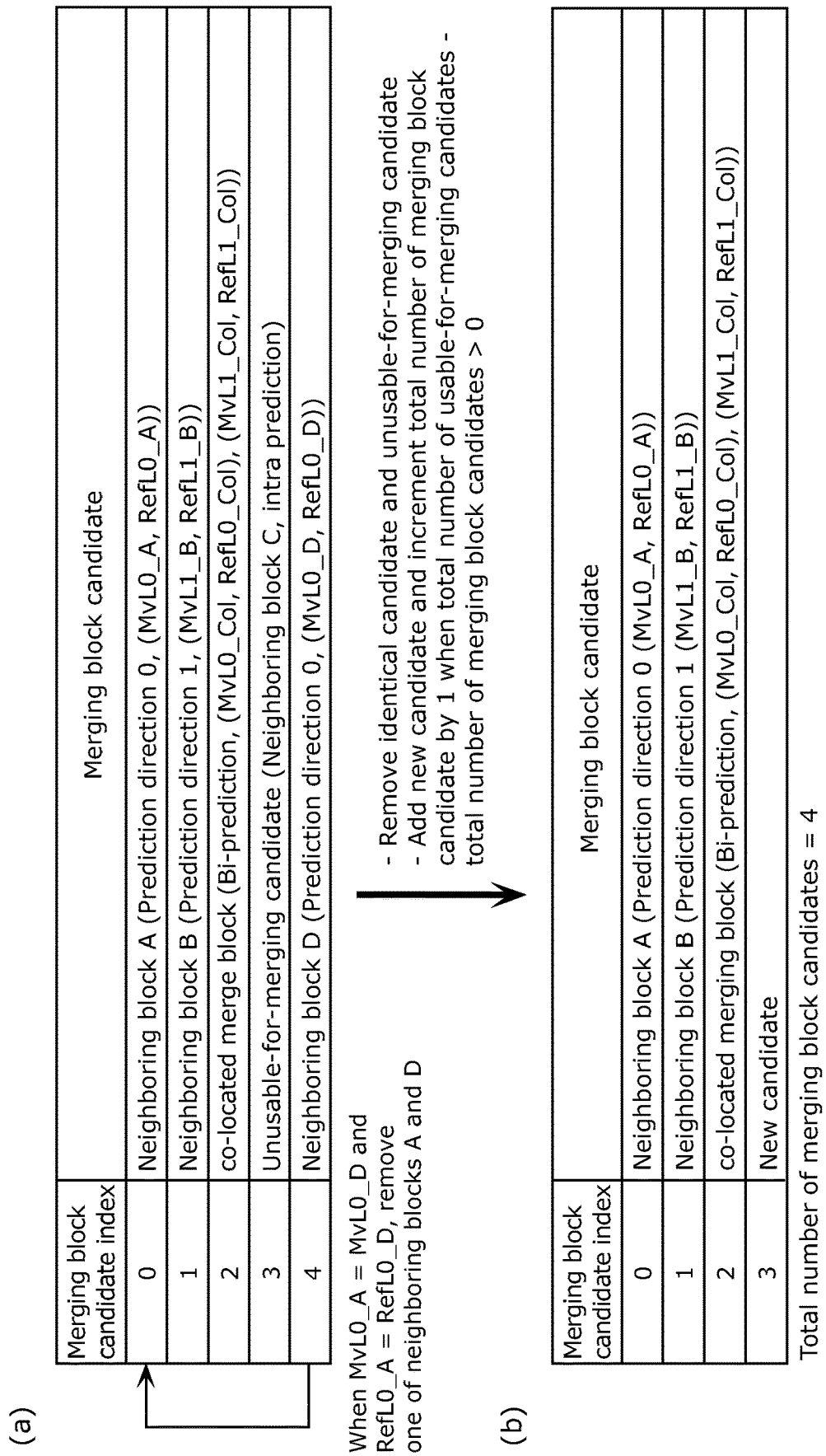

FIG. 13B (a)

| Merging block candidate index | Merging block candidate |
|---|---|
| 0 | Neighboring block A (Prediction direction 0, (MvL0_A, RefL0_A)) |
| 1 | Neighboring block B (Prediction direction 1, (MvL1_B, RefL1_B)) |
| 2 | co-located merging block (Bi-prediction, (MvL0_Col, RefL0_Col), (MvL1_Col, RefL1_Col)) |
| 3 | Unusable-for-merging candidate (Neighboring block C, intra prediction) |
| 4 | Neighboring block D (Prediction direction 0, (MvL0_D, RefL0_D)) |
| 5 | Empty |

When MvL0_A = MvL0_D and RefL0_A = RefL0_D, remove one of identical candidates, neighboring blocks A and D

- Remove unusable-for-merging candidate and identical candidate
- Add new candidate and increment total number of merging block candidates by 1 when size of candidate list - total number of merging block candidates > 0

→

(b)

| Merging block candidate index | Merging block candidate |
|---|---|
| 0 | Neighboring block A (Prediction direction 0, (MvL0_A, RefL0_A)) |
| 1 | Neighboring block B (Prediction direction 1, (MvL1_B, RefL1_B)) |
| 2 | co-located merging block (Bi-prediction, (MvL0_Col, RefL0_Col), (MvL1_Col, RefL1_Col)) |
| 3 | New candidate 1 (third candidate 1) |
| 4 | New candidate 2 (third candidate 2) |
| 5 | Empty |

- Add second candidate and increment total number of merging block candidates by 1 until size of candidate list - total number of merging block candidates reaches 0.

→

(c)

| Merging block candidate index | Merging block candidate |
|---|---|
| 0 | Neighboring block A (Prediction direction 0, (MvL0_A, RefL0_A)) |
| 1 | Neighboring block B (Prediction direction 1, (MvL1_B, RefL1_B)) |
| 2 | co-located merging block (Bi-prediction, (MvL0_Col, RefL0_Col), (MvL1_Col, RefL1_Col)) |
| 3 | New candidate 1 (third candidate 1) |
| 4 | New candidate 2 (third candidate 2) |
| 5 | Second candidate |

FIG. 13C (a)

| Merging block candidate index | Merging block candidate |
|---|---|
| 0 | Second candidate |
| 1 | Second candidate |
| 2 | Second candidate |
| 3 | Second candidate |
| 4 | Second candidate |
| 5 | Second candidate |

When MvL0_A = MvL0_D and RefL0_A = RefL0_D, add only one of identical candidates, neighboring blocks A and D → Add merging block candidates except unusable-for-merging candidate and identical candidate (b)

| Merging block candidate index | Merging block candidate |
|---|---|
| 0 | Neighboring block A (Prediction direction 0, (MvL0_A, RefL0_A)) |
| 1 | Neighboring block B (Prediction direction 1, (MvL1_B, RefL1_B)) |
| 2 | co-located merging block (Bi-prediction, (MvL0_Col, RefL0_Col), (MvL1_Col, RefL1_Col)) |
| 3 | Second candidate |
| 4 | Second candidate |
| 5 | Second candidate |

- Add new candidate and increment total number of merging block candidates by 1 when size of candidate list − total number of merging block candidates > 0.

(c)

| Merging block candidate index | Merging block candidate |
|---|---|
| 0 | Neighboring block A (Prediction direction 0, (MvL0_A, RefL0_A)) |
| 1 | Neighboring block B (Prediction direction 1, (MvL1_B, RefL1_B)) |
| 2 | co-located merging block (Bi-prediction, (MvL0_Col, RefL0_Col), (MvL1_Col, RefL1_Col)) |
| 3 | New candidate 1 (third candidate 1) |
| 4 | New candidate 2 (third candidate 2) |
| 5 | Second candidate |

FIG. 24

| | Descriptor |
|---|---|
| prediction_unit(x0, y0, log2PUWidth, log2PUHeight, PartIdx, InferredMergeFlag){ | |
|   if(skip_flag[x0][y0]){ | |
|     merge_idx[x0][y0]) | ue(v) \| ae(v) |
|   } else if(PredMode == MODE_INTRA){ | |
|     ... | |
|   } else {/* MODE_INTER */ | |
|     if(!InferredMergeFlag) | |
|       merge_flag[x0][y0] | u(l) \| ae(v) |
|     if(merge_flag[x0][y0] ){ | |
|       merge_idx[x0][y0] | ue(v) \| ae(v) |
|     } else { | |
|       ... | |
|     } | |
|   } | |
| } | |

Merging block candidate index → merge_idx[x0][y0]
Merging flag → merge_flag[x0][y0]
Merging block candidate index → merge_idx[x0][y0]

FIG. 31

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 34
Stream of TS packets
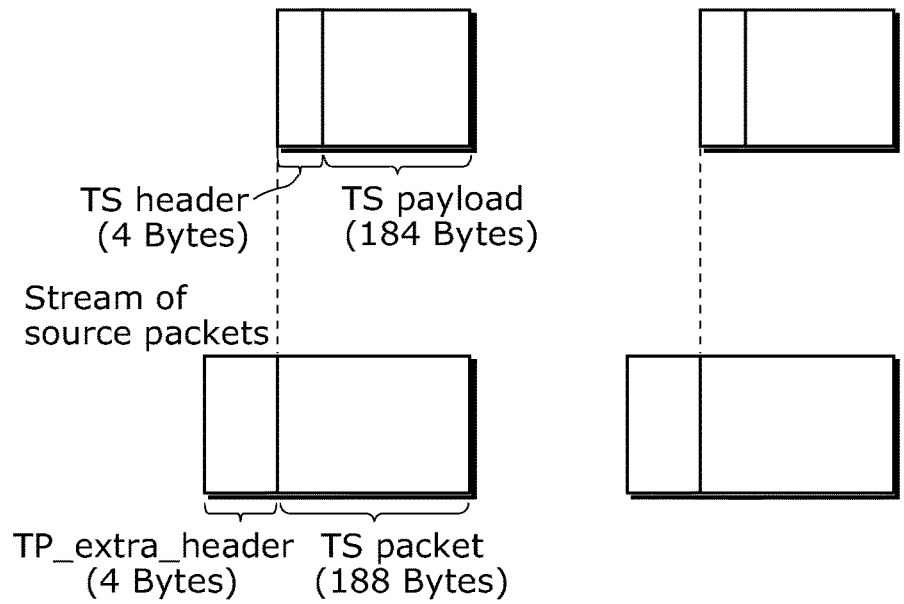
Multiplexed data
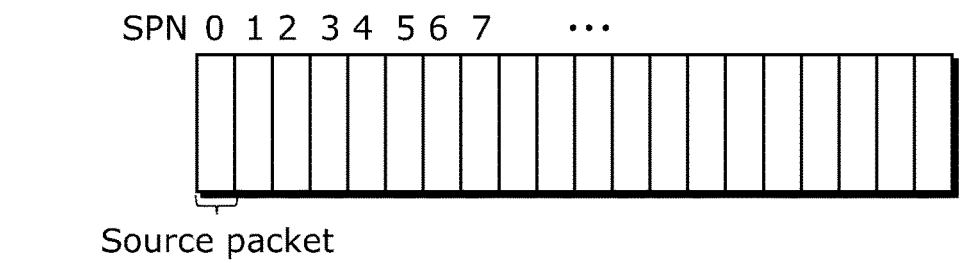
FIG. 35
Data structure of PMT
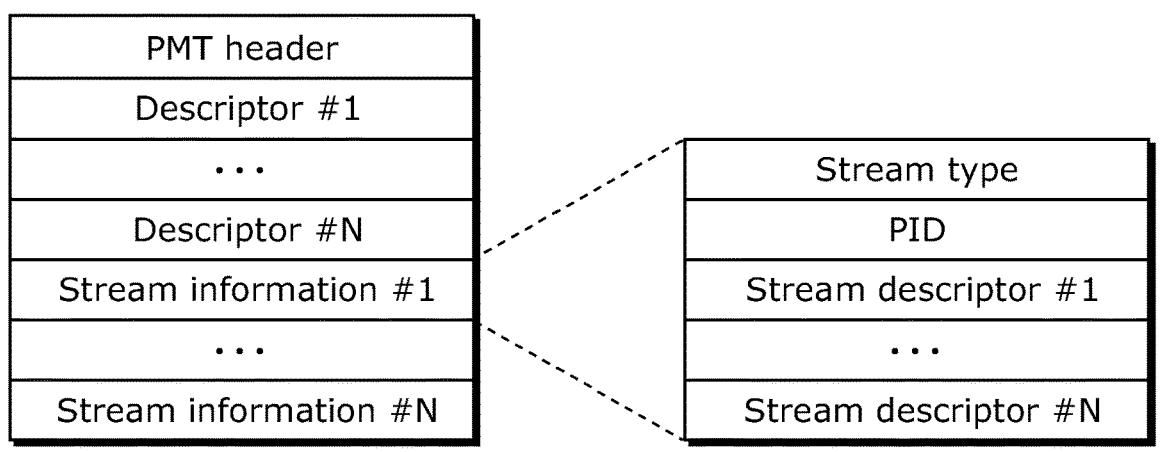

FIG. 42
| Corresponding standard | Driving frequency |
|---|---|
| MPEG-4 AVC | 500 MHz |
| MPEG-2 | 350 MHz |
| ⋮ | ⋮ |
FIG. 43A
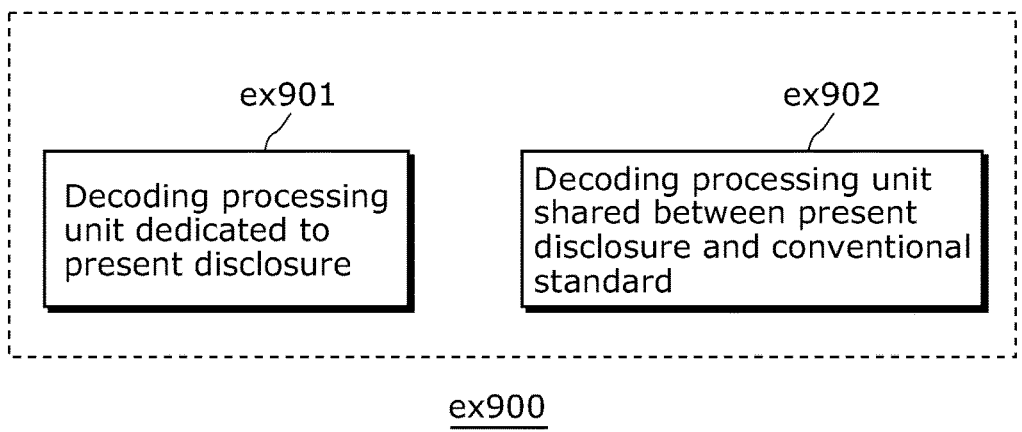
FIG. 43B
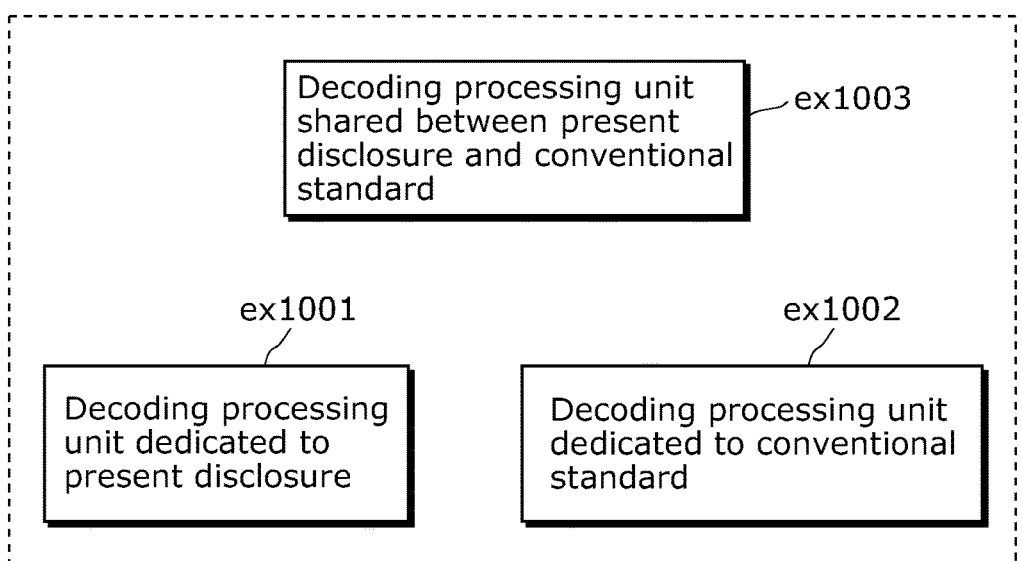

IMAGE DECODING METHOD, IMAGE CODING METHOD, IMAGE DECODING APPARATUS, IMAGE CODING APPARATUS, AND IMAGE CODING AND DECODING APPARATUS

TECHNICAL FIELD

The present disclosure relates to a moving picture coding method and a moving picture decoding method.

BACKGROUND ART

Generally, in coding processing of a moving picture, the amount of information is reduced by compression for which redundancy of a moving picture in spatial direction and temporal direction is made use of. Generally, conversion to a frequency domain is performed as a method in which redundancy in spatial direction is made use of, and coding using prediction between pictures (the prediction is hereinafter referred to as inter prediction) is performed as a method of compression for which redundancy in temporal direction is made use of. In the inter prediction coding, a current picture is coded using, as a reference picture, a coded picture which precedes or follows the current picture in order of display time. Subsequently, a motion vector is derived by performing motion estimation on the current picture with reference to the reference picture. Then, redundancy in temporal direction is removed using a calculated difference between picture data of the current picture and prediction picture data which is obtained by motion compensation based on the derived motion vector (see Non-patent Literature 1, for example). Here, in the motion estimation, difference values between current blocks in the current picture and blocks in the reference picture are calculated, and a block having the smallest difference value in the reference picture is determined as a reference block. Then, a motion vector is estimated from the current block and the reference block.

CITATION LIST

Non Patent Literature

[Non-patent Literature 1] ITU-T Recommendation H.264 "Advanced video coding for generic audiovisual services", March 2010
[Non-patent Literature 2] JCT-VC, "WD3: Working Draft 3 of High-Efficiency Video Coding", JCTVC-E603, March 2011

SUMMARY OF INVENTION

Technical Problem

It is still desirable to enhance error resistance of image coding and decoding in which inter prediction is used, beyond the above-described conventional technique.

In view of this, the object of the present disclosure is to provide an image coding method and an image decoding method with which error resistance of image coding and image decoding using inter prediction is enhanced.

Solution to Problem

An image decoding method according to an aspect of the present disclosure is a method for decoding, on a block-by-block basis, a coded image included in a bitstream, and includes: obtaining a fixed number of merging candidates each of which is a candidate set of a prediction direction, a motion vector, and a reference picture index which are to be referenced in decoding of a current block, the fixed number being greater than or equal to two; obtaining, from the coded bitstream, an index for identifying a merging candidate among the fixed number of merging candidates, the identified merging candidate being a merging candidate to be referenced in the decoding of the current block; and identifying the merging candidate using the obtained index, and decoding the current block using the identified merging candidate, wherein the fixed number of merging candidates include: one or more first candidates each derived based on a prediction direction, a motion vector, and a reference picture index which have been used for decoding a neighboring block spatially or temporally neighboring the current block; and one or more second candidates having a predetermined fixed value.

It should be noted that these general or specific aspects can be implemented as a system, a method, an integrated circuit, a computer program, a computer-readable recording medium such as a compact disc read-only memory (CD-ROM), or as any combination of a system, a method, an integrated circuit, a computer program, and a computer-readable recording medium.

Advantageous Effects of Invention

According to an aspect of the present disclosure, error resistance of image coding and decoding using inter prediction can be enhanced.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 1B is a diagram for illustrating an exemplary reference picture list of a prediction direction 0 for a B-picture;
FIG. 1C is a diagram for illustrating an exemplary reference picture list of a prediction direction 1 for a B-picture;
FIG. 5 shows a relationship between the size of a merging block candidate list and bit sequences assigned to merging block candidate indexes.

FIG. 13A shows an exemplary merging block candidate list according to Embodiment 1;

FIG. 13B shows an exemplary merging block candidate list according to Embodiment 1;

FIG. 13C shows an exemplary merging block candidate list according to Embodiment 1;

FIG. 24 shows exemplary syntax in the case where the size of a merging block candidate list is fixed at the maximum value of the total number of merging block candidates;

FIG. 31 illustrates a structure of multiplexed data;

FIG. 34 shows a structure of TS packets and source packets in the multiplexed data;

FIG. 35 shows a data structure of a PMT;

FIG. 42 shows an example of a look-up table in which video data standards are associated with driving frequencies;

FIG. 43A is a diagram showing an example of a configuration for sharing a module of a signal processing unit; and FIG. 43B is a diagram showing another example of a configuration for sharing a module of the signal processing unit.

DESCRIPTION OF EMBODIMENTS (Underlying Knowledge Forming Basis of the Present Disclosure)

In a moving picture coding scheme already standardized, which is referred to as H.264, three picture types of I-picture, P-picture, and B-picture are used for reduction of the amount of information by compression.

The I-picture is not coded by inter prediction coding. Specifically, the I-picture is coded by prediction within the picture (the prediction is hereinafter referred to as intra prediction). The P-picture is coded by inter prediction coding with reference to one coded picture preceding or following the current picture in order of display time. The B-picture is coded by inter prediction coding with reference to two coded pictures preceding and following the current picture in order of display time.

In inter prediction coding, a reference picture list for identifying a reference picture is generated. In a reference picture list, reference picture indexes are assigned to coded reference pictures to be referenced in inter prediction. For example, two reference picture lists (L0, L1) are generated for a B-picture because it can be coded with reference to two pictures.

Figure 1A:
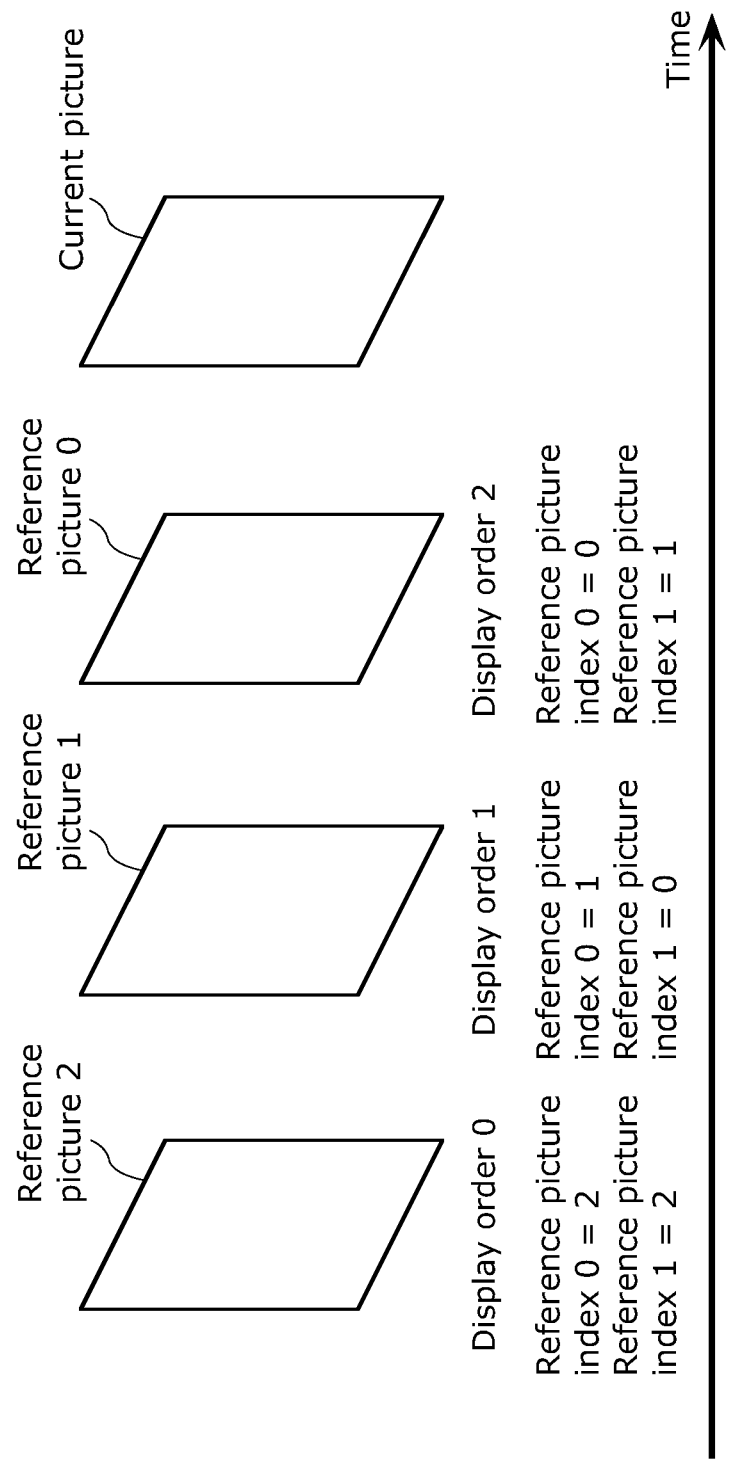
FIG. 1A is a diagram for illustrating an exemplary reference picture list for a B-picture.

FIG. 1A is a diagram for illustrating an exemplary reference picture list for a B-picture. FIG. 1B shows an exemplary reference picture list 0 (L0) for a prediction direction 0 in bi-prediction. In the reference picture list 0, the reference picture index 0 having a value of 0 is assigned to a reference picture 0 with a display order number 2. The reference picture index 0 having a value of 1 is assigned to a reference picture 1 with a display order number 1. The reference picture index 0 having a value of 2 is assigned to a reference picture 2 with a display order number 0. In other words, the shorter the temporal distance of a reference picture from the current picture, the smaller the reference picture index assigned to the reference picture.

On the other hand, FIG. 1C shows an exemplary reference picture list 1 (L1) for a prediction direction 1 in bi-prediction. In the reference picture list 1, the reference picture index 1 having a value of 0 is assigned to a reference picture 1 with a display order number 1. The reference picture index 1 having a value of 1 is assigned to a reference picture 0 with a display order number 2. The reference picture index 1 having a value of 2 is assigned to a reference picture 2 with a display order number 0.

In this manner, it is possible to assign reference picture indexes having values different between prediction directions to a reference picture (the reference pictures 0 and 1 in FIG. 1A) or to assign the reference picture index having the same value for both directions to a reference picture (the reference picture 2 in FIG. 1A).

In a moving picture coding method referred to as H.264 (see Non-patent Literature 1), a motion vector estimation mode is available as a coding mode for inter prediction of each current block in a B-picture. In the motion vector estimation mode, a difference value between picture data of a current block and prediction picture data and a motion vector used for generating the prediction picture data are coded. In addition, in the motion vector estimation mode, bi-prediction and uni-prediction can be selectively performed. In bi-prediction, a prediction picture is generated with reference to two coded pictures one of which precedes a current picture to be coded and the other of which follows the current picture. In uni-prediction, a prediction picture is generated with reference to one coded picture preceding or following a current picture to be coded.

Figure 2:
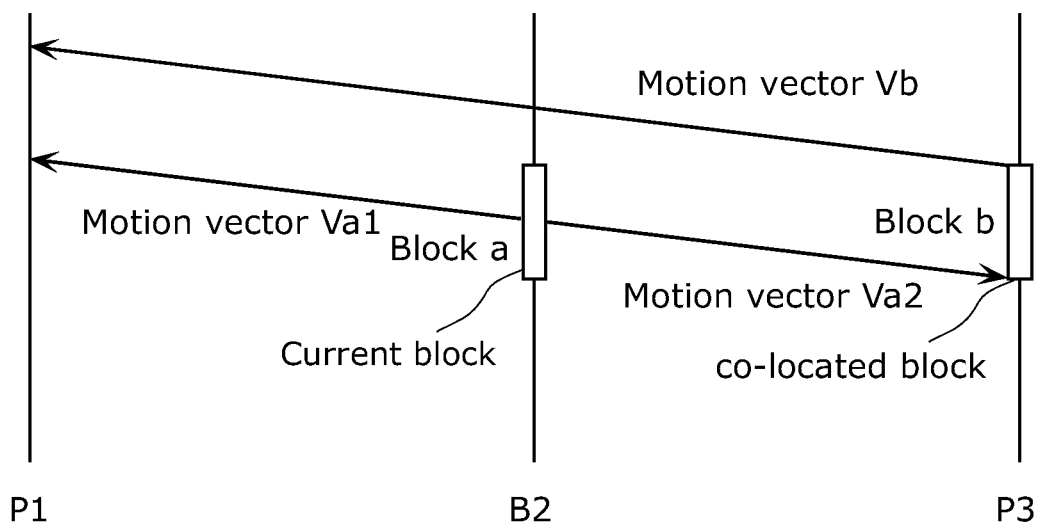
FIG. 2 is a diagram for illustrating motion vectors for use in the temporal motion vector prediction mode.

Furthermore, in the moving picture coding method referred to as H.264, a coding mode referred to as a temporal motion vector prediction mode can be selected for derivation of a motion vector in coding of a B-picture. The inter prediction coding method performed in the temporal motion vector prediction mode will be described below using FIG. 2. FIG. 2 is a diagram for illustrating motion vectors for use in the temporal motion vector prediction mode. Specifically, FIG. 2 shows a case where a block a in a picture B2 is coded in temporal motion vector prediction mode.

In the coding, a motion vector vb is used which has been used in coding of a block b located in the same position in a picture P3, which is a reference picture following the picture B2, as the position of the block a in the picture B2 (the block b is hereinafter referred to as a "co-located block" of the block a). The motion vector vb is a motion vector used in coding the block b with reference to the picture P1.

Motion vectors parallel to the motion vector vb are used for obtaining two reference blocks for the block a are obtained from a forward reference picture and a backward reference picture, that is, a picture P1 and a picture P3. Then, the block a is coded using bi-prediction based on the two obtained reference blocks. Specifically, in the coding of the block a, a motion vector va1 is used to reference the picture P1, and a motion vector va2 is used to reference the picture P3.

In addition, a merging mode has been discussed which is an inter prediction mode for coding of each current block in a B-picture or a P-picture (see Non-patent Literature 2). In the merging mode, a current block is coded using a prediction direction, a motion vector, and a reference picture index which are copies of those used in coding a neighboring block of the current block. At this time, the copies of the index and others of the neighboring block are attached to a coded bitstream (hereinafter simply referred to as a "bitstream" as appropriate) so that the motion direction, motion vector, and reference picture index used for the coding can be selected in decoding.

Figure 3:
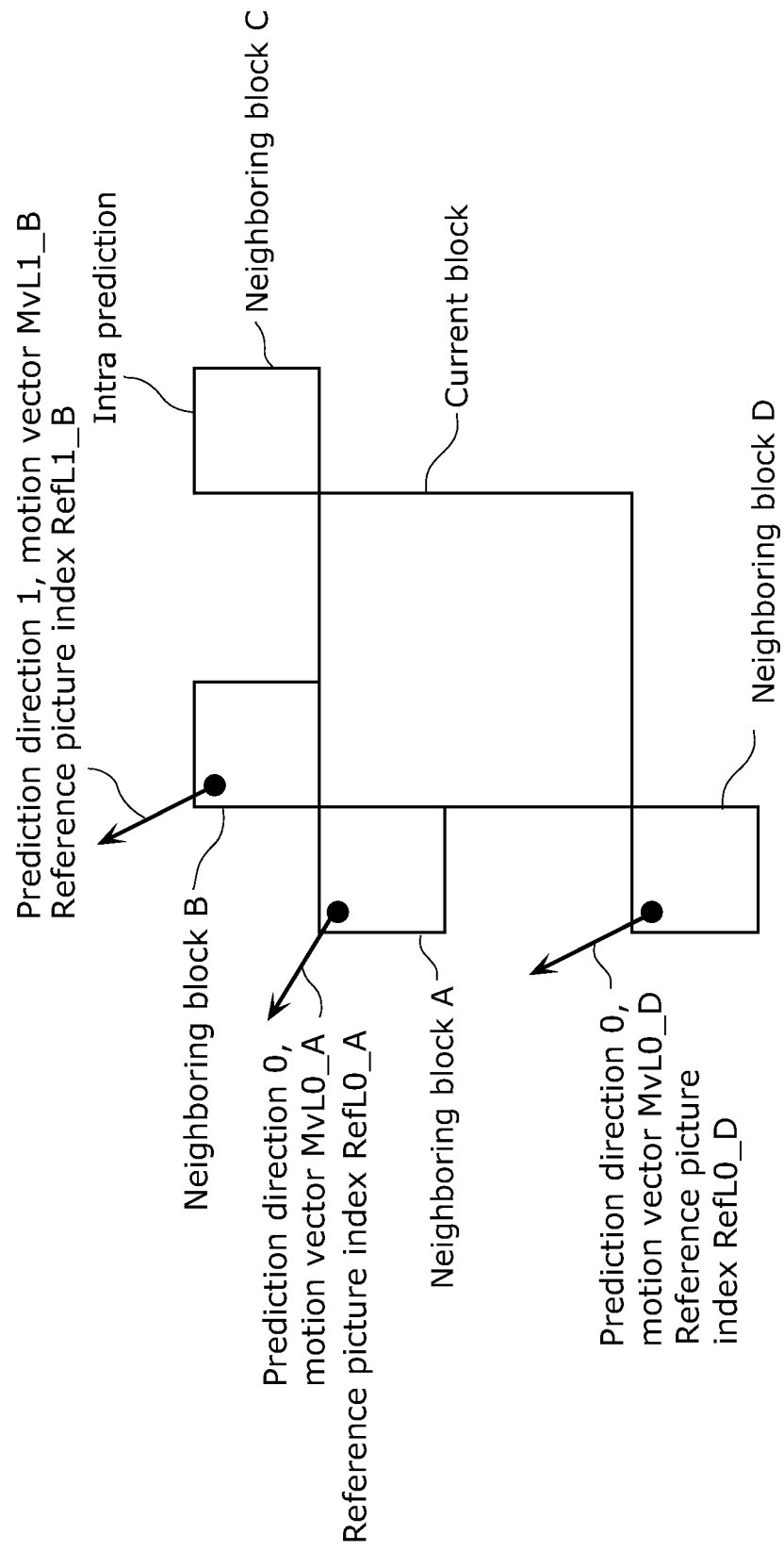
FIG. 3 shows an exemplary motion vector of a neighboring block for use in the merging mode.

FIG. 3 shows an exemplary motion vector of a neighboring block for use in the merging mode. In FIG. 3, a neighboring block A is a coded block located on the immediate left of a current block. A neighboring block B is a coded block located immediately above the current block. A neighboring block C is a coded block located on the immediate above right of the current block. A neighboring block D is a coded block located on the immediate below left of the current block.

The neighboring block A is a block coded using uni-prediction in the prediction direction 0. The neighboring block A has a motion vector MvL0_A having the prediction direction 0 as a motion vector to a reference picture indicated by a reference picture index RefL0_A of the prediction direction 0. Here, MvL0 represents a motion vector which references a reference picture specified in a reference picture list 0 (L0). MvL1 represents a motion vector which references a reference picture specified in a reference picture list 1 (L1). The neighboring block B is a block coded using uni-prediction in the prediction direction 1. The neighboring block B has a motion vector MvL1_B having the prediction direction 1 as a motion vector to a reference picture indicated by a reference picture index RefL1_B of the prediction direction 1.

The neighboring block C is a block coded using intra prediction.

The neighboring block D is a block coded using uni-prediction in the prediction direction 0. The neighboring block D has a motion vector MvL0_D having the prediction direction 0 as a motion vector to a reference picture indicated by a reference picture index RefL0_D of the prediction direction 0.

In this case, for example, a set of a prediction direction, a motion vector, and a reference picture index with which the current block can be coded with the highest coding efficiency is selected as a set of a prediction direction, a motion vector, and a reference picture index of the current block from among the sets of prediction directions, motion vectors, and reference picture indexes of the neighboring blocks A to D and the set of a prediction direction, a motion vector, and a reference picture index which are calculated using a co-located block in temporal motion vector prediction mode. Then, a merging block candidate index indicating a block having the selected set of a prediction direction, a motion vector, and a reference picture index is attached to a bitstream.

Figure 4:
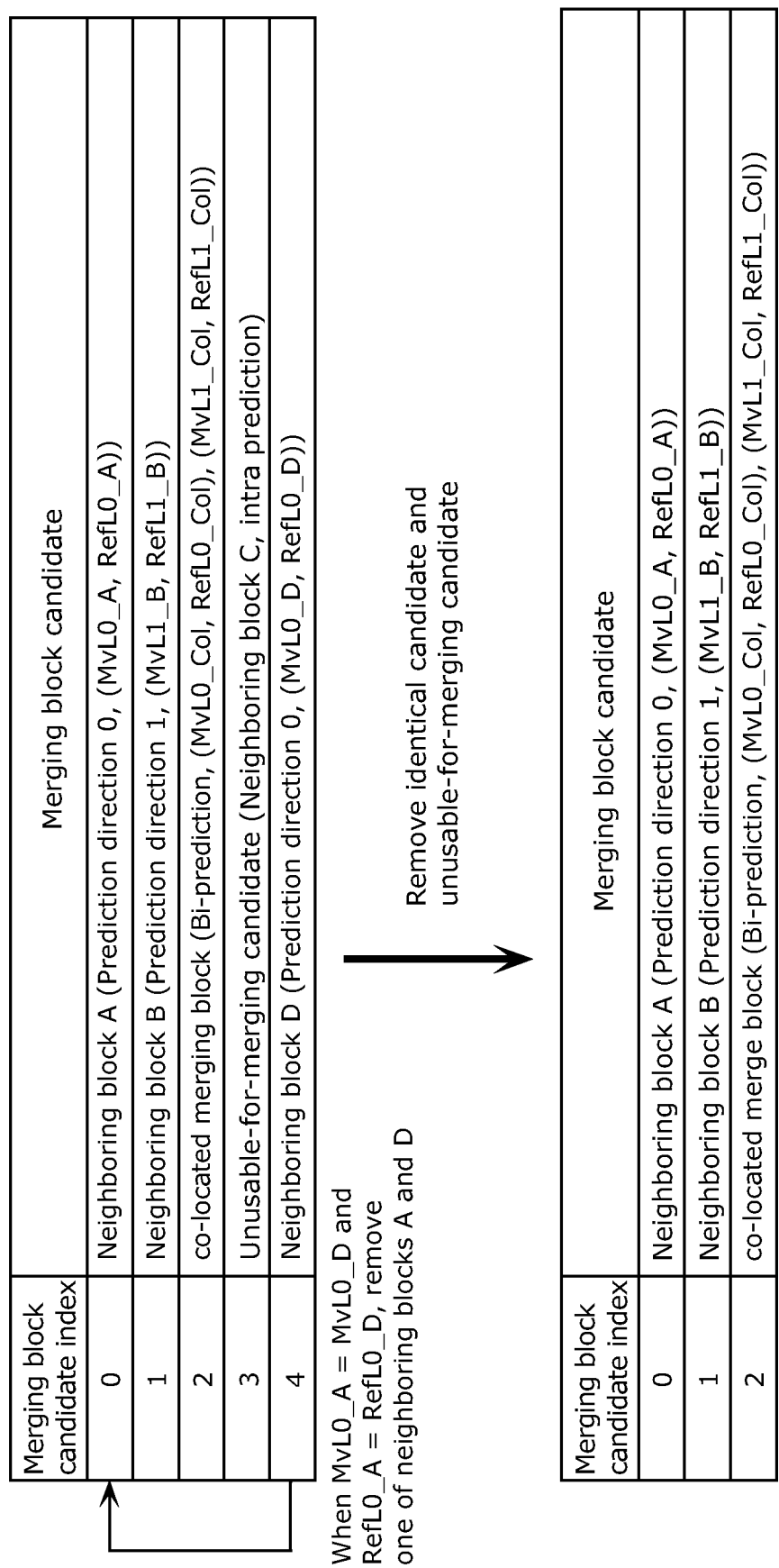
FIG. 4 is a diagram for illustrating an exemplary merging block candidate list.

For example, when the neighboring block A is selected, the current block is coded using the motion vector MvL0_A having the prediction direction 0 and the reference picture index RefL0_A. Then, only the merging block candidate index having a value of 0 which indicates use of the neighboring block A as shown in FIG. 4 is attached to a bitstream. The amount of information on a prediction direction, a motion vector, and a reference picture index is thereby reduced.

Furthermore, in the merging mode, a candidate which cannot be used for coding (hereinafter referred to as an "unusable-for-merging candidate"), and a candidate having a set of a prediction direction, a motion vector, and a reference picture index identical to a set of a prediction direction, a motion vector, and a reference picture index of any other merging block (hereinafter referred to as an "identical candidate") are removed from merging block candidates as shown in FIG. 4.

In this manner, the total number of merging block candidates is reduced so that the amount of code assigned to merging block candidate indexes can be reduced. Here, "unusable for merging" means (1) that the merging block candidate has been coded using intra prediction, (2) that the merging block candidate is outside the boundary of a slice including the current block or the boundary of a picture including the current block, or (3) that the merging block candidate is yet to be coded.

In the example shown in FIG. 4, the neighboring block C is a block coded using intra prediction. The merging block candidate having the merging block candidate index 3 is therefore an unusable-for-merging candidate and removed from the merging block candidate list. The neighboring block D is identical in prediction direction, motion vector, and reference picture index to the neighboring block A. The merging block candidate having the merging block candidate index 4 is therefore removed from the merging block candidate list. As a result, the total number of the merging block candidates is finally three, and the size of the merging block candidate list is set at three.

Merging block candidate indexes are coded by variable-length coding by assigning bit sequences according to the size of each merging block candidate list as shown in FIG. 5. Thus, in the merging mode, bit sequences assigned to merging mode indexes are changed according to the size of each merging block candidate list so that the amount of code can be reduced.

Figure 6:
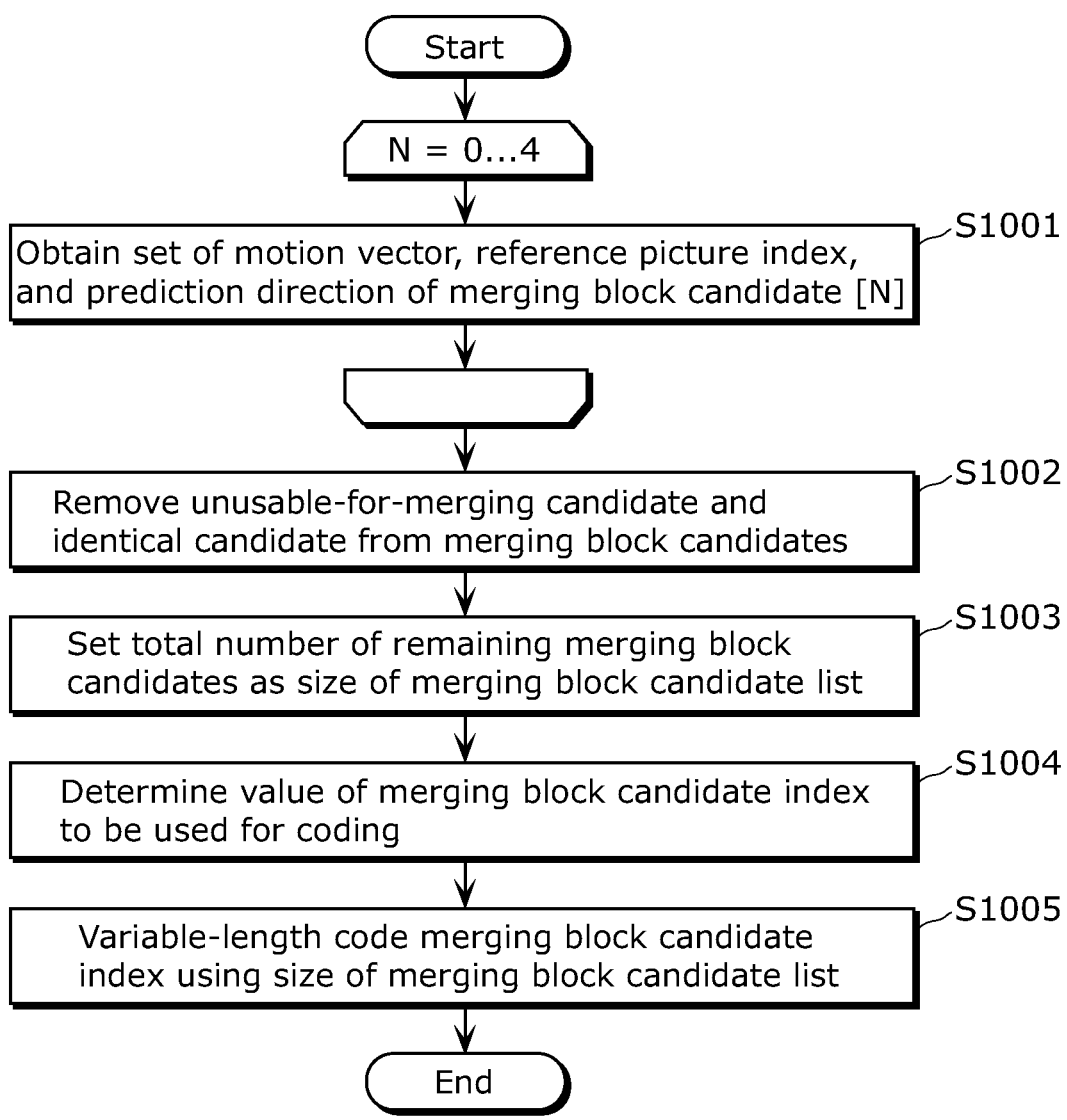
FIG. 6 is a flowchart showing an example of a process for coding when the merging mode is used.

FIG. 6 is a flowchart showing an example of a process for coding when the merging mode is used. In Step S1001, sets of a motion vector, a reference picture index, and a prediction direction of merging block candidates are obtained from neighboring blocks and a co-located block. In Step S1002, identical candidates and unusable-for-merging candidates are removed from the merging block candidates. In Step S1003, the total number of the merging block candidates after the removing is set as the size of the merging block candidate list. In Step S1004, the merging block candidate index to be used in coding of the current block is determined. In Step S1005, the determined merging block candidate index is coded by performing variable-length coding in bit sequence according to the size of the merging block candidate list.

Figure 7:
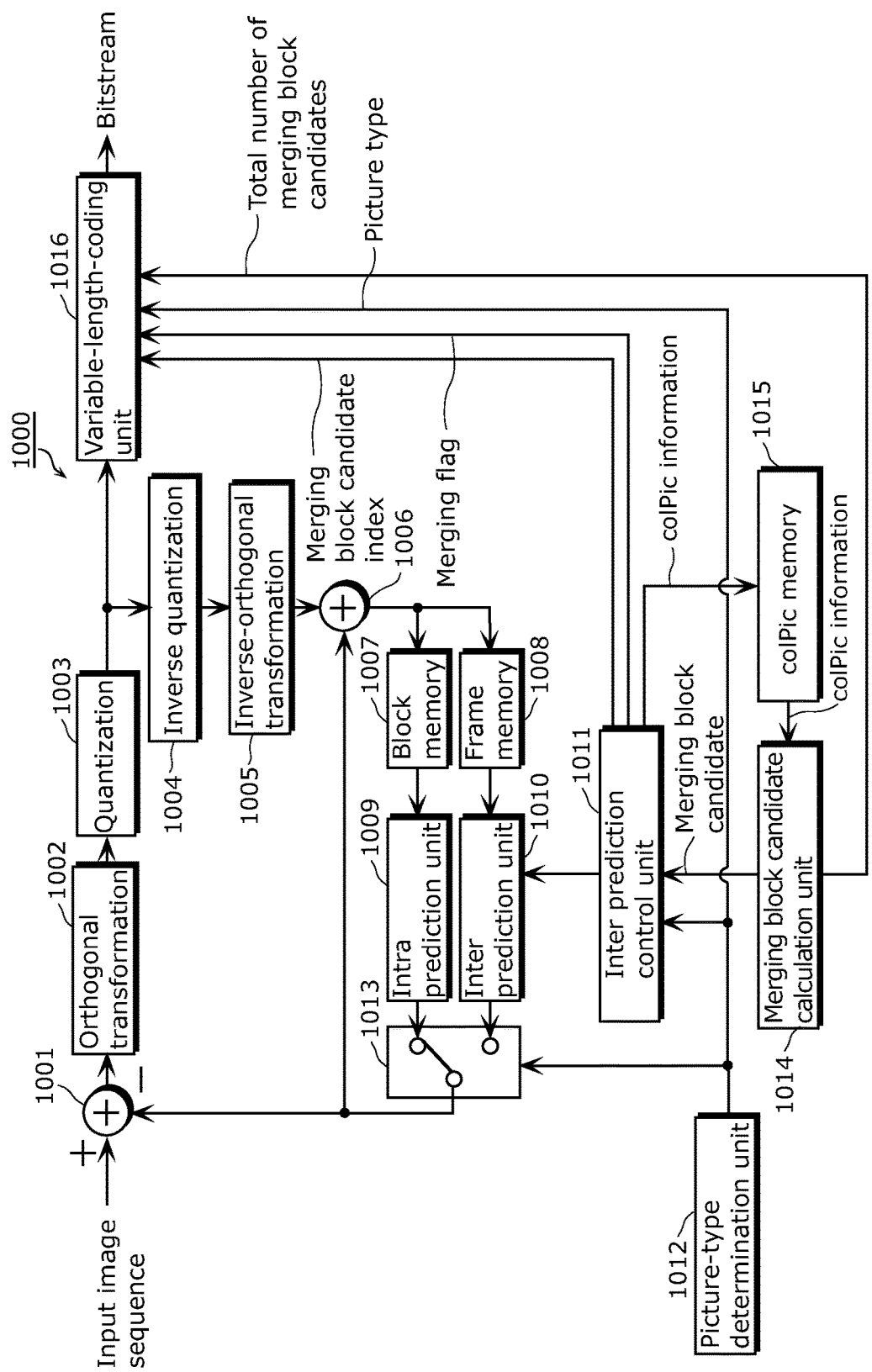
FIG. 7 is a block diagram showing a configuration of an image coding apparatus.

FIG. 7 is a block diagram illustrating an exemplary configuration of an image coding apparatus in which the merging mode is used. In FIG. 7, the merging block candidate calculation unit derives a merging block candidate list (Steps S1001 and S1002) and transmits the total number of merging block candidates to the variable-length-coding unit. The variable-length-coding unit 116 sets the total number of merging block candidates as the size of the merging block candidate list (Step 1003). Furthermore, the variable-length-coding unit determines a merging block candidate index to be used in coding of a current block (Step 1004). Furthermore, the variable-length-coding unit performs variable-length coding on the determined merging block candidate index using a bit sequence according to the size of the merging block candidate list (Step S1005).

Figure 8:
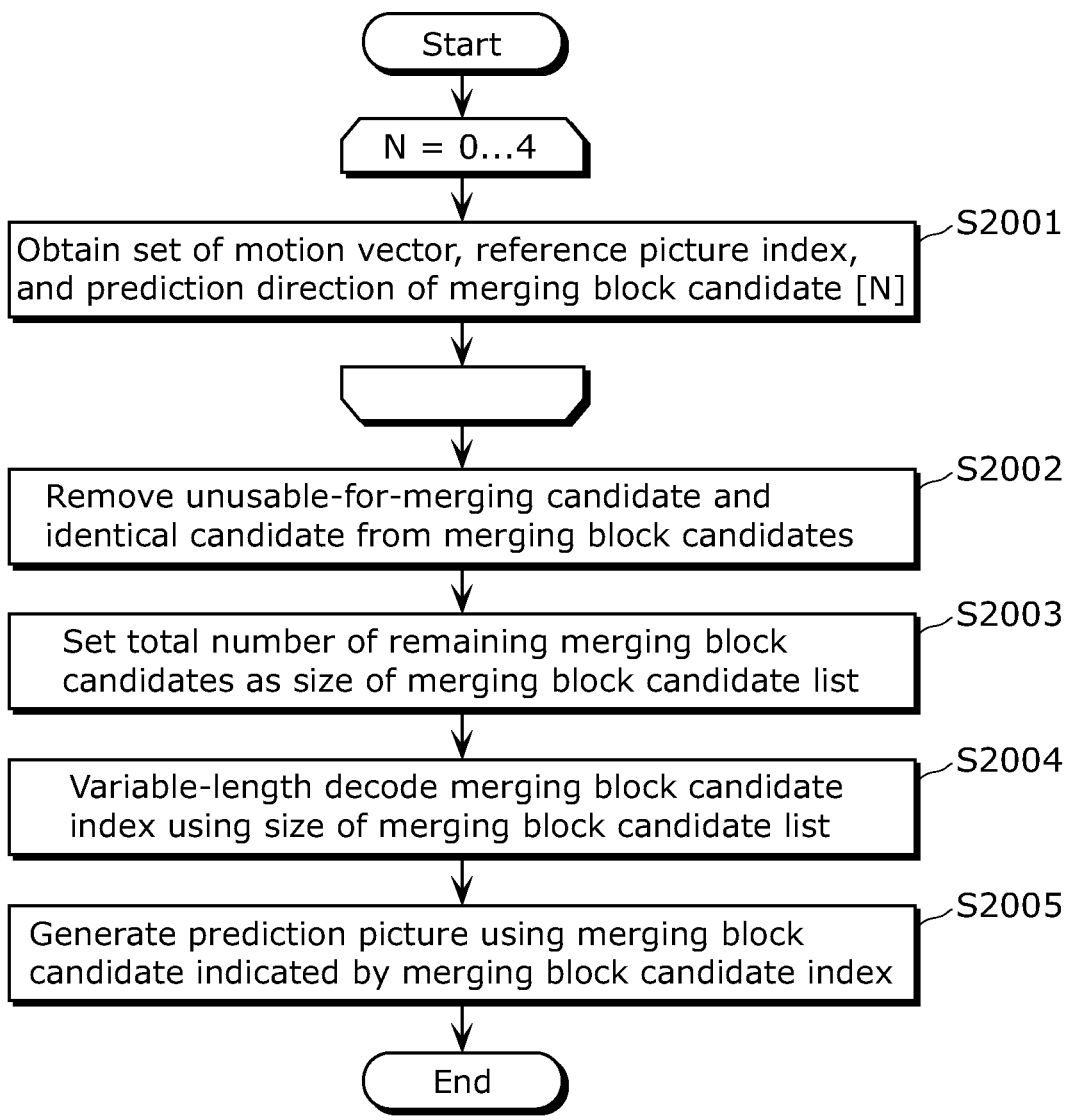
FIG. 8 is a flowchart showing a process for decoding using the merging mode.

FIG. 8 is a flowchart showing an example of a process for decoding using the merging mode. In Step S2001, sets of a motion vector, a reference picture index, and a prediction direction of merging block candidate are obtained from neighboring blocks and a co-located block. In Step S2002, identical candidates and unusable-for-merging candidates are removed from the merging block candidates. In Step S2003, the total number of the merging block candidates after the removing is set as the size of the merging block candidate list. In Step S2004, the merging block candidate index to be used in decoding of a current block is decoded from a bitstream using the size of the merging block candidate list. In Step S2005, the current block is decoded by generating a prediction picture using the merging block candidate indicated by the decoded merging block candidate index.

Figure 9:
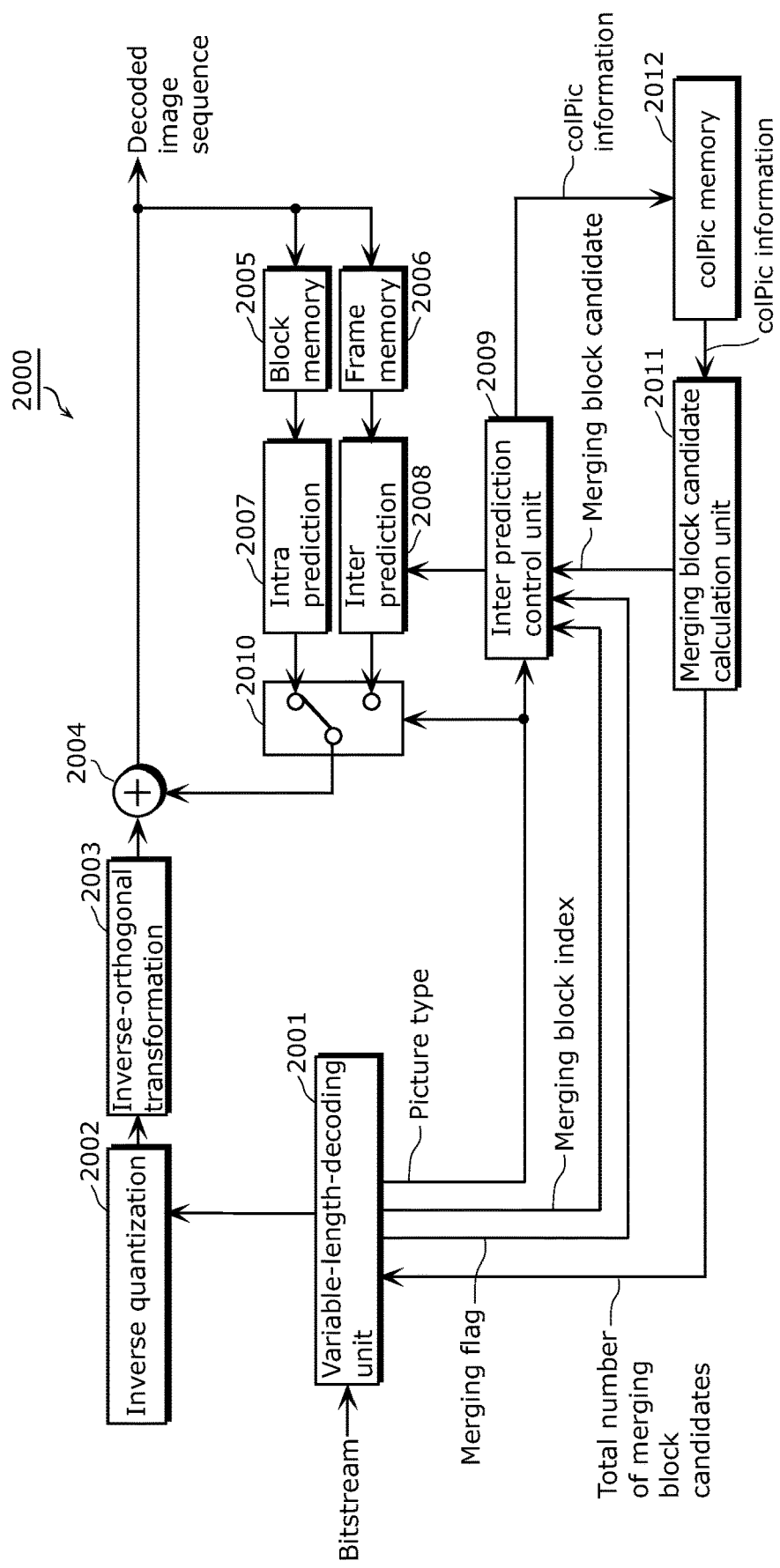
FIG. 9 is a block diagram showing a configuration of an image decoding apparatus.

FIG. 9 is a block diagram illustrating an exemplary configuration of an image decoding apparatus in which the merging mode is used. In FIG. 9, the merging block candidate calculation unit derives a merging block candidate list (Steps S2001 and S2002) and transmits the total number of merging block candidates to the variable-length-decoding unit. The variable-length-decoding unit sets the total number of merging block candidates as the size of the merging block candidate list (Step S2003). Furthermore, using the size of the merging block candidate list, the variable-length-decoding unit decodes, from a bitstream, a merging block candidate index to be used in decoding of a current block (Step S2004).

Figure 10:
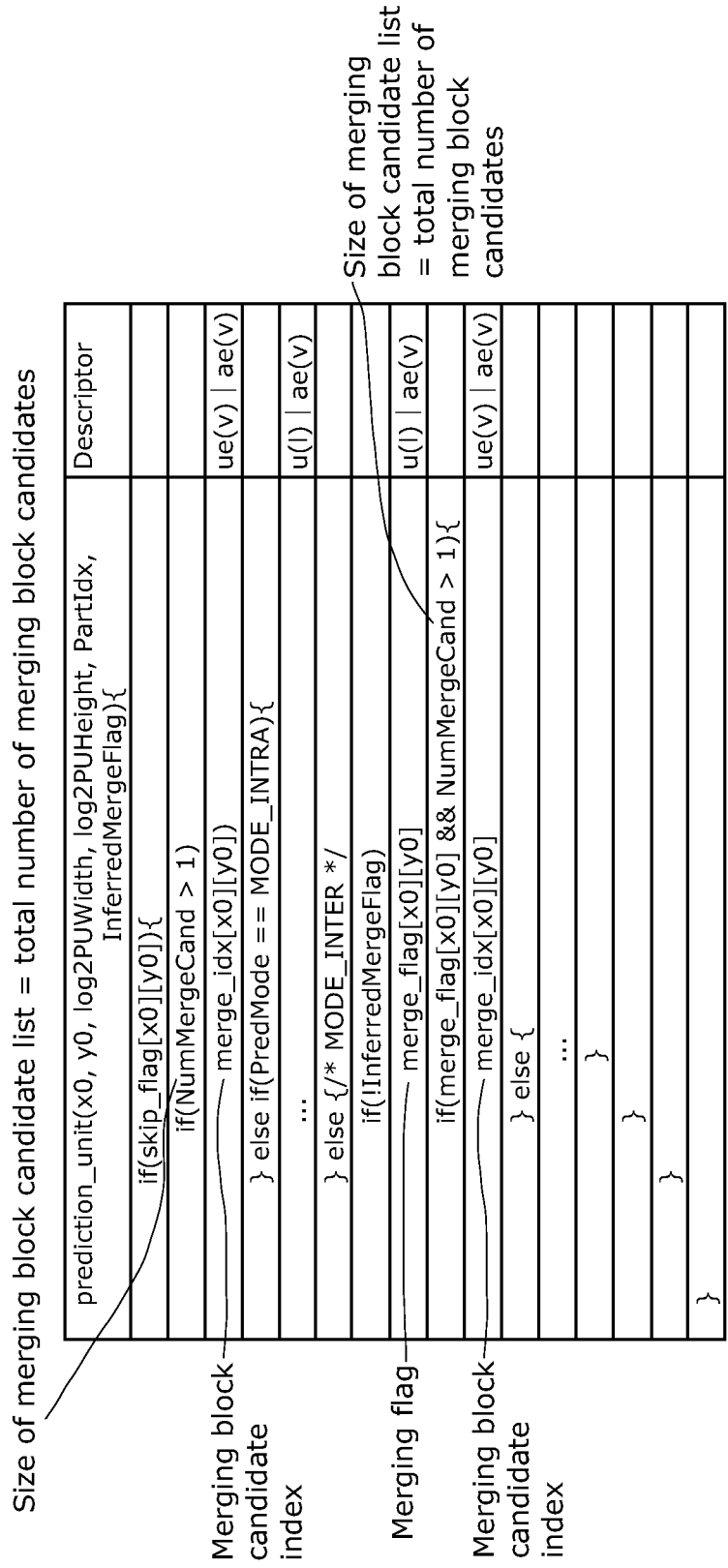
FIG. 10 shows syntax for attachment of a merging block candidate index to a coded bitstream.

FIG. 10 shows syntax for attachment of a merging block candidate index to a bitstream. In FIG. 10, merge_idx represents a merging block candidate index, and merge_flag represents a merging flag. NumMergeCand represents the size of a merging block candidate list. NumMergeCand is set at the total number of merging block candidates after unusable-for-merging candidates and identical candidates are removed from the merging block candidates.

Coding or decoding of an image is performed using the merging mode in the above-described manner.

As described above, in the conventional merging mode, a merging block candidate list is derived by removing unusable-for-merging candidates and identical candidates based on information on reference pictures including a co-located block. Then, the total number of merging block candidates in the merging block candidate list after the removing is set as the size of the merging block candidate list. In the case where there is a difference in the total number of merging block candidates between an image coding apparatus and an image decoding apparatus, a discrepancy arises in bit sequence assigned to a merging block candidate index between the image coding apparatus and the image decoding apparatus, which causes a problem that a bitstream cannot be normally decoded.

For example, when information on a reference picture referenced as a co-located block is lost due to packet loss in a transmission path, the motion vector or reference picture index of the co-located block becomes unknown so that information on a merging block candidate to be generated from the co-located block is no longer unavailable. Then, it is impossible to correctly remove unusable-for-merging candidates and identical candidates from merging block candidates in decoding, and a correct size of a merging block candidate list is therefore no longer obtainable. As a result, it is impossible to normally decode a merging block candidate index.

This problem can be solved by using merging block candidate lists having a fixed size. When merging block candidate lists have a fixed size, it is no longer necessary to calculate the size of merging block candidate lists.

However, such a merging block candidate list having a fixed size includes an empty entry when the size of the merging block candidate list is larger than the total number of candidates derived from spatially neighboring blocks (usable-for-merging candidates except identical candidates) and a candidate which is derived from a co-located block, that is, a temporally neighboring block (first candidate). In this case, there is a problem that an unexpected operation may be performed when the empty entry is referenced in the image decoding apparatus due to an error.

Here, an image decoding method according to an aspect of the present disclosure is a method for decoding, on a block-by-block basis, image data included in a coded bitstream, and includes: obtaining a fixed number of merging candidates each of which is a candidate set of a prediction direction, a motion vector, and a reference picture index which are to be referenced in decoding of a current block, the fixed number being greater than or equal to two; obtaining, from the coded bitstream, an index for identifying a merging candidate among the fixed number of merging candidates, the identified merging candidate being a merging candidate to be referenced in the decoding of the current block; and identifying the merging candidate using the obtained index, and decoding the current block using the identified merging candidate, wherein the fixed number of merging candidates include: one or more first candidates each derived based on a prediction direction, a motion vector, and a reference picture index which have been used for decoding a neighboring block spatially or temporally neighboring the current block; and one or more second candidates having a predetermined fixed value.

In the image decoding method, a fixed number (greater than or equal to two) of merging candidates are obtained, that is, a merging block candidate list has a fixed size (hereinafter simply referred to as "candidate list size" as appropriate), and any empty entry after deriving the first candidates is filled with a second candidate. This prevents an unexpected operation which may be performed when such an empty entry is referenced, so that error resistance can be enhanced.

It should be noted that the phrase "having a predetermined fixed value" means that second candidates in a merging block candidate list are identical in prediction direction, motion vector, and reference picture index. In other words, second candidates in different merging block candidate lists may be different in prediction direction, motion vector, or reference picture index.

It should be noted that a third candidate may be further added to increase coding efficiency in the image decoding method. Also in this case, when a merging block candidate list (hereinafter simply referred to as a "candidate list" as appropriate) has any empty entry after first candidates and third candidates are derived, the empty entry is filled with a second candidate so that error resistance can be enhanced. It should be noted that unlike the second candidates, the third candidates added in a single merging block candidate list are different in at least one of prediction direction, motion vector, and reference picture index from each other because the third candidates are added for the purpose of increasing coding efficiency (however, the third candidates may be identical to any of a first candidate and a second candidate as a result).

Furthermore, for example, the obtaining of a fixed number of merging candidates may include: deriving the one or more first candidates and including the one or more first candidates in the fixed number of merging candidates; deriving one or more third candidates and including the one or more third candidates in the fixed number of merging candidates, when a total number of the first candidates is smaller than the fixed number, the third candidates each having a picture index for a picture referable in the coding of the current block; and deriving the one or more second candidates and including the one or more second candidates in the fixed number of merging candidates so that a total number of the first candidates, the second candidates, and the third candidates equals the fixed number, when a total number of the first candidates and the third candidates is smaller than the fixed number.

Furthermore, for example, in the deriving of one or more third candidates, the one or more third candidates may be derived by selecting, according to a predetermined priority order, one or more candidates from among a plurality of prepared candidates different from each other.

Furthermore, for example, the obtaining of a fixed number of merging candidates may include: initializing the fixed number of merging candidates by setting all the fixed number of merging candidates to the second candidates; deriving the one or more first candidates and updating part of the fixed number of merging candidates so as to include the one or more first candidates in the fixed number of merging candidates; and deriving one or more third candidates and updating part of the fixed number of merging candidates so as to include the one or more third candidates in the fixed number of merging candidates, when a total number of the first candidates is smaller than the fixed number, the third candidates each having a picture index for a picture referable in the coding of the current block.

An image coding method according to an aspect of the present disclosure is a method for coding an image on a block-by-block basis to generate a coded bitstream, and includes: obtaining a fixed number of merging candidates each of which is a candidate set of a prediction direction, a motion vector, and a reference picture index which are to be referenced in coding of a current block, the fixed number being greater than or equal to two; and attaching, to the coded bitstream, an index for identifying a merging candidate among the fixed number of merging candidates, the identified merging candidate being a merging candidate to be referenced in the coding of the current block, wherein the fixed number of merging candidates include: one or more first candidates each derived based on a prediction direction, a motion vector, and a reference picture index which have been used for coding a neighboring block spatially or temporally neighboring the current block; and one or more second candidates having a predetermined fixed value.

Furthermore, for example, the obtaining of a fixed number of merging candidates may include: deriving the one or more first candidates and including the one or more first candidates in the fixed number of merging candidates; deriving one or more third candidates and including the one or more third candidates in the fixed number of merging candidates, when a total number of the first candidates is smaller than the fixed number, the third candidates each having a picture index for a picture referable in the decoding of the current block; and deriving the one or more second candidates and including the one or more second candidates in the fixed number of merging candidates so that a total number of the first candidates, the second candidates, and the third candidates equals the fixed number, when a total number of the first candidates and the third candidates is smaller than the fixed number.

Furthermore, for example, in the deriving of one or more third candidates, the one or more third candidates may be derived by selecting, according to a predetermined priority order, one or more candidates from among a plurality of prepared candidates different from each other.

Furthermore, for example, the obtaining of a fixed number of merging candidates may include: initializing the fixed number of merging candidates by setting all the fixed number of merging candidates to the second candidates; deriving the one or more first candidates and updating part of the fixed number of merging candidates so as to include the one or more first candidates in the fixed number of merging candidates; and deriving one or more third candidates and updating part of the fixed number of merging candidates so as to include the one or more third candidates in the fixed number of merging candidates, when a total number of the first candidates is smaller than the fixed number, the third candidates each having a picture index for a picture referable in the decoding of the current block.

An image decoding apparatus according to an aspect of the present disclosure is an image decoding apparatus which decodes, on a block-by-block basis, image data included in a coded bitstream, and includes: an merging candidate obtaining unit configured to obtain a fixed number of merging candidates each of which is a candidate set of a prediction direction, a motion vector, and a reference picture index which are to be referenced in decoding of a current block, the fixed number being greater than or equal to two; an index obtaining unit configured to obtain, from the coded bitstream, an index for identifying a merging candidate among the fixed number of merging candidates, the identified merging candidate being a merging candidate to be referenced in the decoding of the current block; and a decoding unit configured to identify the merging candidate using the obtained index and decode the current block using the identified merging candidate, wherein the fixed number of merging candidates include: one or more first candidates each derived based on a prediction direction, a motion vector, and a reference picture index which have been used for decoding a neighboring block spatially or temporally neighboring the current block; and one or more second candidates having a predetermined fixed value.

An image coding apparatus according to an aspect of the present disclosure is an image coding apparatus which codes an image on a block-by-block basis to generate a coded bitstream, and includes: an merging candidate obtaining unit configured to obtain a fixed number of merging candidates each of which is a candidate set of a prediction direction, a motion vector, and a reference picture index to be referenced in decoding of a current block, the fixed number being greater than or equal to two; and a coding unit configured to attach, to the coded bitstream, an index for identifying a merging candidate among the fixed number of merging candidates, the identified merging candidate being a merging candidate to be referenced in the coding of the current block, wherein the fixed number of merging candidates include: one or more first candidates each derived based on a prediction direction, a motion vector, and a reference picture index which have been used for coding a neighboring block spatially or temporally neighboring the current block; and one or more second candidates having a predetermined fixed value.

An image coding and decoding apparatus according to an aspect of the present disclosure includes: the image decoding apparatus; and the image coding apparatus.

It should be noted that these general or specific aspects can be implemented as a system, a method, an integrated circuit, a computer program, a computer-readable recording medium such as a compact disc read-only memory (CD-ROM), or as any combination of a system, a method, an integrated circuit, a computer program, and a computer-readable recording medium.

An image coding apparatus and an image decoding apparatus according to an aspect of the present disclosure will be described specifically below with reference to the drawings.

Each of the exemplary embodiments described below shows a specific example for the present disclosure. The numerical values, shapes, materials, constituent elements, the arrangement and connection of the constituent elements, steps, the processing order of the steps etc. shown in the following exemplary embodiments are mere examples, and therefore do not limit the inventive concept in the present disclosure. Furthermore, among the constituent elements in the following exemplary embodiments, constituent elements not recited in any one of the independent claims defining the most generic part of the inventive concept are not necessarily required in order to overcome the disadvantages.

Embodiment 1

Figure 11:
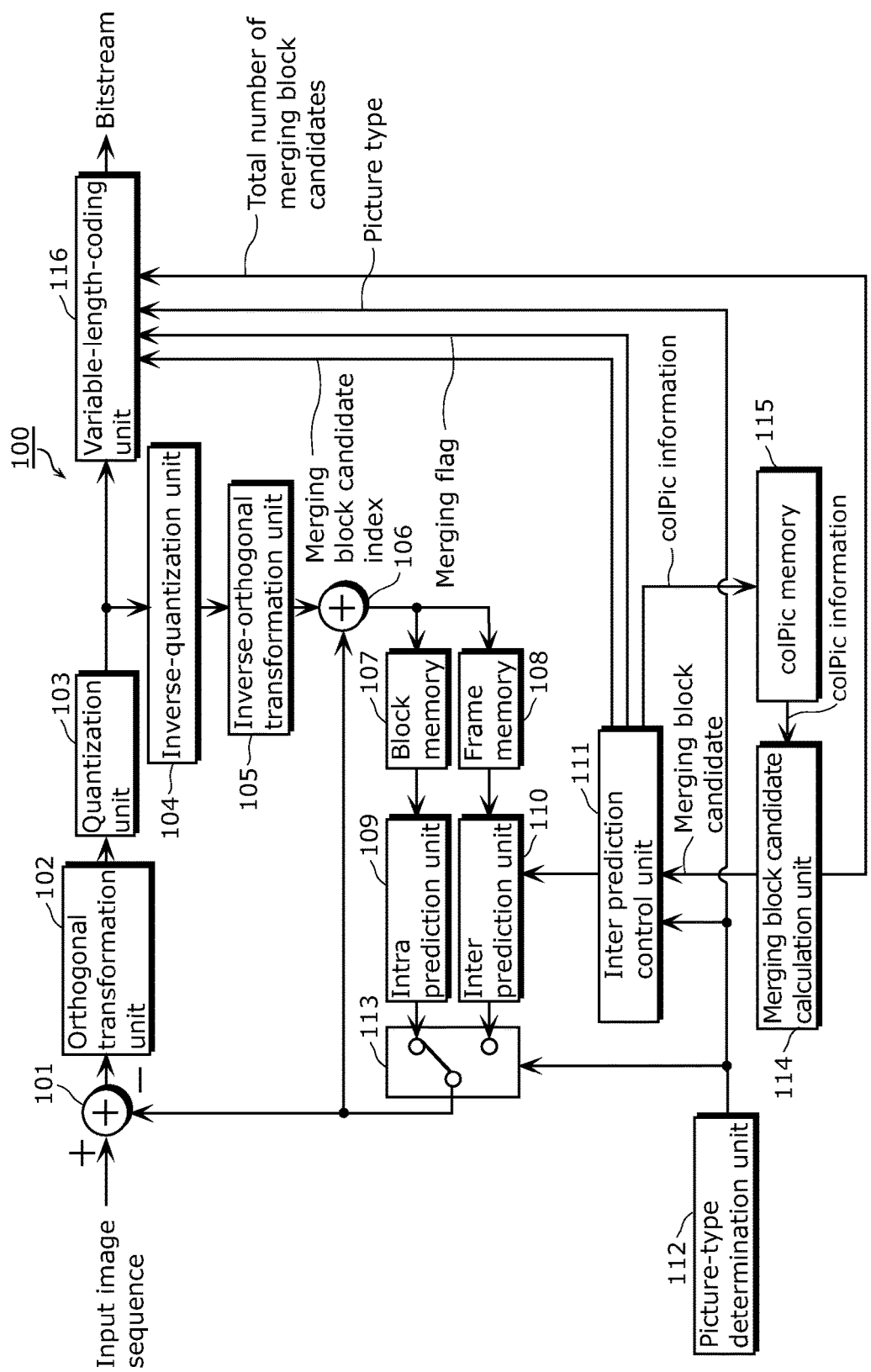
FIG. 11 is a block diagram showing a configuration of an image coding apparatus according to Embodiment 1.

An image coding apparatus using an image coding method according to Embodiment 1 will be described with reference to FIG. 11 to FIG. 18. FIG. 11 is a block diagram showing a configuration of an image coding apparatus according to Embodiment 1. An image coding apparatus 100 codes an image on a block-by-block basis to generate a bitstream.

As shown in FIG. 11, the image coding apparatus 100 includes a subtractor 101, an orthogonal transformation unit 102, a quantization unit 103, an inverse-quantization unit 104, an inverse-orthogonal-transformation unit 105, an adder 106, block memory 107, frame memory 108, an intra prediction unit 109, an inter prediction unit 110, an inter prediction control unit 111, a picture-type determination unit 112, a switch 113, a merging block candidate calculation unit 114, colPic memory 115, and a variable-length-coding unit 116.

The subtractor 101 subtracts, on a block-by-block basis, prediction picture data from input image data included in an input image sequence to generate prediction error data.

The orthogonal transformation unit 102 transforms the generated prediction error data from a picture domain into a frequency domain.

The quantization unit 103 quantizes the prediction error data transformed into a frequency domain.

The inverse-quantization unit 104 inverse-quantizes the prediction error data quantized by the quantization unit 103.

The inverse-orthogonal-transformation unit 105 transforms the inverse-quantized prediction error data from a frequency domain into a picture domain.

The adder 106 adds, on a block-by-block basis, prediction picture data and the prediction error data inverse-quantized by the inverse-orthogonal-transformation unit 105 to generate reconstructed image data.

The block memory 107 stores the reconstructed image data in units of a block.

The frame memory 108 stores the reconstructed image data in units of a frame.

The picture-type determination unit 112 determines in which of the picture types of I-picture, B-picture, and P-picture the input image data is to be coded. Then, the picture-type determination unit 112 generates picture-type information indicating the determined picture type.

The intra prediction unit 109 generates intra prediction picture data of a current block by performing intra prediction using reconstructed image data stored in the block memory 107 in units of a block.

The inter prediction unit 110 generates inter prediction picture data of a current block by performing inter prediction using reconstructed image data stored in the frame memory 108 in units of a frame and a motion vector derived by a process including motion estimation.

When a current block is coded by intra prediction coding, the switch 113 outputs intra prediction picture data generated by the intra prediction unit 109 as prediction picture data of the current block to the subtractor 101 and the adder 106. On the other hand, when a current block is coded by inter prediction coding, the switch 113 outputs inter prediction picture data generated by the inter prediction unit 110 as prediction picture data of the current block to the subtractor 101 and the adder 106.

The merging block candidate calculation unit 114 according to Embodiment 1 generates a merging block candidate list to include a fixed number of merging block candidates.

Specifically, the merging block candidate calculation unit 114 derives first candidates which are merging block candidates for merging mode using motion vectors and others of neighboring blocks of the current block and a motion vector and others of the co-located block (colPic information) stored in the colPic memory 115. Furthermore, the merging block candidate calculation unit 114 adds the derived merging block candidates to the merging block candidate list.

Furthermore, when the merging block candidate list has any empty entry, the merging block candidate calculation unit 114 selects a third candidate, which is a new candidate, from among predetermined merging block candidates to increase coding efficiency. Then, the merging block candidate calculation unit 114 adds the derived new candidate as a new merging block candidate to the merging block candidate list. Furthermore, the merging block candidate calculation unit 114 calculates the total number of the merging block candidates.

Furthermore, the merging block candidate calculation unit 114 assigns merging block candidate indexes each having a different value to the derived merging block candidates. Then, the merging block candidate calculation unit 114 transmits the merging block candidates and merging block candidate indexes to the inter prediction control unit 111. Furthermore, the merging block candidate calculation unit 114 transmits the calculated total number of the merging block candidates to the variable-length-coding unit 116.

The inter prediction control unit 111 selects a prediction mode using which prediction error is the smaller from a prediction mode in which a motion vector derived by motion estimation is used (motion estimation mode) and a prediction mode in which a motion vector derived from a merging block candidate is used (merging mode). The inter prediction control unit 111 also transmits a merging flag indicating whether or not the selected prediction mode is the merging mode to the variable-length-coding unit 116. Furthermore, the inter prediction control unit 111 transmits a merging block candidate index corresponding to the determined merging block candidates to the variable-length-coding unit 116 when the selected prediction mode is the merging mode. Furthermore, the inter prediction control unit 111 transfers the colPic information including the motion vector and others of the current block to the colPic memory 115.

The variable-length-coding unit 116 generates a bitstream by performing variable-length coding on the quantized prediction error data, the merging flag, and the picture-type information. The variable-length-coding unit 116 also sets the total number of merging block candidates as the size of the merging block candidate list. Furthermore, the variable-length-coding unit 116 performs variable-length coding on a merging block candidate index to be used in coding, by assigning, according to the size of the merging block candidate list, a bit sequence to the merging block candidate index.

Figure 12:
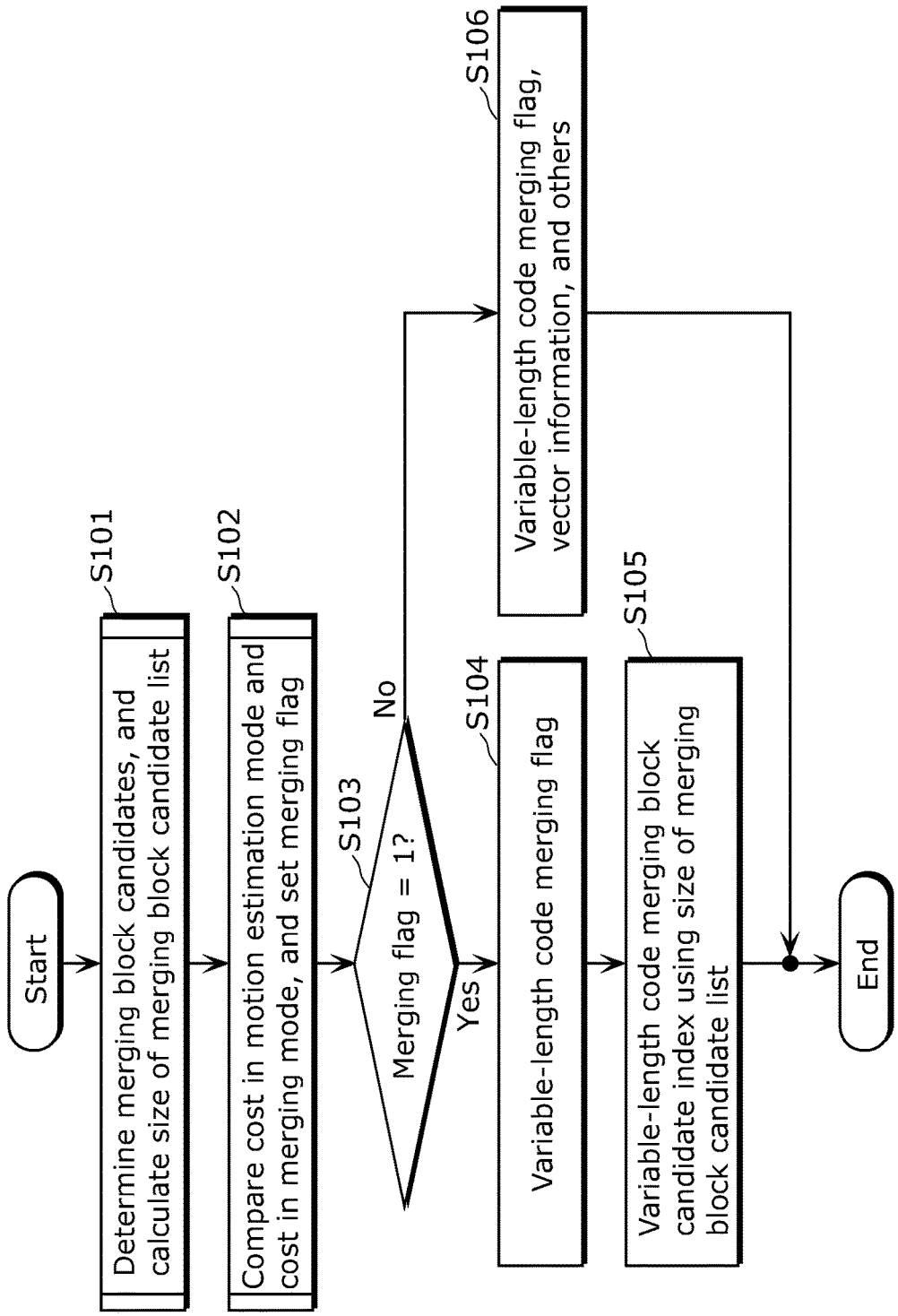
FIG. 12 is a flowchart showing processing operations of the image coding apparatus according to Embodiment 1.

FIG. 12 is a flowchart showing processing operations of the image coding apparatus 100 according to Embodiment 1.

In Step S101, the merging block candidate calculation unit 114 derives merging block candidates from neighboring blocks and a co-located block of a current block. Furthermore, the merging block candidate calculation unit 114 calculates the size of a merging block candidate list using a method described later when the size of the merging block candidate list is set variable.

For example, in the case shown in FIG. 3, the merging block candidate calculation unit 114 selects the neighboring blocks A to D as merging block candidates. Furthermore, the merging block candidate calculation unit 114 calculates, as a merging block candidate, a co-located merging block having a motion vector, a reference picture index, and a prediction direction which are calculated from the motion vector of a co-located block using the time prediction mode.

The merging block candidate calculation unit 114 assigns merging block candidate indexes to the respective merging block candidates. (a) in FIG. 13A is a table of a merging block candidate list in which merging block candidate indexes are assigned to neighboring blocks. The left column of the merging block candidate list in (a) in FIG. 13A lists merging block candidate indexes. The right column lists sets of a prediction directions, reference picture indexes, and motion vectors. Furthermore, using a method described later, the merging block candidate calculation unit 114 removes unusable-for-merging candidates and identical candidates and adds new candidates to update the merging block candidate list, and calculates the size of the merging block candidate list. (b) in FIG. 13A is a merging block candidate list after removing an unusable-for-merging candidate and an identical candidate and adding a new candidate. The neighboring block A and the neighboring block D are identical and the neighboring block D is removed in Embodiment 1, but the neighboring block A may be removed instead.

Shorter codes are assigned to merging block candidate indexes of smaller values. In other words, the smaller the value of a merging block candidate index, the smaller the amount of information necessary for indicating the merging block candidate index.

On the other hand, the larger the value of a merging block candidate index, the larger the amount of information necessary for the merging block candidate index. Therefore, coding efficiency will be increased when merging block candidate indexes of smaller values are assigned to merging block candidates which are more likely to have motion vectors of higher accuracy and reference picture indexes of higher accuracy.

Therefore, there may be case in which the merging block candidate calculation unit 114 counts the total number of times of selection of each merging block candidates as a merging block, and assigns merging block candidate indexes of smaller values to blocks with a larger total number of the times. Specifically, this can be achieved by specifying a merging block selected from neighboring blocks and assigning a merging block candidate index of a smaller value to the specified merging block when a current block is coded.

When a merging block candidate does not have information such as a motion vector (for example, when the merging block has been a block coded by intra prediction, it is located outside the boundary of a picture or the boundary of a slice, or it is yet to be coded), the merging block candidate is unusable for coding.

In Embodiment 1, such a merging block candidate unusable for coding is referred to as an unusable-for-merging candidate, and a merging block candidate usable for coding is referred to as a usable-for-merging candidate. In addition, among a plurality of merging block candidates, a merging block candidate identical in motion vector, reference picture index, and prediction direction to any other merging block is referred to as an identical candidate.

In the case shown in FIG. 3, the neighboring block C is an unusable-for-merging candidate because it is a block coded by intra prediction. The neighboring block D is an identical candidate because it is identical in motion vector, reference picture index, and prediction direction to the neighboring block A.

In Step S102, the inter prediction control unit 111 selects a prediction mode based on comparison, using a method described later, between prediction error of a prediction picture generated using a motion vector derived by motion estimation and prediction error of a prediction picture generated using a motion vector obtained from a merging block candidate. When the selected prediction mode is the merging mode, the inter prediction control unit 111 sets the merging flag to 1, and when not, the inter prediction control unit 111 sets the merging flag to 0.

In Step S103, whether or not the merging flag is 1 (that is, whether or not the selected prediction mode is the merging mode) is determined.

When the result of the determination in Step S103 is true (Yes, S103), the variable-length-coding unit 116 attaches the merging flag to a bitstream in Step S104. Subsequently, in Step S105, the variable-length-coding unit 116 assigns bit sequences according to the size of the merging block candidate list as shown in FIG. 5 to the merging block candidate indexes of merging block candidates to be used for coding. Then, the variable-length-coding unit 116 performs variable-length coding on the assigned bit sequence.

On the other hand, when the result of the determination in Step S103 is false (S103, No), the variable-length-coding unit 116 attaches information on a merging flag and a motion estimation vector mode to a bitstream in Step S106.

In Embodiment 1, a merging block candidate index having a value of "0" is assigned to the neighboring block A as shown in (a) in FIG. 13A. A merging block candidate index having a value of "1" is assigned to the neighboring block B. A merging block candidate index having a value of "2" is assigned to the co-located merging block. A merging block candidate index having a value of "3" is assigned to the neighboring block C. A merging block candidate index having a value of "4" is assigned to the neighboring block D.

It should be noted that the merging block candidate indexes having such a value may be assigned otherwise. For example, when a new candidate is added using a method described later, the variable-length-coding unit 116 may assign smaller values to preexistent merging block candidates and a larger value to the new candidate. In other words, the variable-length-coding unit 116 may assign a merging block candidate index of a smaller value to a preexistent merging block candidate in priority to a new candidate.

Furthermore, merging block candidates are not limited to the blocks at the positions of the neighboring blocks A, B, C, and D. For example, a neighboring block located above the lower left neighboring block D can be used as a merging block candidate. Furthermore, it is not necessary to use all the neighboring blocks as merging block candidates. For example, it is also possible to use only the neighboring blocks A and B as merging block candidates.

Furthermore, although the variable-length-coding unit 116 attaches a merging block candidate index to a bitstream in Step S105 in FIG. 12 in Embodiment 1, attaching such a merging block candidate index to a bitstream is not always necessary. For example, the variable-length-coding unit 116 need not attach a merging block candidate index to a bitstream when the size of the merging block candidate list is "1". The amount of information on the merging block candidate index is thereby reduced.

Figure 14A:
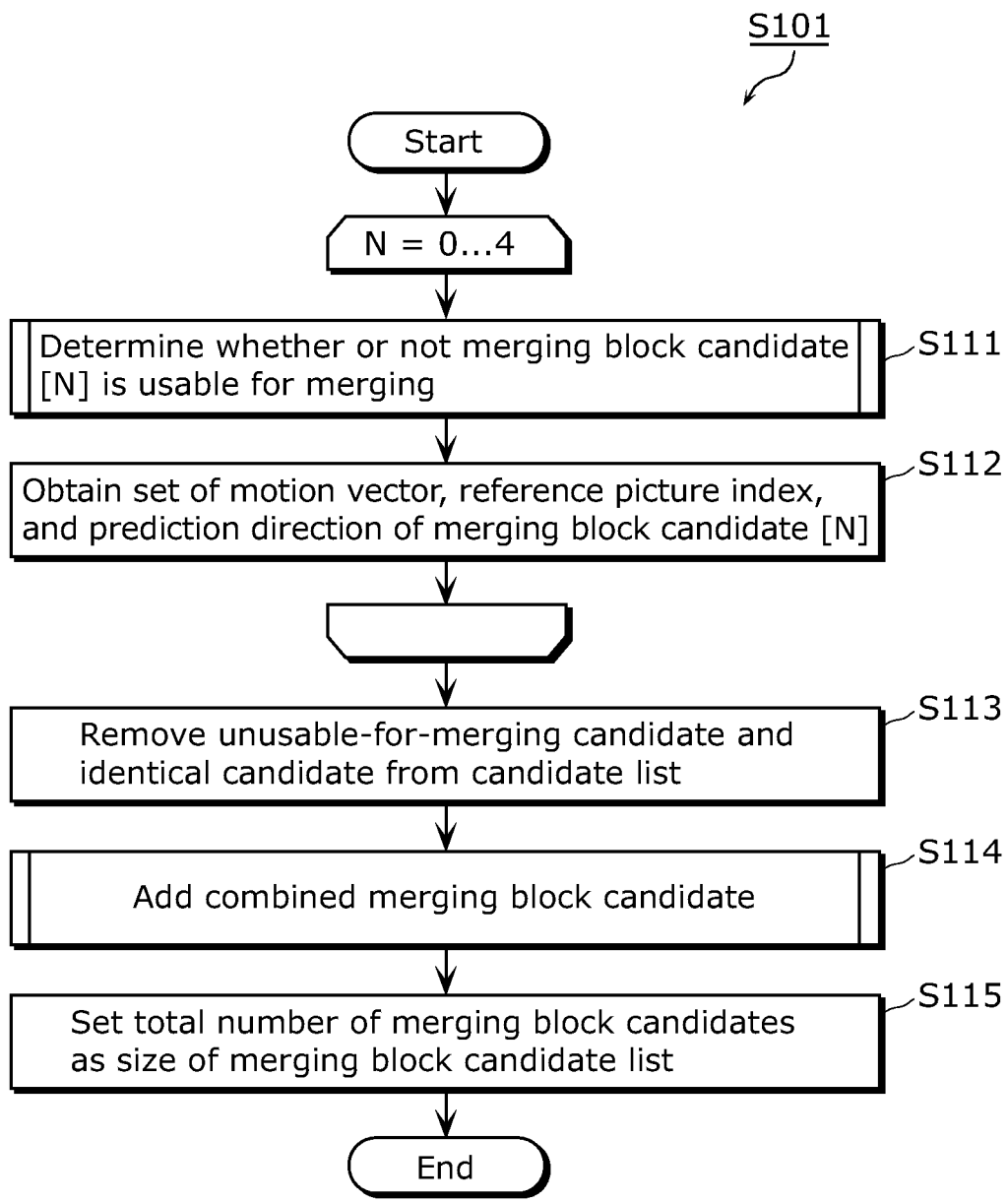
FIG. 14A is a flowchart illustrating a process for calculating merging block candidates and the size of a merging block candidate list according to Embodiment 1.

FIG. 14A is a flowchart showing details of the process in Step S101 in FIG. 12. Specifically, FIG. 14A illustrates a method of calculating merging block candidates and the size of a merging block candidate list. FIG. 14A will be described below.

Before the process shown in FIG. 14A, the merging block candidate calculation unit 114 assigns index values to the neighboring blocks (the neighboring blocks A to D and the co-located merging block) as shown in (a) in FIG. 13A.

Here, N denotes an index value for identifying a merging block candidate. In Embodiment 1, N takes values from 0 to 4. Specifically, the neighboring block A in FIG. 3 is assigned to a merging block candidate [0]. The neighboring block B in FIG. 3 is assigned to a merging block candidate [1]. The co-located merging block is assigned to a merging block candidate [2]. The neighboring block C in FIG. 3 is assigned to a merging block candidate [3]. The neighboring block D in FIG. 3 is assigned to a merging block candidate [4].

After assigning the index values to the neighboring blocks, the merging block candidate calculation unit 114 determines whether or not each of the merging block candidates [0] to [4] is usable for merging (Step S111), and obtains information on the merging block candidates [0] to [4] to enter in the right column of the merging block candidate list shown in FIG. 13A (Step S112).

In Step S111, the merging block candidate calculation unit 114 determines whether or not the merging block candidate [N] is a usable-for-merging candidate using a method described later, and derives the total number of merging block candidates.

In Step S112, the merging block candidate calculation unit 114 obtains a set of a motion vector, a reference picture index, and a prediction direction of the merging block candidate [N], and adds them to a merging block candidate list (the right column).

In Step S113, the merging block candidate calculation unit 114 searches the merging block candidate list for any unusable-for-merging candidate and identical candidate, and removes the unusable-for-merging candidate and identical candidate from the merging block candidate list as shown in (b) in FIG. 13A. Furthermore, the merging block candidate calculation unit 114 subtracts the total number of the removed identical candidates from the total number of the merging block candidates.

In Step S114, the merging block candidate calculation unit 114 adds a new candidate (third candidate) to the merging block candidate list using a method described later. Here, when the new candidate is added, merging block candidate indexes may be reassigned so that the merging block candidate indexes of smaller values are assigned to preexistent merging block candidates in priority to the new candidate. In other words, the merging block candidate calculation unit 114 may reassign the merging block candidate indexes so that a merging block candidate index of a larger value is assigned to the new candidate. The amount of code of merging block candidate indexes is thereby reduced.

In Step S115, the merging block candidate calculation unit 114 sets the total number of merging block candidates after the adding of the new candidate as the size of the merging block candidate list. In the example shown in (b) in FIG. 13A, the total number of merging block candidates is calculated to be "5", and the size of the merging block candidate list is set at "5". It should be noted that when the size of the merging block candidate list is set not variable but at a fixed number, for example, a number greater than or equal to two, the fixed number greater than or equal to two is set as the size of the merging block candidate list.

The new candidate in Step S114 is a candidate newly added to merging block candidates using a method described later when the total number of merging block candidates is smaller than a maximum number of merging block candidates. Examples of such a new candidate include a neighboring block located above the lower-left neighboring block D in FIG. 3, a block which is included in a reference picture including a co-located block and corresponds to one of the neighboring blocks A, B, C, and D, and a block having values statistically obtained from motion vectors, reference picture indexes, and prediction directions of the whole or a certain region of a reference picture. Examples of such a new candidate further include a zero candidate which has a motion vector having a value of zero for each referable reference picture. Examples of such a new candidate further include a bi-predictive merging block candidate which is a combination of a set of a motion vector and a reference picture index for a prediction direction 0 of one of derived merging block candidates and a set of a motion vector and a reference picture index for a prediction direction 1 of a different one of the derived merging block candidates. Such a bi-predictive merging block candidate is hereinafter referred to as a combined merging block.

In this manner, when the total number of merging block candidates is smaller than a maximum number of merging block candidates, the image coding apparatus 100 adds a new candidate so that coding efficiency can be increased.

Figure 15A:
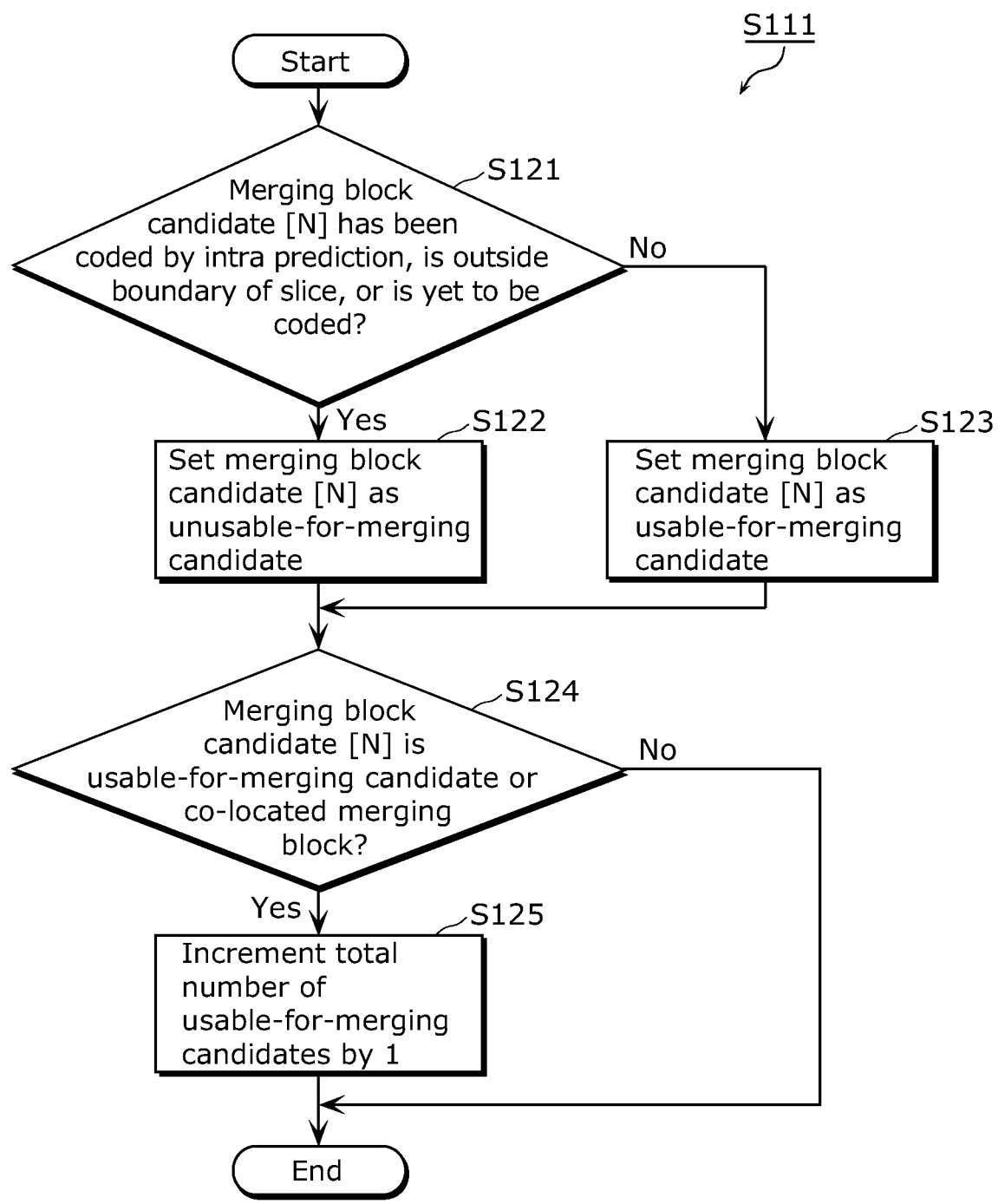
FIG. 15A is a flowchart illustrating a process for determining whether or not a merging block candidate is a usable-for-merging candidate and updating the total number of usable-for-merging candidates according to Embodiment 1.

FIG. 15A is a flowchart showing details of the process in Step S111 in FIG. 14A. Specifically, FIG. 15A illustrates a method of determining whether or not a merging block candidate [N] is a usable-for-merging candidate and updating the total number of usable-for-merging candidates. FIG. 15A will be described below.

In Step S121, the merging block candidate calculation unit 114 determines whether it is true or false that (1) a merging block candidate [N] has been coded by intra prediction, (2) the merging block candidate [N] is a block outside the boundary of a slice including the current block or the boundary of a picture including the current block, or (3) the merging block candidate [N] is yet to be coded.

When the result of the determination in Step 121 is true (Step S121, Yes), the merging block candidate calculation unit 114 sets the merging block candidate [N] as an unusable-for-merging candidate in Step S122. On the other hand, when the result of the determination in Step S121 is false (Step S121, No), the merging block candidate calculation unit 114 sets the merging block candidate [N] as a usable-for-merging candidate in Step S123.

In Step S124, the merging block candidate calculation unit 114 determines whether it is true or false that the merging block candidate [N] is either a usable-for-merging candidate or a co-located merging block candidate.

Here, when the result of the determination in Step S124 is true (Step S124, Yes), the merging block candidate calculation unit 114 updates the total number of merging block candidates by incrementing it by one in Step S125. When the result of the determination in Step S124 is false (Step S124, No), the merging block candidate calculation unit 114 does not update the total number of merging block candidates.

In this manner, when a co-located merging block is calculated as a merging block candidate, the merging block candidate calculation unit 114 according to Embodiment 1 increments the total number of merging block candidates by one regardless of whether the co-located block is a usable-for-merging candidate or an unusable-for-merging candidate. This prevents discrepancy in the total number of merging block candidates between the image coding apparatus and the image decoding apparatus even when information on a co-located merging block is lost due to an incident such as packet loss. In Step S115 in FIG. 14A, the merging block candidate calculation unit 114 sets the total number of merging block candidates as the size of the merging block candidate list. Furthermore, in Step S105 in FIG. 12, the merging block candidate calculation unit 114 performs variable-length coding on a merging block candidate index by assigning a bit sequence according to the size of the merging block candidate list. This makes it possible to generate a bitstream which can be normally decoded so that a merging block candidate index can be obtained even when information on reference picture including a co-located block is lost.

Figure 16:
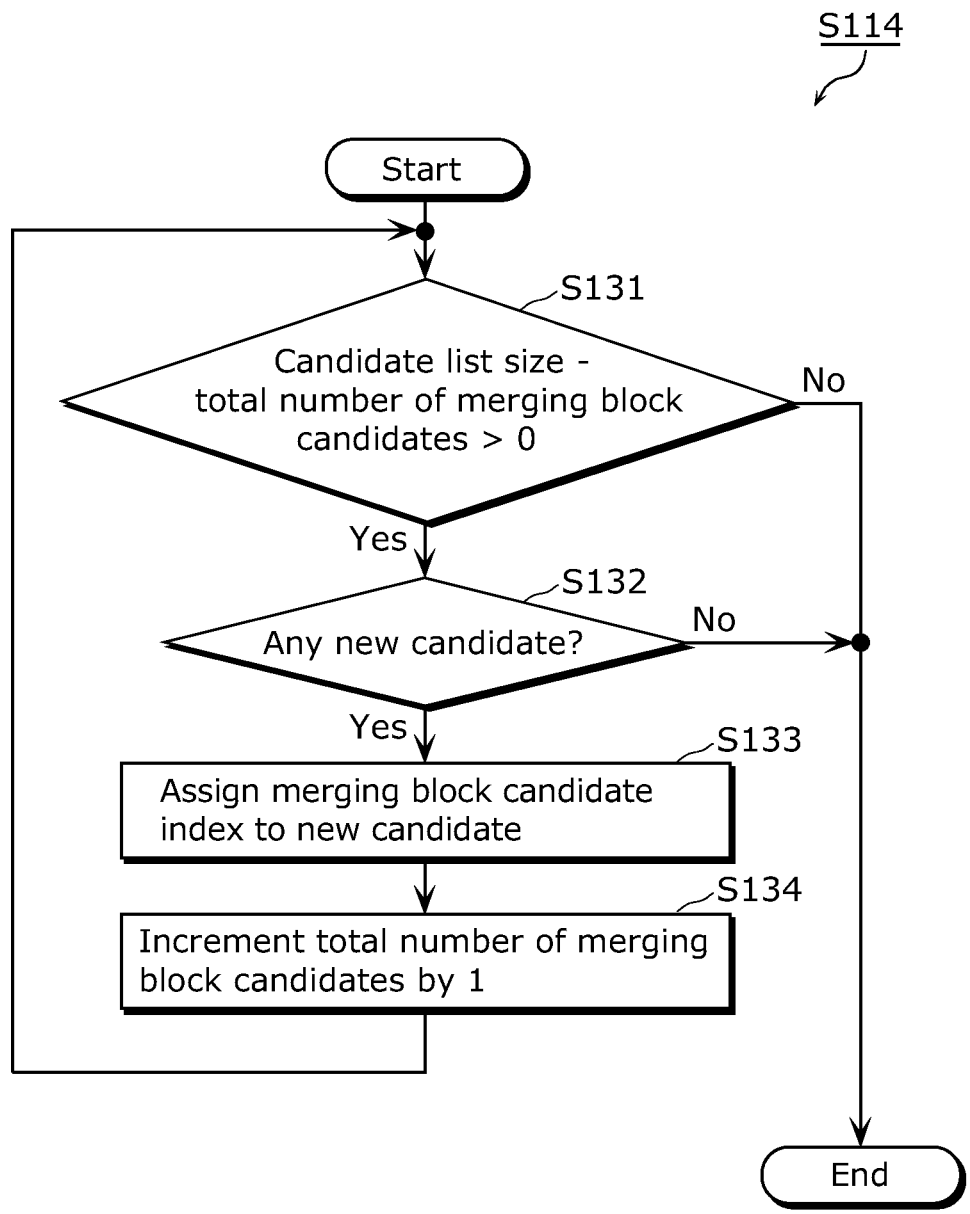
FIG. 16 is a flowchart illustrating a process for adding a new candidate according to Embodiment 1.

FIG. 16 is a flowchart showing details of the process in Step S114 in FIG. 14A. Specifically, FIG. 16 illustrates a method of adding a new candidate (third candidate) to increase coding efficiency. FIG. 16 will be described below.

In Step S131, the merging block candidate calculation unit 114 determines whether or not the total number of merging block candidates is smaller than the size of the merging block candidate list. More specifically, when the size of the merging block candidate list is variable, the merging block candidate calculation unit 114 determines whether or not the total number of merging block candidates is smaller than a maximum value of the candidate list size (a maximum number of merging block candidates). On the other hand, when the size of the merging block candidate list is invariable (the size of the merging block candidate list is a fixed number greater than or equal to two), the merging block candidate calculation unit 114 determines whether or not the total number of merging block candidates is smaller than the fixed number greater than or equal to two.

Here, when the result of the determination in Step S131 is true (Step S131, Yes), in Step S132, the merging block candidate calculation unit 114 determines whether or not there is a new candidate which can be added as a merging block candidate to the merging block candidate list.

The new candidate is a prepared candidate, such as a zero candidate which has a motion vector having a value of zero for each referable reference picture. In this case, the total number of referable reference pictures is the total number of candidates which can be added as new candidates. The new candidate may be a candidate other than such a zero candidate, such as a combined candidate as described above.

When the result of the determination in Step S132 is true (Step S132, Yes), the merging block candidate calculation unit 114 assigns a merging block candidate index having a value to the new candidate and adds the new candidate to the merging block candidate list in Step S133.

Furthermore, in Step S134, the merging block candidate calculation unit 114 increments the total number of merging block candidates by one.

On the other hand, when the result of the determination in Step S131 or in Step S132 is false (Step S131 or Step S132, No), the process for adding a new candidate ends. In other words, when the total number of merging block candidates reaches the maximum number of merging block candidates or when there is no more new candidate (that is, all new candidates have been added as merging block candidates to the candidate list), the process for adding a new candidate ends.

Figure 18:
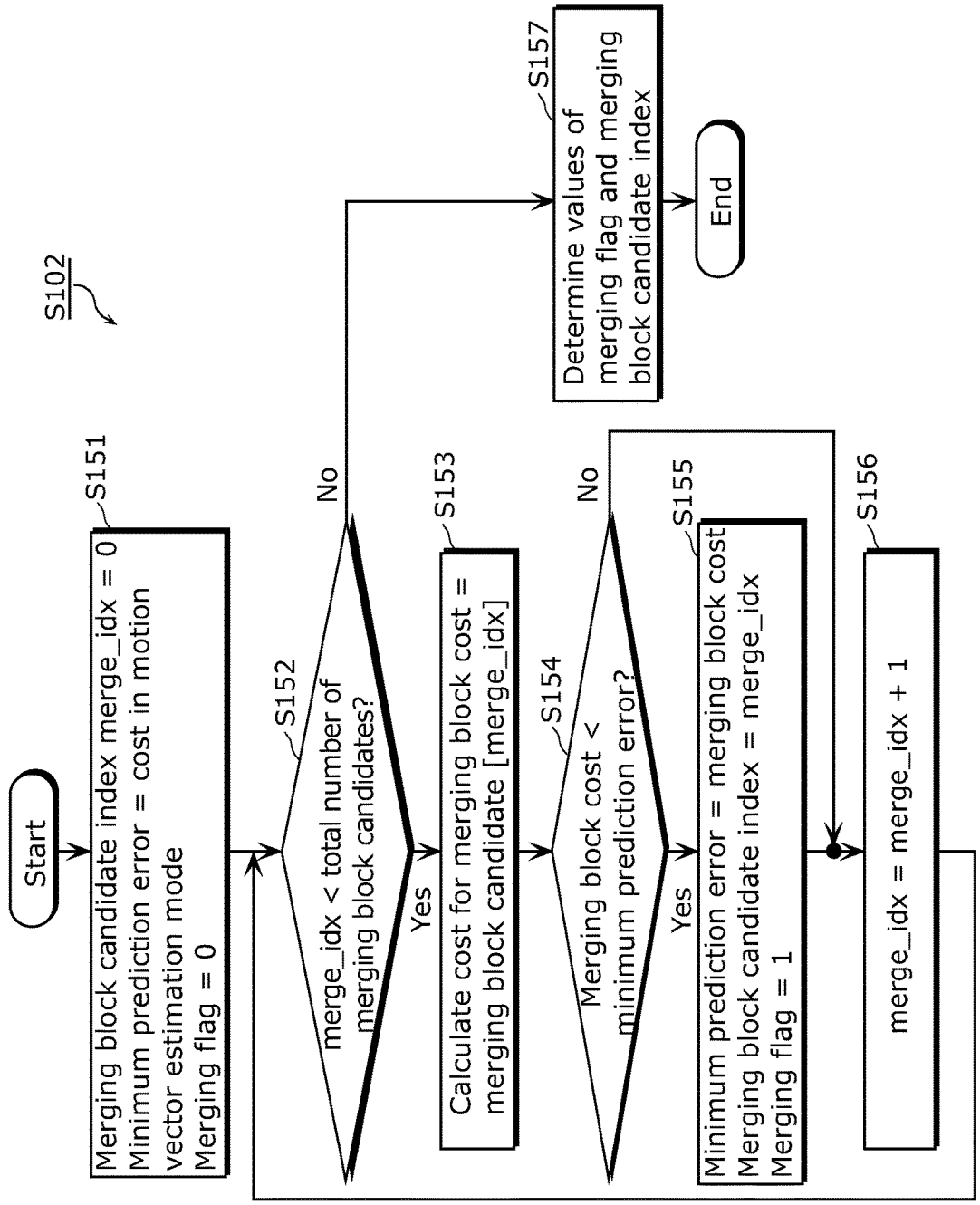
FIG. 18 is a flowchart illustrating a process for selecting a merging block candidate according to Embodiment 1.

FIG. 18 is a flowchart showing details of the process in Step S102 in FIG. 12. Specifically, FIG. 18 illustrates a process for selecting a merging block candidate. FIG. 18 will be described below.

In Step S151, the inter prediction control unit 111 sets a merging block candidate index at 0, the minimum prediction error at the prediction error (cost) in the motion vector estimation mode, and a merging flag at 0. Here, the cost is calculated using the following equation for an R-D optimization model, for example.

$$\text{Cost} = D + \lambda R \qquad \text{(Equation 1)}$$

In Equation 1, D denotes coding distortion. For example, D is the sum of absolute differences between original pixel values of a current block to be coded and pixel values obtained by coding and decoding of the current block using a prediction picture generated using a motion vector. R denotes the amount of generated codes. For example, R is the amount of code necessary for coding a motion vector used for generation of a prediction picture. λ denotes an undetermined Lagrange multiplier.

In Step S152, the inter prediction control unit 111 determines whether or not the value of a merging block candidate index is smaller than the total number of merging block candidates of a current block. In other words, the inter prediction control unit 111 determines whether or not there is still a merging block candidate on which the process from Step S153 to Step S155 has not been performed yet.

When the result of the determination in Step S152 is true (S152, Yes), in Step S153, the inter prediction control unit 111 calculates the cost for a merging block candidate to which a merging block candidate index is assigned. Then, in Step S154, the inter prediction control unit 111 determines whether or not the calculated cost for a merging block candidate is smaller than the minimum prediction error.

Here, when the result of the determination in Step S154 is true, (S154, Yes), the inter prediction control unit 111 updates the minimum prediction error, the merging block candidate index, and the value of the merging flag in Step S155. On the other hand, when the result of the determination in Step S154 is false (S154, No), the inter prediction control unit 111 does not update the minimum prediction error, the merging block candidate index, or the value of the merging flag.

In Step S156, the inter prediction control unit 111 increments the merging block candidate index by one, and repeats from Step S152 to Step S156.

On the other hand, when the result of the determination in Step S152 is false (S152, No), that is, there is no more unprocessed merging block candidate, the inter prediction control unit 111 fixes the final values of the merging flag and merging block candidate index in Step S157.

Thus, the image coding apparatus 100 according to Embodiment 1 calculates the size of a merging block candidate list for use in coding or decoding of a merging block candidate index, using a method independent of information on reference pictures including a co-located block so that error resistance can be enhanced. More specifically, in the image coding apparatus 100 according to Embodiment 1, the total number of merging block candidates is incremented by one for each co-located merging block regardless of whether the co-located merging block is a usable-for-merging candidate or an unusable-for-merging candidate. Then, bit sequences to be assigned to merging block candidate indexes are determined according to the total number of merging block candidates. This allows the image coding apparatus 100 and the image decoding apparatus 300 to have the same total number of merging block candidates so that a bitstream can be normally decoded to obtain a merging block candidate index even when information on reference picture including a co-located block is lost. Thus, when the total number of merging block candidates is smaller than the total number of usable-for-merging candidates, a new candidate having a new set of a motion vector, a reference picture index, and a prediction direction is added so that coding efficiency can be increased.

It should be noted that Embodiment 1 in which the total number of merging block candidates is incremented by one only for each co-located merging block regardless of whether the co-located merging block is a usable-for-merging candidate or an unusable-for-merging candidate as shown in Step S125 and Step S126 in FIG. 15A, is not limiting. The total number of merging block candidates may be incremented by one for any other block regardless of whether the block is a usable-for-merging candidate or an unusable-for-merging candidate.

Optionally, in Embodiment 1, when the size of a merging block candidate list is a fixed number greater than or equal to two, the fixed number greater than or equal to two may be set as a maximum value Max of the total number of merging block candidates. In other words, merging block candidate indexes may be coded using the size of a merging block candidate list fixed at a maximum value Max of the total number of merging block candidates on the assumption that the merging block candidates which are neighboring blocks are all usable-for-merging candidates. For example, in Embodiment 1, the maximum value Max of the total number of merging block candidates is 5 (neighboring block A, neighboring block B, co-located merging block, neighboring block C, and neighboring block D). In this case, merging block candidate indexes may be coded using the size of a merging block candidate list fixedly set at "5".

Optionally, for example, when the maximum value Max of the total number of merging block candidates is set at 4 (neighboring block A, neighboring block B, neighboring block C, and neighboring block D) for a current picture which is to be coded without referencing a co-located merging block (a B-picture or a P-picture to be coded with reference to an I-picture), merging block candidate indexes may be coded using the size of a merging block candidate list fixedly set at "4".

In this manner, when the size of a merging block candidate list is a fixed number greater than or equal to two, a maximum value Max of the total number of merging block candidates may be set at the fixed number greater than or equal to two to determine the size of the merging block candidate list according to the fixed number greater than or equal to two. In this case, the image coding apparatus 100 performs variable-length coding using the fixed number greater than or equal to two in Step S105 in FIG. 12.

It is therefore possible to generate a bitstream from which a variable-length-decoding unit of an image decoding apparatus can decode a merging block candidate index without referencing information on a neighboring block or on a co-located block, so that computational complexity for the variable-length-decoding unit can be reduced. Furthermore, for example, a fixed number greater than or equal to two (for example, a maximum value Max of the total number of merging block candidates) may be embedded in a sequence parameter set (SPS), a picture parameter set (PPS), a slice header, or the like. This makes it possible to switch between fixed numbers greater than or equal to two for each current picture so that computational complexity can be reduced and coding efficiency can be increased.

It should be noted that the example described in Embodiment 1 in which merging flag is always attached to a bitstream in merging mode is not limiting. For example, the merging mode may be forcibly selected based on the shape of a reference block for use in inter prediction of a current block. In this case, the amount of information can be reduced by attaching no merging flag to a bitstream.

It should be noted that the example described in Embodiment 1 where the merging mode is used in which a current block is coded using a prediction direction, a motion vector, and a reference picture index copied from a neighboring block of the current block is not limiting. For example, a skip merging mode may be used. In the skip merging mode, a current block is coded with reference to a merging block candidate list created as shown in (b) in FIG. 13A, using a prediction direction, a motion vector, and a reference picture index copied from a neighboring block of the current block in the same manner as in the merging mode. When all resultant prediction errors are zero for the current block, a skip flag set at 1 and the skip flag and a merging block candidate index are attached to a bitstream. When any of the resultant prediction errors is non-zero, a skip flag is set at 0 and the skip flag, a merging flag, a merging block candidate index, and data of the prediction errors are attached to a bitstream.

It should be noted that the example described in Embodiment 1 where the merging mode is used in which a current block is coded using a prediction direction, a motion vector, and a reference picture index copied from a neighboring block of the current block is not limiting. For example, a motion vector in the motion vector estimation mode may be coded using a merging block candidate list created as shown in (b) in FIG. 13A. Specifically, a difference is calculated by subtracting a motion vector of a merging block candidate indicated by a merging block candidate index from a motion vector in the motion vector estimation mode. Furthermore, the calculated difference and the merging block candidate index may be attached to a bitstream.

Optionally, a difference may be calculated by scaling a motion vector MV_Merge of a merging block candidate using a reference picture index RefIdx_ME in the motion estimation mode and a reference picture index RefIdx_Merge of the merging block candidate and subtracting a motion vector scaledMV_Merge of the merging block candidate after the scaling from the motion vector in the motion estimation mode. Furthermore, the calculated difference and the merging block candidate index may be attached to a bitstream. The following is an exemplary formula for the scaling.

(Equation 2)

$$scaledMV\_Merge = MV\_Merge \times (POC(RefIdx\_ME) - curPOC)/(POC(RefIdx\_Merge) - curPOC) \quad (2)$$

Here, POC (RefIdx_ME) denotes the display order of a reference picture indicated by a reference picture index RefIdx_ME. POC (RefIdx_Merge) denotes the display order of a reference picture indicated by a reference picture index RefIdx_Merge. curPOC denotes the display order of a current picture to be coded.

It should be noted that the variable-length coding (see FIG. 5) which is performed in Embodiment 1 according to the size of a merging block candidate list in Step S105 in FIG. 12 may be performed optionally according to another parameter such as the total number of merging block candidates calculated as the total number of usable-for-merging candidates which is the sum of the total number of first candidates and the total number of identical candidates calculated in Step S111 (detailed in FIG. 15A) in FIG. 14A.

Embodiment 2

Figure 19:
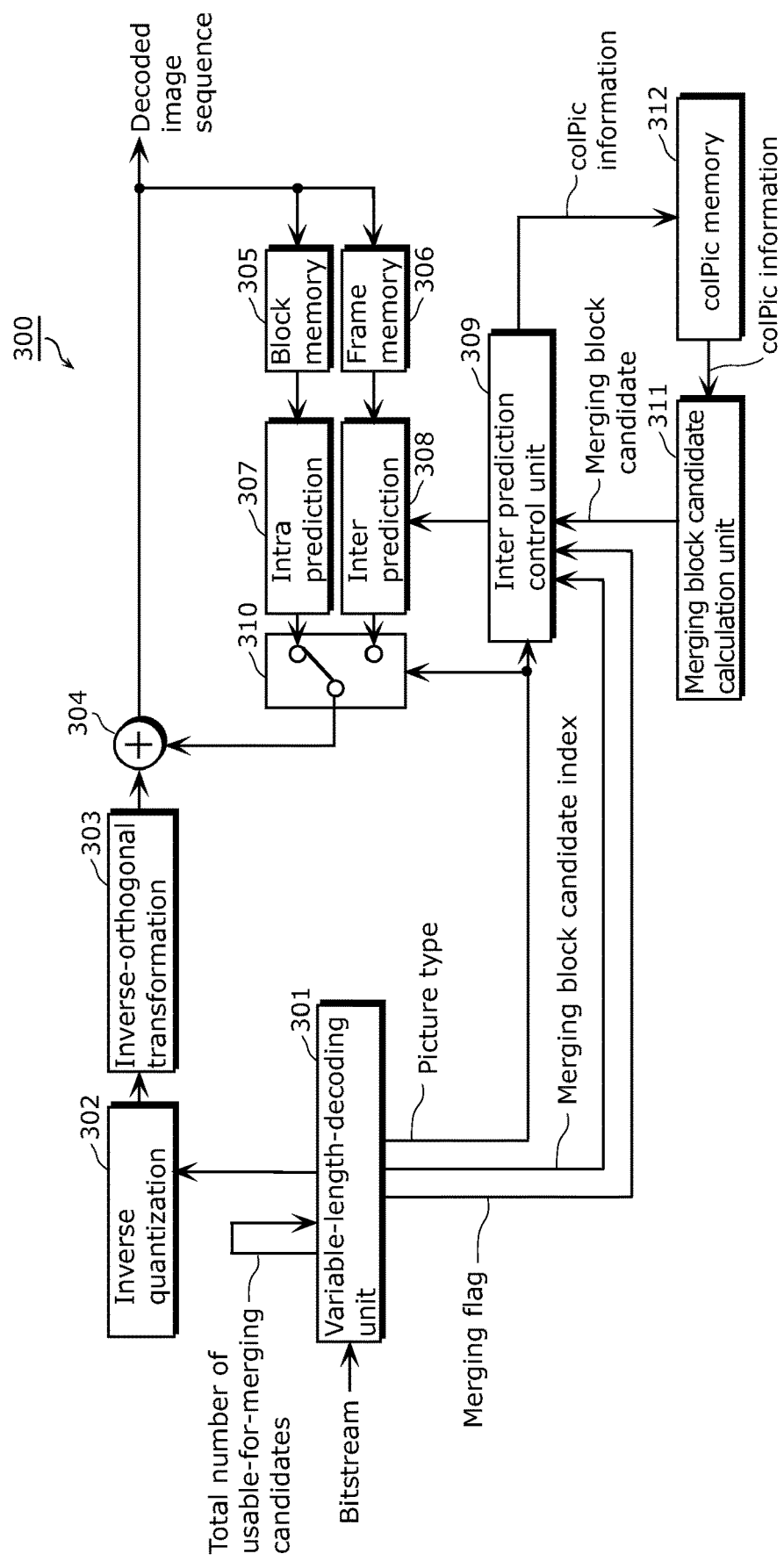
FIG. 19 is a block diagram showing a configuration of an image decoding apparatus according to Embodiment 2.

An image decoding apparatus using an image decoding method according to Embodiment 2 will be described with reference to FIG. 19 to FIG. 22. FIG. 19 is a block diagram showing a configuration of an image decoding apparatus 300 according to Embodiment 2. The image decoding apparatus 300 is an apparatus corresponding to the image coding apparatus 100 according to Embodiment 1. Specifically, for example, the image decoding apparatus 300 decodes, on a block-by-block basis, coded images included in a bitstream generated by the image coding apparatus 100 according to Embodiment 1.

As shown in FIG. 19, the image decoding apparatus 300 includes a variable-length-decoding unit 301, an inverse-quantization unit 302, an inverse-orthogonal-transformation unit 303, an adder 304, block memory 305, frame memory 306, an intra prediction unit 307, an inter prediction unit 308, an inter prediction control unit 309, a switch 310, a merging block candidate calculation unit 311, and colPic memory 312.

The variable-length-decoding unit 301 generates picture-type information, a merging flag, and a quantized coefficient by performing variable-length decoding on an input bitstream. Furthermore, the variable-length-decoding unit 301 performs variable-length decoding on a merging block candidate index using the total number of merging block candidates calculated by the merging block candidate calculation unit 311.

The inverse-quantization unit 302 inverse-quantizes the quantized coefficient obtained by the variable-length decoding.

The inverse-orthogonal-transformation unit 303 generates prediction error data by transforming an orthogonal transformation coefficient obtained by the inverse quantization from a frequency domain to a picture domain.

The block memory 305 stores, in units of a block, decoded image data generated by adding the prediction error data and prediction picture data.

The frame memory 306 stores decoded image data in units of a frame.

The intra prediction unit 307 generates prediction picture data of a current block to be decoded, by performing intra prediction using the decoded image data stored in the block memory 305 in units of a block.

The inter prediction unit 308 generates prediction picture data of a current block to be decoded, by performing inter prediction using the decoded image data stored in the frame memory 306 in units of a frame.

When a current block is decoded by intra prediction decoding, the switch 310 outputs intra prediction picture data generated by the intra prediction unit 307 as prediction picture data of the current block to the adder 304. On the other hand, when a current block is decoded by inter prediction decoding, the switch 310 outputs inter prediction picture data generated by the inter prediction unit 308 as prediction picture data of the current block to the adder 304.

The merging block candidate calculation unit 311 derives merging block candidates from motion vectors and others of neighboring blocks of the current block and a motion vector and others of a co-located block (colPic information) stored in the colPic memory 312. Furthermore, the merging block candidate calculation unit 311 adds the derived merging block candidate to a merging block candidate list.

Furthermore, using a method described later, the merging block candidate calculation unit 311 derives, for example, a merging block candidate having a prediction direction, a motion vector, and a reference picture index for a stationary region as a new candidate (third candidate) for increasing coding efficiency. Then, the merging block candidate calculation unit 311 adds the derived new candidate as a new merging block candidate to the merging block candidate list. Furthermore, the merging block candidate calculation unit 311 calculates the total number of merging block candidates when the size of the merging block candidate list is variable.

Furthermore, the merging block candidate calculation unit 311 assigns merging block candidate indexes each having a different value to the derived merging block candidates. Then, the merging block candidate calculation unit 311 transmits the merging block candidates to which the merging block candidate indexes have been assigned to the inter prediction control unit 309. Furthermore, the merging block candidate calculation unit 311 transmits the calculated total number of merging block candidates to the variable-length-decoding unit 301 when the size of the merging block candidate list is variable.

The inter prediction control unit 309 causes the inter prediction unit 308 to generate an inter prediction picture using information on motion vector estimation mode when the merging flag decoded is "0". On the other hand, when the merging flag is "1", the inter prediction control unit 309 determines, based on a decoded merging block candidate index, a motion vector, a reference picture index, and a prediction direction for use in inter prediction from a plurality of merging block candidates. Then, the inter prediction control unit 309 causes the inter prediction unit 308 to generate an inter prediction picture using the determined motion vector, reference picture index, and prediction direction. Furthermore, the inter prediction control unit 309 transfers colPic information including the motion vector of the current block to the colPic memory 312.

Finally, the adder 304 generates decoded image data by adding the prediction picture data and the prediction error data.

Figure 20:
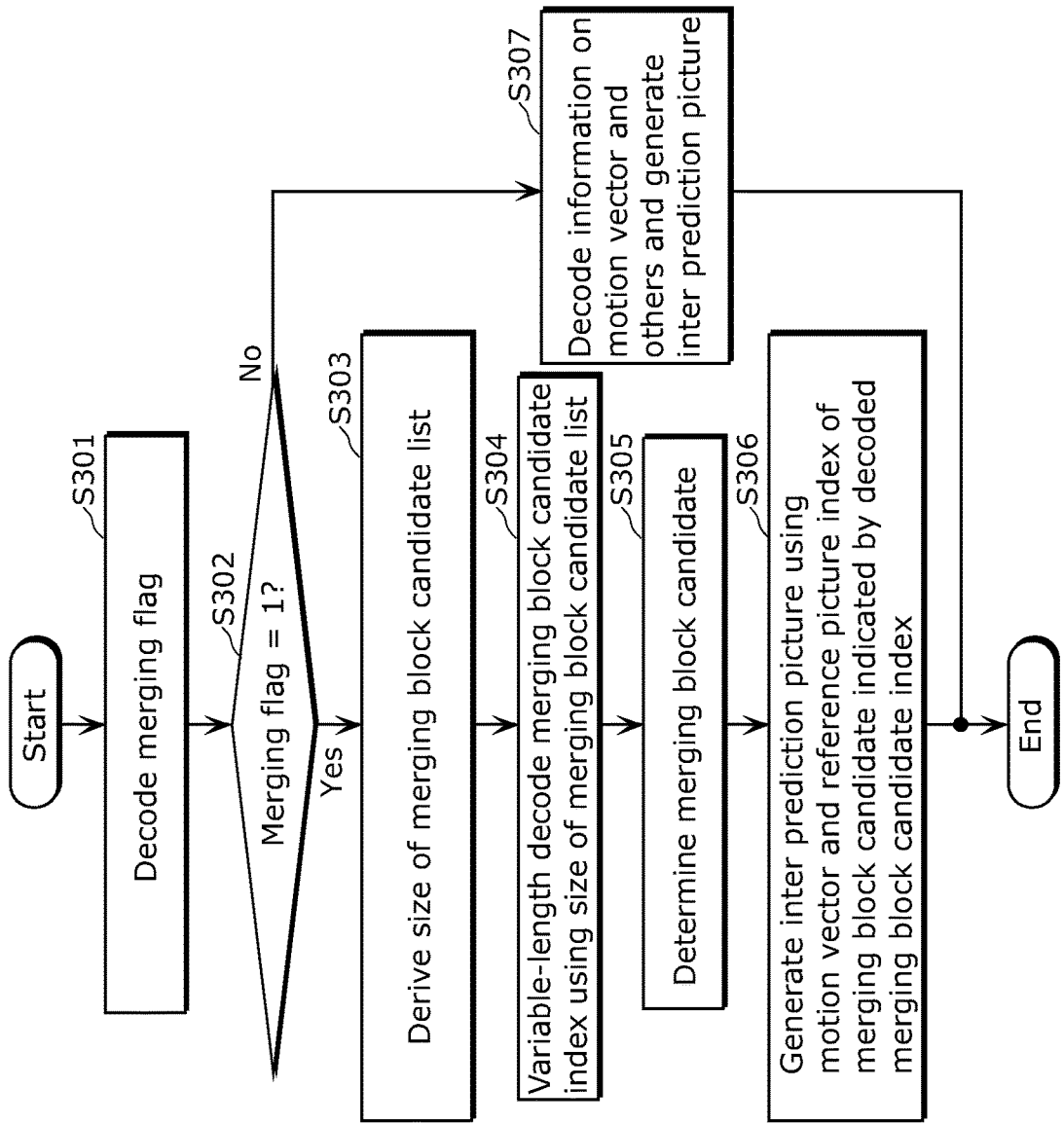
FIG. 20 is a flowchart showing processing operations of the image decoding apparatus according to Embodiment 2.

FIG. 20 is a flowchart showing processing operations of the image decoding apparatus 300 according to Embodiment 2.

In Step S301, the variable-length-decoding unit 301 decodes a merging flag.

When the merging flag is "1" in Step S302 (Step S302, Yes), in Step S303, the merging block candidate calculation unit 311 calculates the total number of merging block candidates as the size of a merging block candidate list.

In Step S304, the variable-length-decoding unit 301 performs variable-length decoding on a merging block candidate index from a bitstream using the calculated size of a merging block candidate list.

In Step S305, the merging block candidate calculation unit 311 generates merging block candidates (and a merging block candidate list) in the same manner as in Step S101 in FIG. 12. Furthermore, the inter prediction control unit 309 identifies, based on a decoded merging block candidate index, a merging block candidate to be used for decoding a current block listed in the merging block candidate list generated by the merging block candidate calculation unit 311.

In Step S306, the inter prediction control unit 309 causes the inter prediction unit 308 to generate an inter prediction picture using the motion vector, reference picture index, and prediction direction of the merging block candidate identified in Step S305.

When the merging flag is "0" in Step S302 (Step S302, No), in Step S307, the inter prediction unit 308 generates an inter prediction picture using information on motion vector estimation mode decoded by the variable-length-decoding unit 301.

Optionally, when the size of a merging block candidate list calculated in Step S303 is "1", a merging block candidate index may be estimated to be "0" without being decoded.

Figure 21:
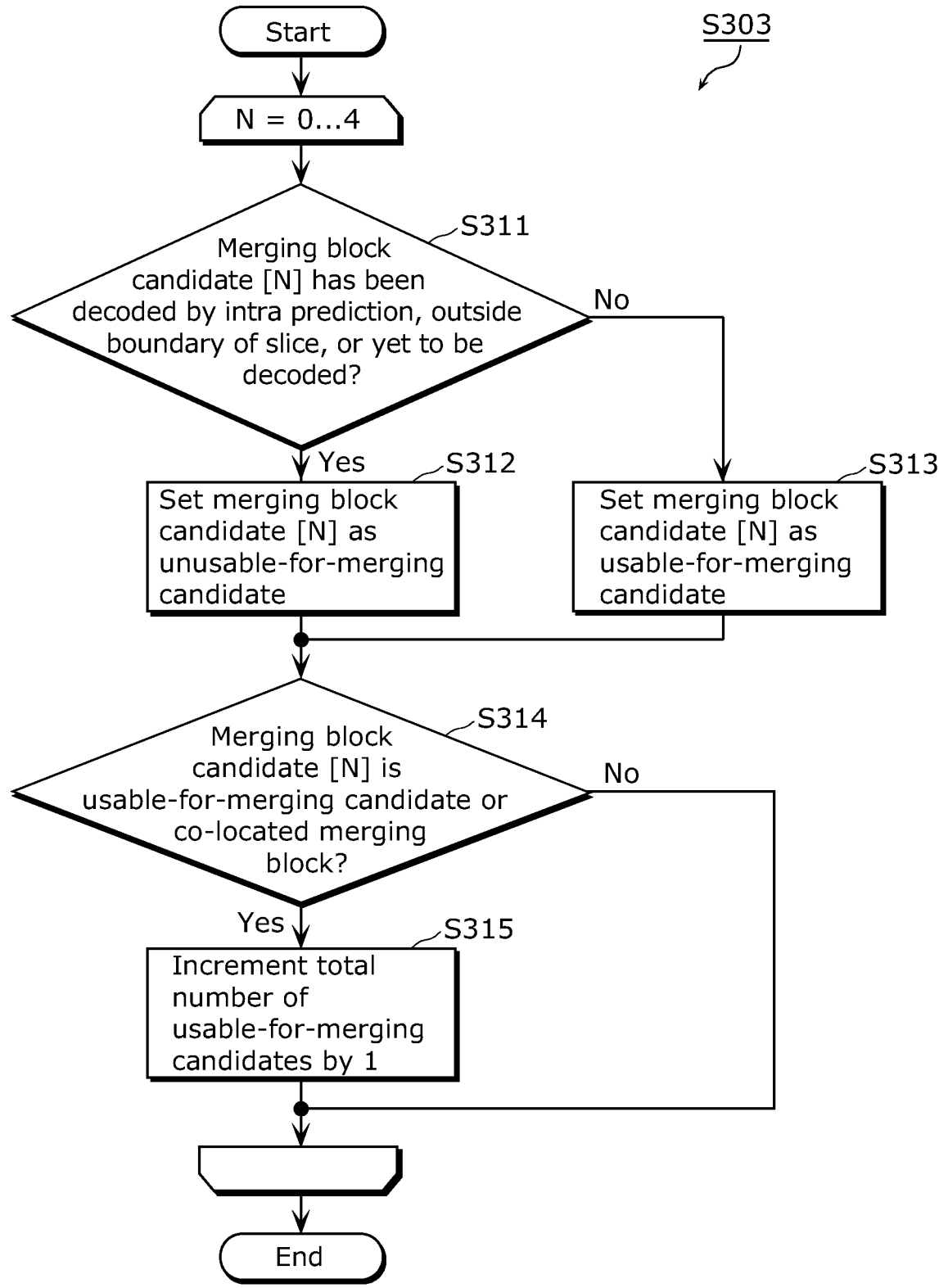
FIG. 21 is a flowchart illustrating a process for determining whether or not a merging block candidate is a usable-for-merging candidate and updating the total number of usable-for-merging candidates according to Embodiment 2.
Figure 22:
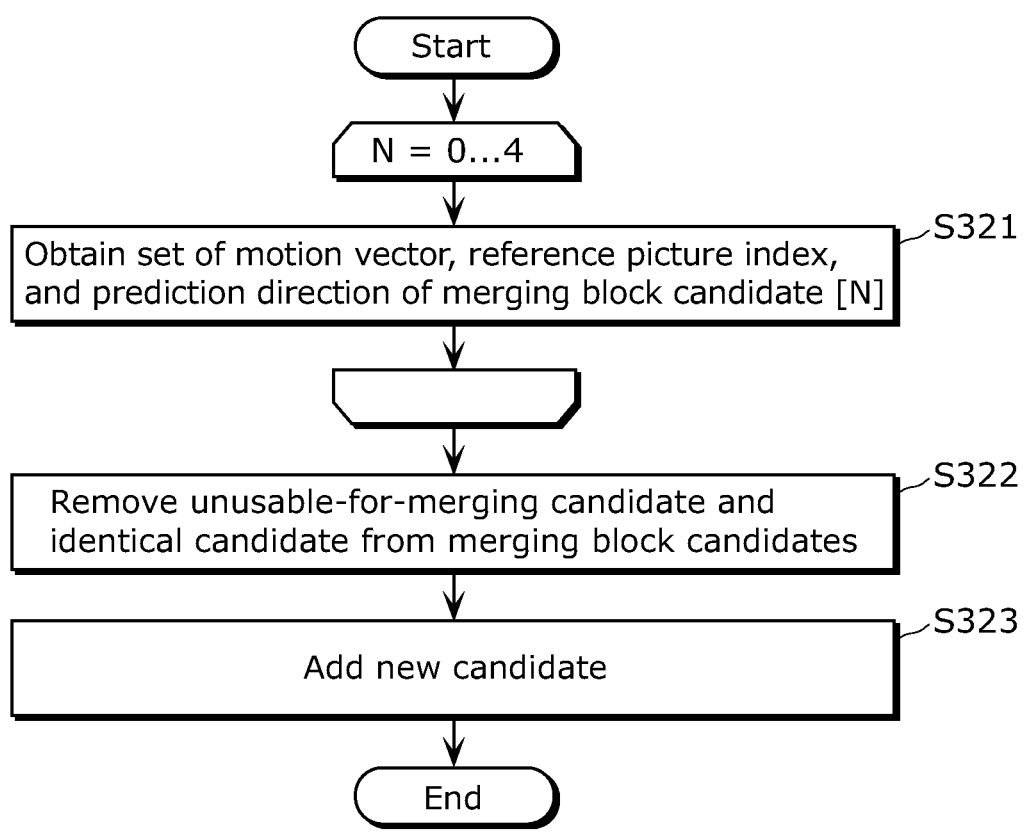
FIG. 22 is a flowchart illustrating a process for generating a merging block candidate list according to Embodiment 2.

FIG. 21 and FIG. 22 are flowcharts showing details of the process in Step S303 shown in FIG. 20. The process shown in FIG. 21 is followed by the process shown in FIG. 22.

Specifically, FIG. 21 illustrates a method of calculating merging block candidates [N] and the size of a merging block candidate list. FIG. 21 will be described below.

At the beginning of the process, the merging block candidate calculation unit 311 initializes N to zero. Furthermore, the merging block candidate calculation unit 311 assigns index values to the neighboring blocks (the neighboring blocks A to D and the co-located merging block).

In Step S311, the merging block candidate calculation unit 311 determines whether it is true or false that (1) a merging block candidate [N] has been decoded by intra prediction, (2) the merging block candidate [N] is a block outside the boundary of a slice including the current block or the boundary of a picture including the current block, or (3) the merging block candidate [N] is yet to be decoded.

When the result of the determination in Step S311 is true (Step S311, Yes), the merging block candidate calculation unit 311 sets the merging block candidate [N] as an unusable-for-merging candidate in Step S312. On the other hand, when the result of the determination in Step S311 is false (Step S311, No), the merging block candidate calculation unit 311 sets the merging block candidate [N] as a usable-for-merging candidate in Step S313.

In Step S314, the merging block candidate calculation unit 311 determines whether it is true or false that the merging block candidate [N] is either a usable-for-merging candidate or a co-located merging block candidate.

Here, when the result of the determination in Step S314 is true (Step S314, Yes), the merging block candidate calculation unit 311 updates the total number of merging block candidates by incrementing it by one in Step S315. When the result of the determination in Step S314 is false (Step S314, No), the merging block candidate calculation unit 311 does not update the total number of merging block candidates.

In this manner, when a co-located merging block is calculated as a merging block candidate, the merging block candidate calculation unit 311 according to Embodiment 2 increments the total number of merging block candidates by one regardless of whether the co-located block is a usable-for-merging candidate or an unusable-for-merging candidate. This prevents discrepancy in the total number of merging block candidates between the image coding apparatus and the image decoding apparatus even when information on a co-located merging block is lost due to an incident such as packet loss.

Subsequently, the process shown in FIG. 22 is performed. FIG. 22 illustrates a method of calculating a merging block candidate. FIG. 22 will be described below.

In Step S321, the merging block candidate calculation unit 311 obtains a set of a motion vector, a reference picture index, and a prediction direction of a merging block candidate [N], and adds it to a merging block candidate list.

In Step S322, the merging block candidate calculation unit 311 searches the merging block candidate list for any unusable-for-merging candidate and identical candidate, and removes the unusable-for-merging candidate and identical candidate from the merging block candidate list as shown in (a) and (b) in FIG. 13A. Furthermore, the merging block candidate calculation unit 311 subtracts the total number of the identical candidates from the total number of merging block candidates.

In Step S323, the merging block candidate calculation unit 311 adds a new candidate to the merging block candidate list using the method used in the image coding apparatus 100 as illustrated in FIG. 16. As a result, the total number of merging block candidates is the sum of the total number of the first candidates and the total number of the new candidates.

When the size of the merging block candidate list is variable, the merging block candidate calculation unit 311 sets the total number of merging block candidates as the size of the merging block candidate list in Step S303 in FIG. 20. Furthermore, when the size of the merging block candidate list is a fixed number greater than or equal to two, the merging block candidate calculation unit 311 sets the fixed number greater than or equal to two as the size of the merging block candidate list in Step S303 in FIG. 20.

Furthermore, the merging block candidate calculation unit 311 performs variable-length decoding on a merging block candidate index using the size of the merging block candidate list in Step S304 in FIG. 20. This makes it possible for the image decoding apparatus 300 according to Embodiment 2 to decode merging block candidate indexes normally even when information on reference picture including a co-located block is lost.

Figure 23:
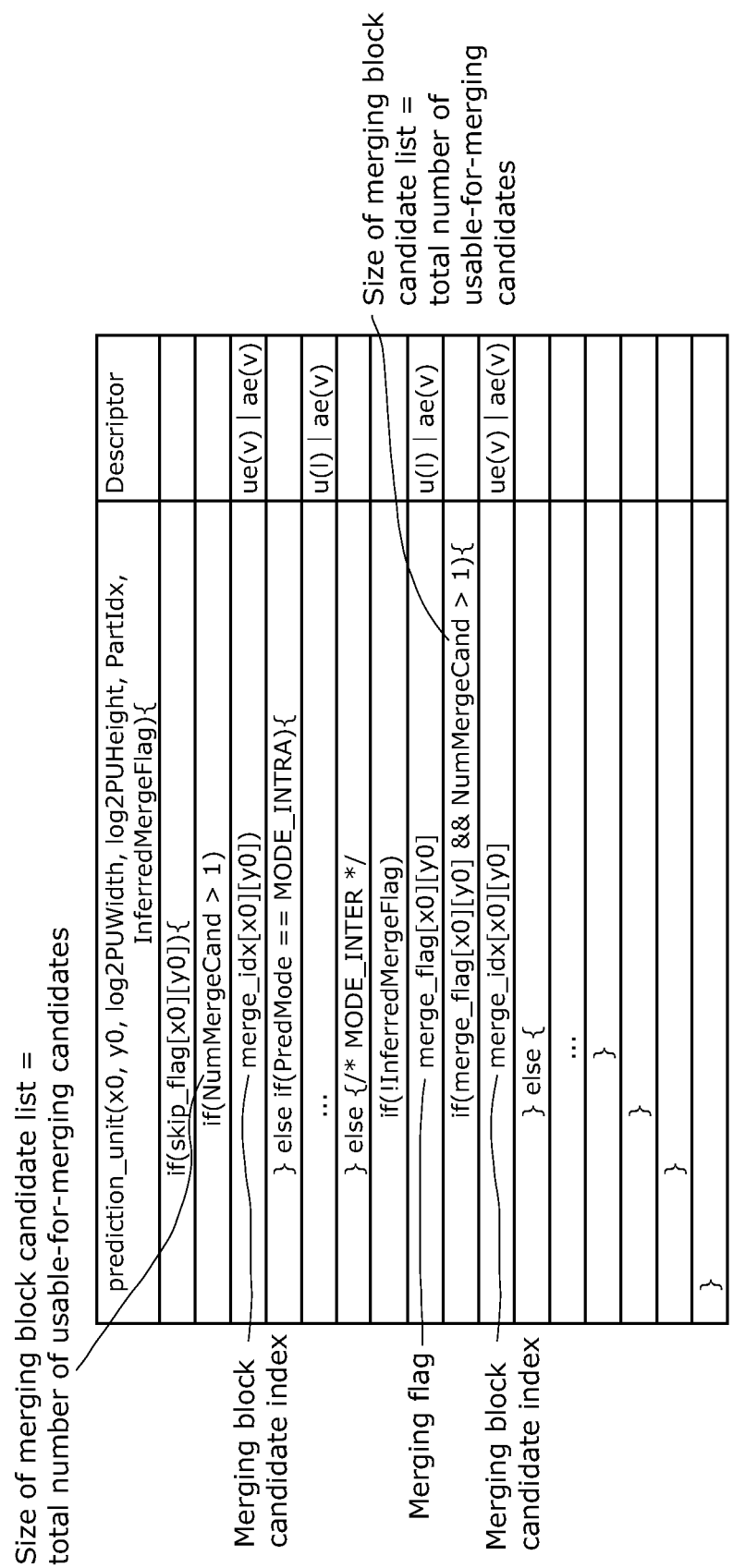
FIG. 23 shows exemplary syntax for attachment of a merging block candidate index to a coded bitstream.

FIG. 23 shows exemplary syntax for attachment of a merging block candidate index to a bitstream. In FIG. 23, merge_idx represents a merging block candidate index, and merge_flag represents a merging flag. NumMergeCand represents the size of a merging block candidate list. In Embodiment 2, the size of a merging block candidate list is set at the total number of merging block candidates calculated in the process shown in FIG. 21.

Thus, the image decoding apparatus 300 according to Embodiment 2 calculates the size of a merging block candidate list for use in coding or decoding of a merging block candidate index, using a method independent of information on reference pictures including a co-located block. The image decoding apparatus 300 therefore can appropriately decode a bitstream having enhanced error resistance. More specifically, the total number of merging block candidates is incremented by one for any co-located merging block regardless of whether or not the co-located merging block is a usable-for-merging candidate. Bit sequences to be applied to merging block candidate indexes is determined using the total number of merging block candidates calculated in this manner. This makes it possible for the image decoding apparatus 300 to decode merging block candidate indexes normally even when information on reference picture including a co-located block is lost. Furthermore, when the total number of the merging block candidates is smaller than the total number of usable-for-merging candidates, the image decoding apparatus 300 according to Embodiment 2 adds a new candidate having a new set of a motion vector, a reference picture index, and a prediction direction so that a bitstream coded with increased efficiency can be appropriately decoded.

It should be noted that Embodiment 2 in which the total number of merging block candidates is incremented by one for any other block regardless of whether the block is a usable-for-merging candidate or an unusable-for-merging candidate is not limiting. For example, the total number of merging block candidates may be incremented by one for any merging block candidate that is not a co-located merging block in Step S314 in FIG. 21.

Optionally, in Embodiment 2, when the size of a merging block candidate list is a fixed number greater than or equal to two, the fixed number greater than or equal to two may be a maximum number Max of the total number of merging block candidates. In other words, the size of a merging block candidate list may be fixed at a maximum value N of the total number of merging block candidates on the assumption that the merging block candidates are all usable-for-merging candidates. For example, in Embodiment 2, the maximum value Max of the total number of merging block candidates is 5 (neighboring block A, neighboring block B, co-located merging block, neighboring block C, and neighboring block D). In this case, merging block candidate indexes may be decoded using the size of a merging block candidate list fixedly set at "5".

Optionally, for example, when the maximum value Max of the total number of merging block candidates is set at 4 (neighboring block A, neighboring block B, neighboring block C, and neighboring block D) for a current picture which is a picture to be decoded without referencing a co-located merging block (a B-picture or a P-picture to be decoded with reference to an I-picture), merging block candidate indexes may be decoded using the size of a merging block candidate list fixedly set at "4".

It is therefore possible for the variable-length-decoding unit 301 of the image decoding apparatus 300 to decode a merging block candidate index from a bitstream without referencing information on a neighboring block or on a co-located block. In this case, for example, Step S314 and Step S315 shown in FIG. 21 can be skipped so that the computational complexity for the variable-length-decoding unit 301 can be reduced.

FIG. 24 shows exemplary syntax in the case where the size of a merging block candidate list is fixed at the maximum value Max of the total number of merging block candidates. As can be seen in FIG. 24, NumMergeCand can be omitted from the syntax when the size of a merging block candidate list is fixed at a fixed number greater than or equal to two (for example, a maximum value Max of the total number of merging block candidates). In other words, the process can be performed without using NumMergeCand. Optionally, for example, the decoding may be performed using a fixed number greater than or equal to two (for example, a maximum value Max of the total number of merging block candidates) embedded in a sequence parameter set (SPS), a picture parameter set (PPS), a slice header, or the like. This makes it possible to switch between fixed numbers greater than or equal to two for each current picture so that the bitstream from the image coding apparatus 100 can be correctly decoded. In this case, merging block indexes may be decoded using values which are the fixed numbers greater than or equal to two decoded from the SPS, PPS, or slice header.

It should be noted that the variable-length decoding (see FIG. 5) which is performed in Embodiment 2 according to the size of a merging block candidate list in Step S304 in FIG. 20 may be performed optionally according to another parameter. For example, when the total number of merging block candidates calculated as the total number of usable-for-merging candidates by adding the total number of first candidates and the total number of identical candidates in Step S111 (detailed in FIG. 15A) in FIG. 14A in the image coding apparatus 100 according to Embodiment 1, the variable-length decoding may be performed using the total number of merging block candidates calculated by the process shown in FIG. 21. In this case, the process shown in FIG. 22 may be performed in Step S305.

Furthermore, a determination in the process shown in FIG. 21 is made based on whether it is true or false that (1) a merging block candidate [N] has been decoded by intra prediction, (2) the merging block candidate [N] is a block outside the boundary of a slice including the current block or the boundary of a picture including the current block, or (3) the merging block candidate [N] is yet to be decoded. In other words, the total number of the merging block candidates for use in variable-length decoding can be obtained without using information on a prediction direction, a motion vector, and a reference picture index. Accordingly, calculation of a prediction direction, a motion vector, and a reference picture index and obtainment of a merging block candidate index are performed independently of each other, and therefore the merging block candidate index is obtained without waiting for the result of the calculation of a prediction direction, a motion vector, and a reference picture index so that processing speed can be increased.

Modification of Embodiment 1 and Embodiment 2

When the size of a merging block candidate list is a fixed number greater than or equal to two in above-described Embodiment 1 and Embodiment 2 and the merging block candidate list has an empty entry, the empty entry of the merging block candidate list may be filled with a predetermined merging block candidate for enhancement of error resistance (second candidate) so that error resistance can be enhanced.

For example, when a current picture (to be coded or to be decoded) is a B-picture, the second candidate to be added may be a bi-predictive merging block candidate including a set of a reference picture index 0 for a prediction direction 0 and a motion vector (0, 0) and a set of a reference picture index 0 for a prediction direction 1 and a motion vector (0, 0). For example, when a current picture to be coded is a P-picture, the second candidate to be added may be a uni-predictive merging block candidate including a reference picture index 0 for a prediction direction 0 and a motion vector (0, 0). Since second candidates are added for the purpose of enhancement of error resistance, the second candidates may be set to have identical values. On the other hand, third candidates are different from each other because third candidates are added for the purpose of increasing coding efficiency. It should be noted that a third candidate may be identical to a first candidate or a second candidate as a result.

A second candidate may be added either (1) by entering a second candidate in an empty entry after adding a new candidate (third candidate) or (2) by entering second candidates in all entries in a merging block candidate list to initialize the merging block candidate list.

The following describes a case with the image coding apparatus 100 in which (1) a second candidate is entered in an empty entry after a new candidate (third candidate) is added.

FIG. 13B shows a table of a merging block candidate list when a second candidate is entered in an empty entry after a new candidate (third candidate) is added. In the case shown in FIG. 13B, the maximum value Max of the total number of merging block candidates is 6 as an example.

Figure 14B:
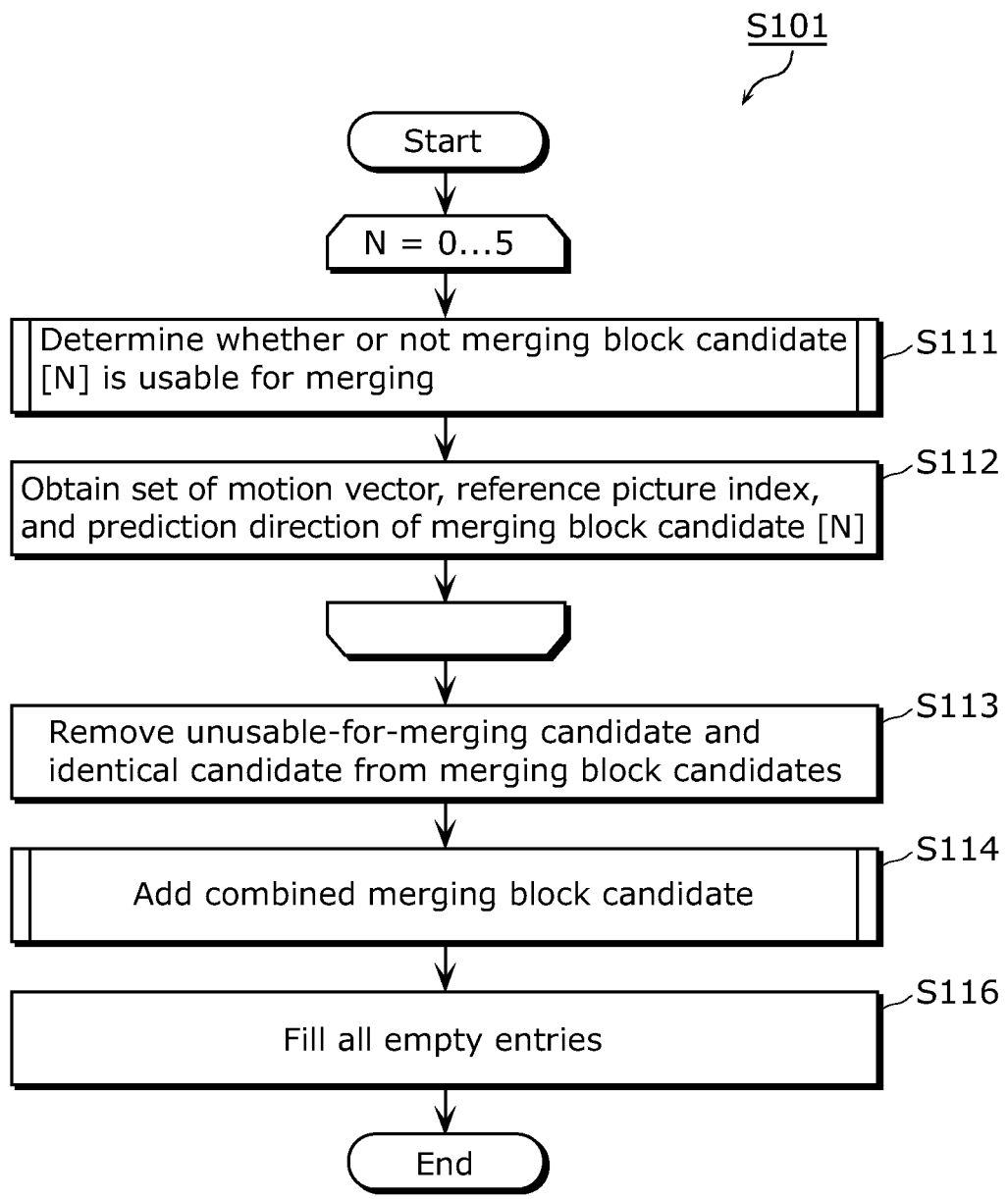
FIG. 14B is a flowchart illustrating a process for calculating merging block candidates and the size of a merging block candidate list according to a modification of an embodiment.

FIG. 14B is a flowchart showing details of the process in Step S101 in FIG. 12. The process from Step S111 to Step S114 in FIG. 14B is the same as the process from Step S111 to Step S114 of the image coding apparatus 100 according to Embodiment 1 shown in FIG. 14A, and thus the description thereof is omitted.

In Step S111 to Step S114, the merging block candidate calculation unit 114 of the image coding apparatus 100 calculates first candidates from neighboring blocks, removes an unusable-for-merging candidate and an identical candidate, and then adds new candidates. Since the maximum value of the total number of merging block candidates is 6, the merging block candidate [5] is not assigned to a merging block candidate even after the adding of new candidates as shown in (b) in FIG. 13B.

Figure 17:
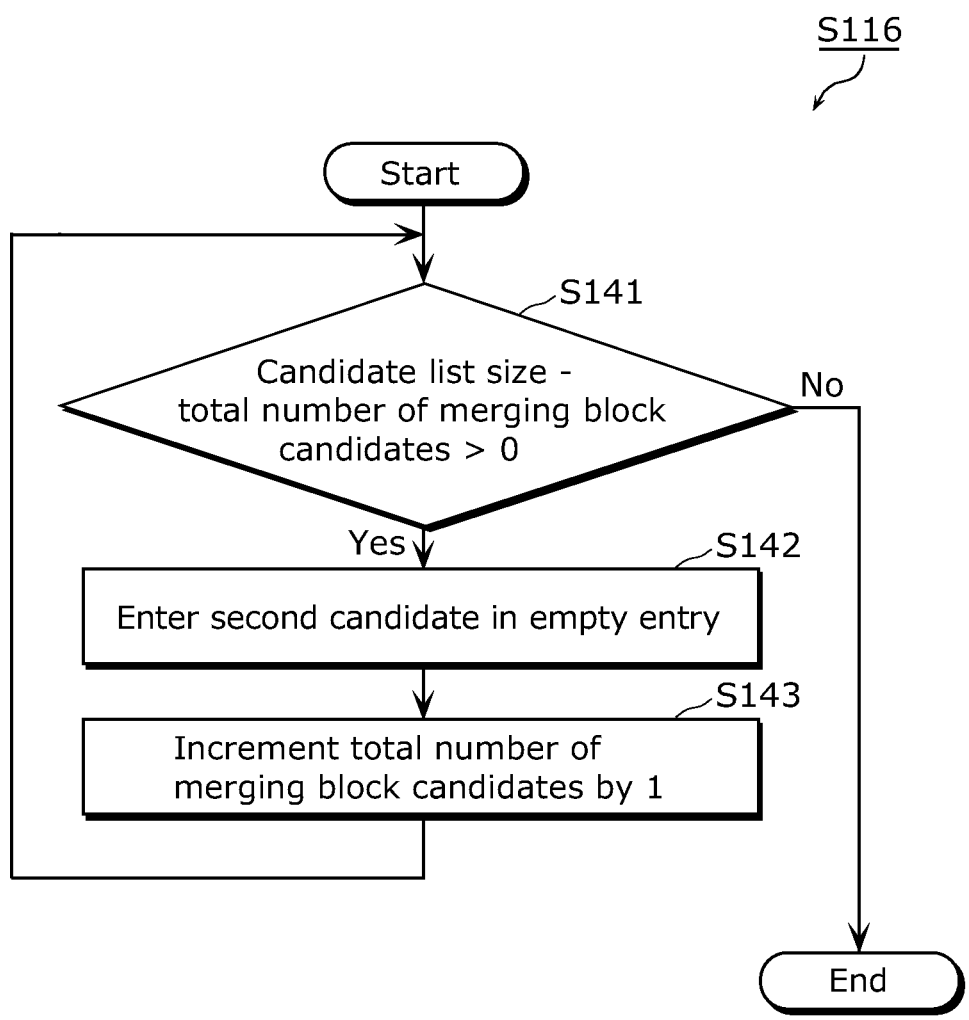
FIG. 17 is a flowchart illustrating a process for adding a second candidate according to a modification of an embodiment.

In Step S116, the merging block candidate calculation unit 114 enters a second candidate in the empty entry. FIG. 17 is a flowchart showing details of the process in Step S116 shown in FIG. 14B.

In Step S141, the merging block candidate calculation unit 114 determines whether or not the total number of merging block candidates (simply referred to as candidate list size in FIG. 17) is smaller than the size of the merging block candidate list. In other words, the merging block candidate calculation unit 114 determines whether or not there is any empty entry.

When the result of the determination in Step S141 is true (Step S141, Yes), the merging block candidate calculation unit 114 enters a second candidate in the empty entry in Step S142. As described above, the merging block candidate [5] is not assigned to a merging block candidate immediately after the adding of new candidates. Then, the merging block candidate calculation unit 114 adds a second candidate as the merging block candidate [5]. For example, the added second candidate may be a bi-predictive merging block candidate including a set of a reference picture index 0 for a prediction direction 0 and a motion vector (0, 0) and a set of a reference picture index 0 for a prediction direction 1 and a motion vector (0, 0) as mentioned above. Furthermore, in Step S143, the merging block candidate calculation unit 114 increments the total number of merging block candidates by one.

When the result of the determination in Step S141 is false (Step S141, No), the process ends.

(c) in FIG. 13B illustrates a table of a merging block candidate list after a second candidate is added.

The following describes a case with the image coding apparatus 100 in which (2) a merging block candidate list is initialized by entering second candidates in all the entries in a merging block candidate list.

FIG. 13C shows a table of a merging block candidate list when a second candidate is initialized by using second candidates. In the case shown in FIG. 13C, the maximum value Max of the total number of merging block candidates is 6 as an example.

Figure 14C:
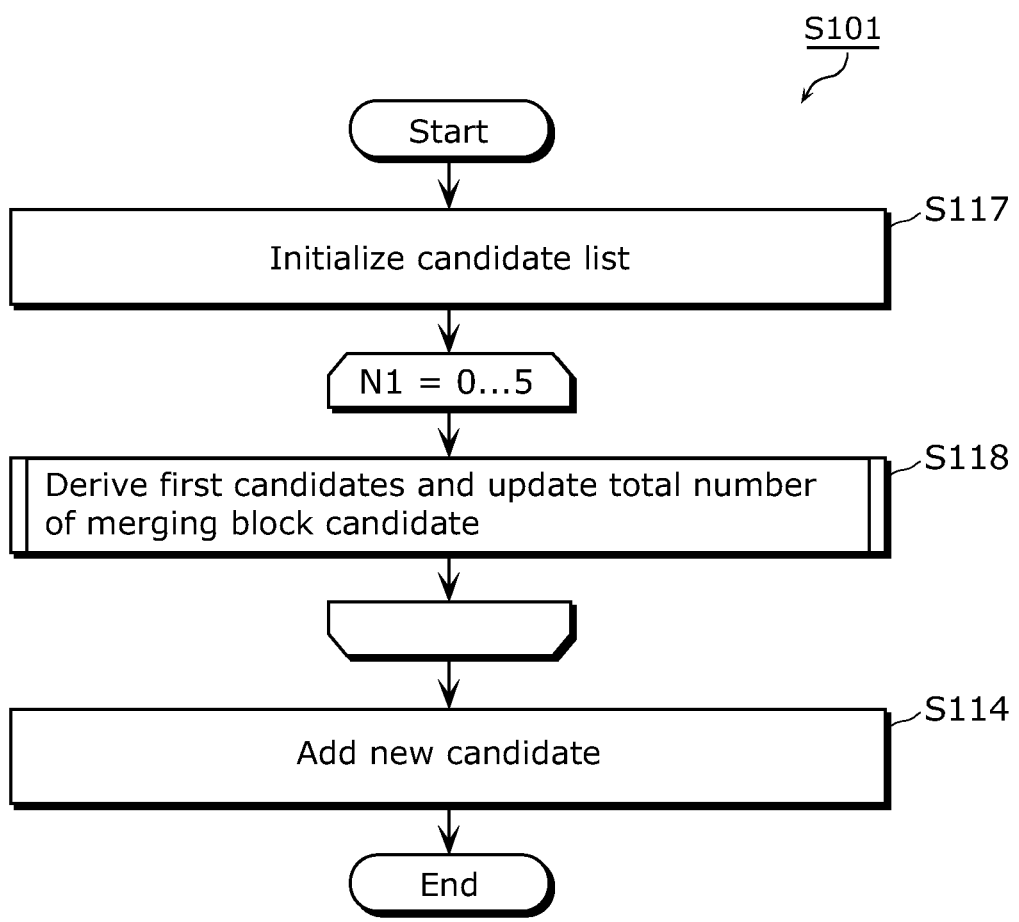
FIG. 14C is a flowchart illustrating a process for calculating merging block candidates and the size of a merging block candidate list according to a modification of an embodiment.

FIG. 14C is a flowchart showing details of the process in Step S101 in FIG. 12.

In Step 117, the merging block candidate calculation unit 114 initializes the merging block candidate list (candidate list). (a) in FIG. 13C illustrates a candidate list after the initialization. In (a) in FIG. 13C, all the merging block candidates [0] to [5] are second candidates. The second candidates are all identical, which is not indicated in (a) in FIG. 13C.

In Step 118, the merging block candidate calculation unit 114 derives first candidates and updates the total number of the merging block candidates with the total number of the first candidates. N1 is a value for identifying each neighboring block. In this case, N1 takes values from 0 to 5 to identify six of neighboring blocks which are neighboring blocks A to D and a co-located merging block. Furthermore, the first candidates include no unusable-for-merging candidate and no identical candidate. Furthermore, the merging block candidate calculation unit 114 adds the first candidates to the candidate list and obtains sets of motion vectors, reference picture indexes, and prediction directions of the first candidates. (b) in FIG. 13C illustrates a table of a merging block candidate list after first candidates are added.

In Step S114, the merging block candidate calculation unit 114 adds new candidates to the merging block candidate list using the method described in Embodiment 1. (c) in FIG. 13C illustrates the table of the merging block candidate list after new candidates are added.

Figure 15B:
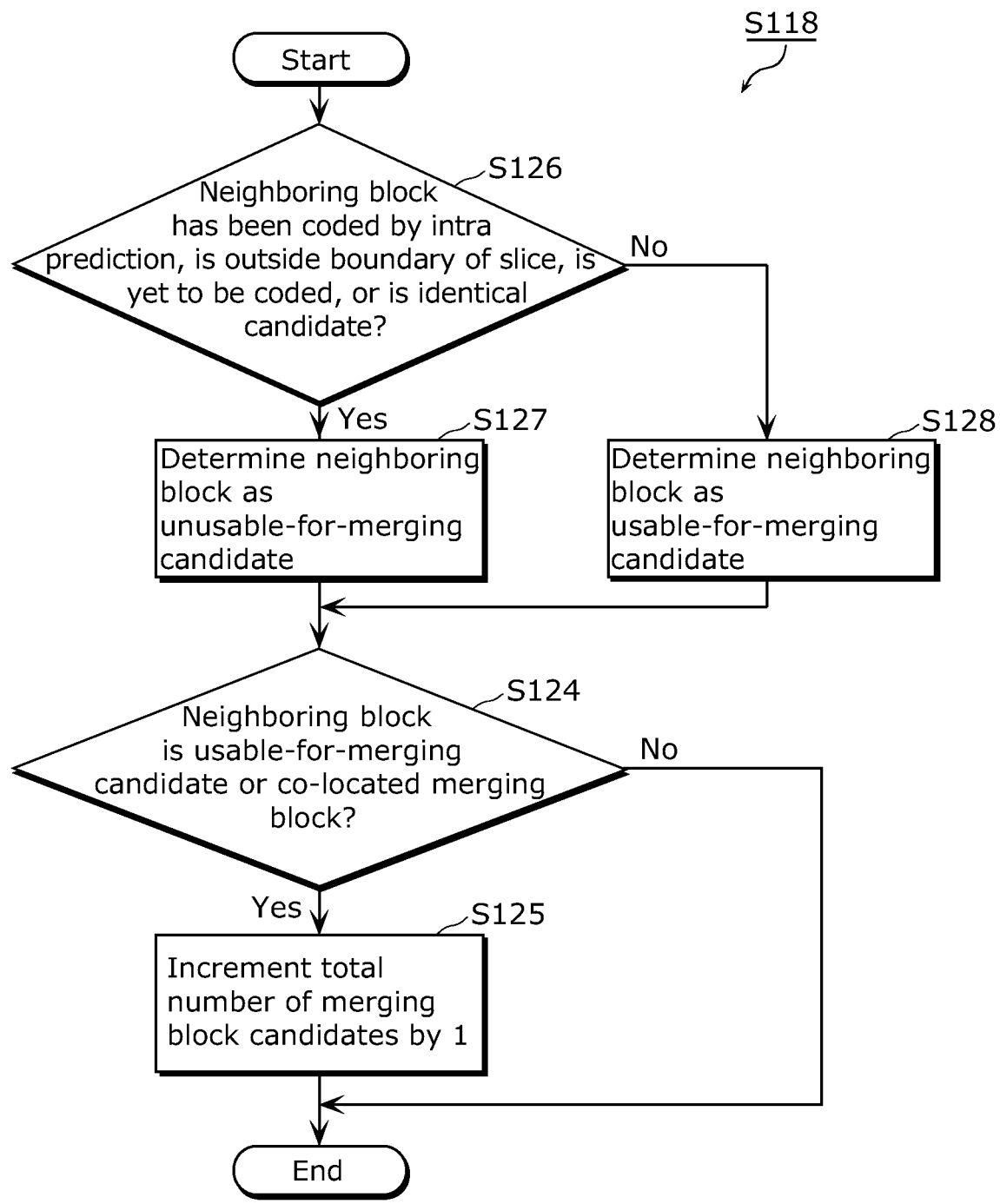
FIG. 15B is a flowchart illustrating a process for determining whether or not a merging block candidate is a usable-for-merging candidate and updating the total number of usable-for-merging candidates according to a modification of an embodiment.

FIG. 15B is a flowchart showing details of the process in Step S118 shown in FIG. 14C.

In Step S126, the merging block candidate calculation unit 114 determines whether it is true or false that (1) a neighboring block has been coded by intra prediction, (2) the neighboring block is a block outside the boundary of a slice including the current block or the boundary of a picture including the current block, (3) the neighboring block is yet to be coded, or (4) the neighboring block is an identical candidate, that is, identical in prediction direction, motion vector, and reference picture index to any of the merging block candidates added to the candidate list.

When the result of the determination in Step S126 is true (Step S126, Yes), the merging block candidate calculation unit 114 determines that the neighboring block is an unusable-for-merging candidate. On the other hand, when the result of the determination in Step S126 is false (Step S126, No), the merging block candidate calculation unit 114 determines that the neighboring block is a usable-for-merging candidate.

When the result of the determination in Step S126 is that the neighboring block is either a usable-for-merging candidate or a co-located block, the merging block candidate calculation unit 114 adds a merging block candidate to the merging block candidate list and increments the total number of merging block candidates by one in Step S124.

(c) in FIG. 13C is identical to (c) in FIG. 13B, which therefore shows that a merging block candidate list obtained by adding new candidates first and then second candidates and a merging block candidate list obtained by initializing the merging block using second candidates first are the same.

When the image decoding apparatus 300 creates a merging block candidate list using this method, it is possible for the image decoding apparatus 300 to decode merging block candidate indexes normally.

When a merging block candidate list has an empty entry, the image decoding apparatus 300 may have an error in removing an identical candidate from merging block candidates and fail to remove the identical candidate. In this case, when the size of the merging block candidate list is a fixed number greater than or equal to two, there is a possibility that the merging block candidate list has an empty candidate entry in which no merging block candidate is entered.

According to the present modification of Embodiments 1 and 2, second candidates are entered in all the empty entries in the candidate list so that the image decoding apparatus 300 can avoid having an empty candidate entry in which no merging block candidate is entered.

It should be noted that the present modification in which a merging block candidate having a reference picture 0 and a motion vector (0, 0) is assigned as a second candidate to a merging block candidate index to which no merging block candidate is applied is not limiting. Examples of such a second candidate include a merging block candidate having a reference picture index, a motion vector, and a prediction direction copied from another neighboring block, and a neighboring block generated using a candidate obtained from other neighboring blocks such as a merging block candidate generated by averaging candidates obtained from other neighboring blocks.

It should be noted that the modification in which a second candidate is added by (1) entering a second candidate in an empty entry after adding a new candidate (third candidate) or (2) initializing a merging block candidate list by entering second candidates in all entries of the merging block candidate list, is not limiting.

For example, the image decoding apparatus 300 may determine in Step S306 in FIG. 20 whether or not a merging block candidate is assigned to a decoded merging block candidate index, and add a second candidate when the result of the determination is true. In other words, Step S305 may be performed not to generate a merging block candidate list with no empty entry but to add a second candidate to an empty entry only when an entry indicated by a decoded merging block candidate index is such an empty entry. This will reduce computational complexity.

Examples of such a second candidate include a merging block candidate having a reference picture 0 and a motion vector (0, 0), a merging block candidate assigned to another merging block candidate index, and a merging block candidate generated from other neighboring blocks assigned to other merging block candidate indexes.

For example, the image decoding apparatus 300 may determine in Step S306 in FIG. 20 whether or not the total number of decoded merging block candidate indexes is larger than or equal to the total number of merging block candidates calculated in Step S303, and add a second candidate when the result of the determination is true. In other words, the process for adding a second candidate can be skipped when the total number of the decoded merging block candidate indexes is smaller than or equal to the total number of merging block candidates calculated in Step S303. This will reduce computational complexity.

Examples of such a second candidate include a merging block candidate having a reference picture 0 and a motion vector (0, 0), a merging block candidate assigned to another merging block candidate index, and a merging block candidate generated from other neighboring blocks assigned to other merging block candidate indexes.

Furthermore, for example, the image decoding apparatus 300 may determine in Step S306 in FIG. 20 whether or not the total number of decoded merging block candidate indexes is larger than or equal to the total number of merging block candidates calculated in Step S303, and, when the result of the determination is true, the values of the merging block candidate indexes may be clipped so that the total number of decoded merging block candidate indexes is smaller than the total number of merging block candidates.

By performing the above-described process, the image coding apparatus 100 and the image decoding apparatus 300 according to the present modification of Embodiments 1 and 2 can avoid having a decoded merging block candidate index to which no merging block candidate is assigned, even when, for example, merging block candidate indexes are normally decoded but an error occurs in removing of an identical candidate from merging block candidates. Error resistance is thus enhanced.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 25:
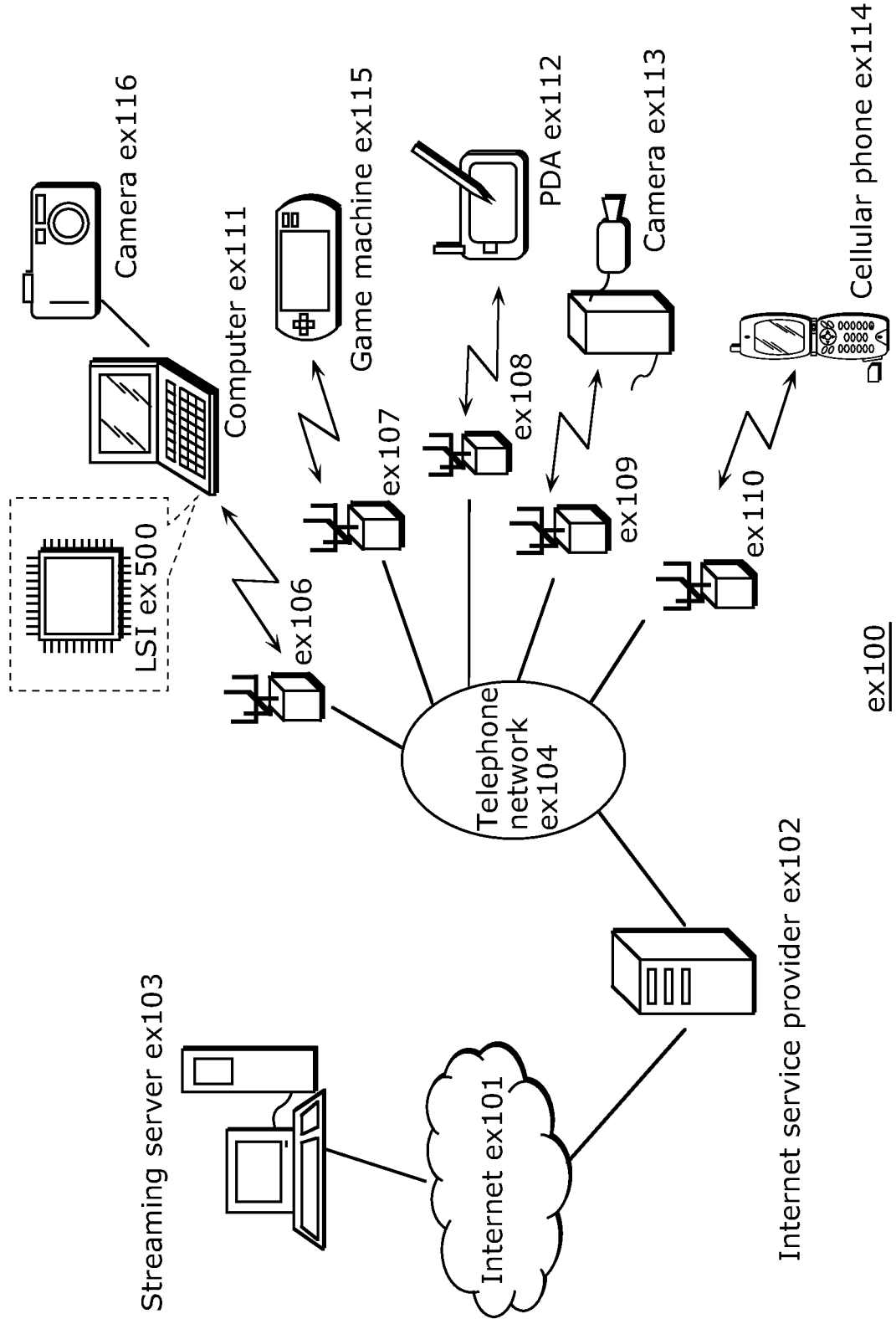
FIG. 25 shows an overall configuration of a content providing system for implementing content distribution services.

FIG. 25 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 25, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 26:
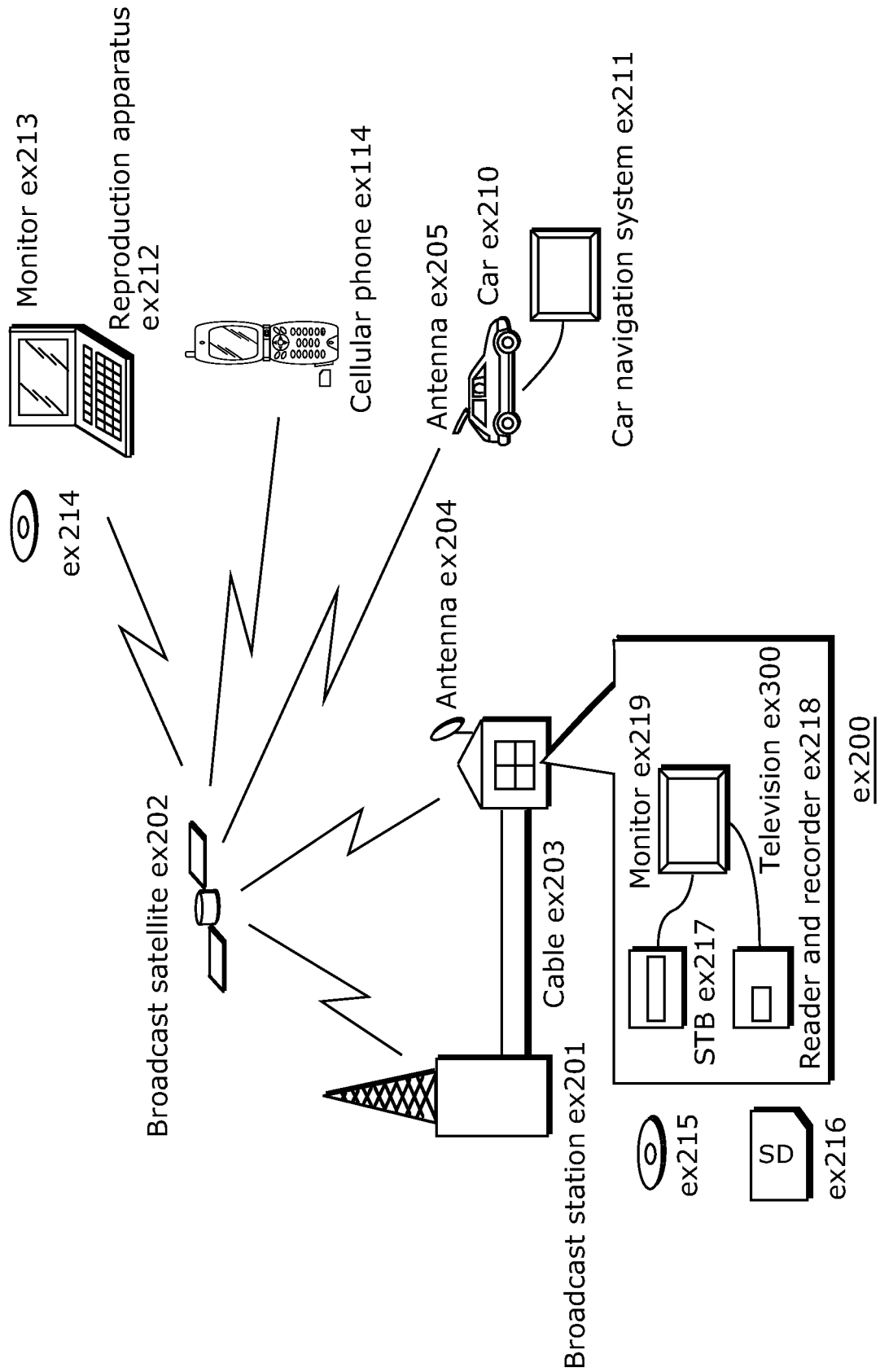
FIG. 26 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 26. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 27:
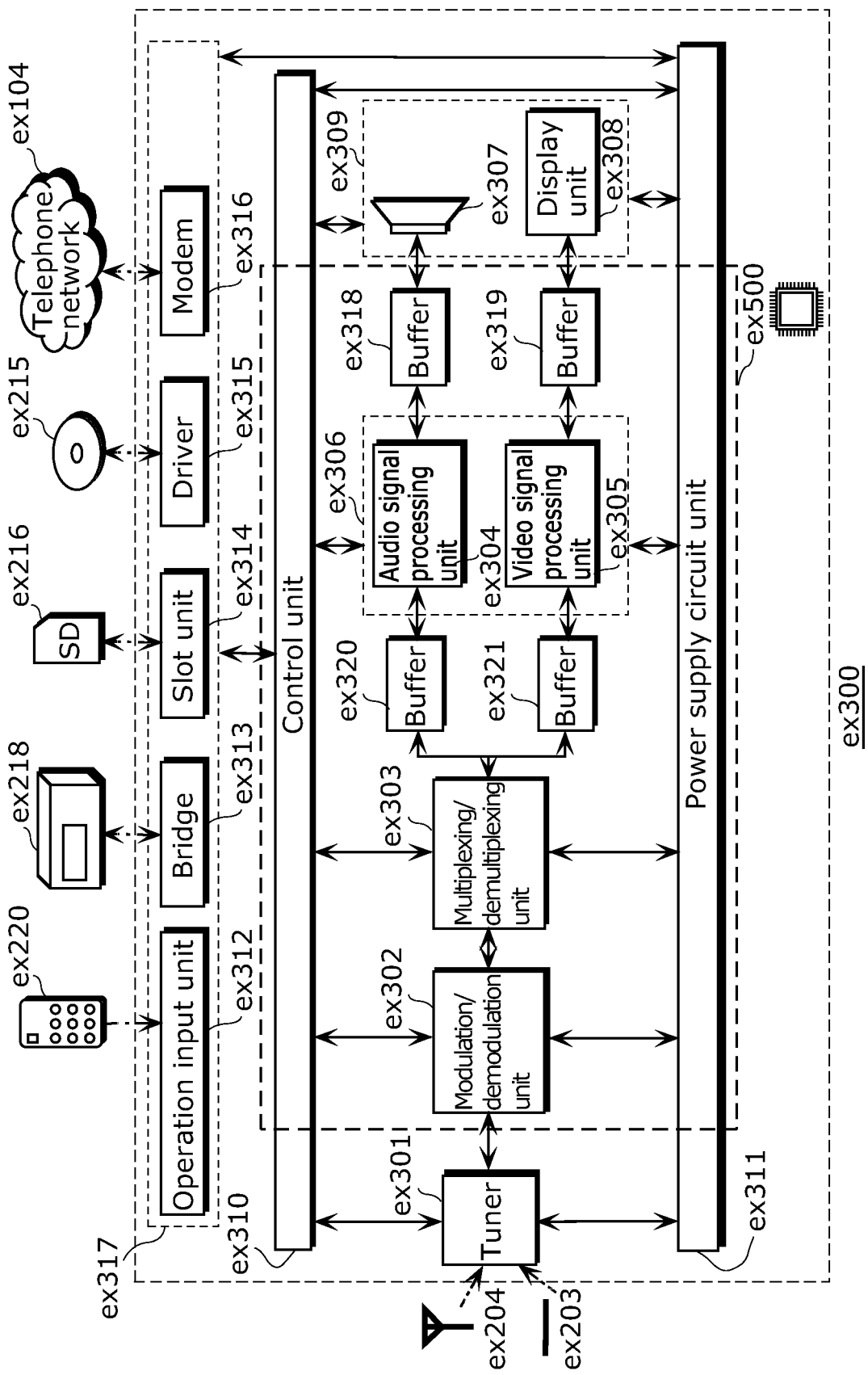
FIG. 27 shows a block diagram illustrating an example of a configuration of a television.

FIG. 27 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 28:
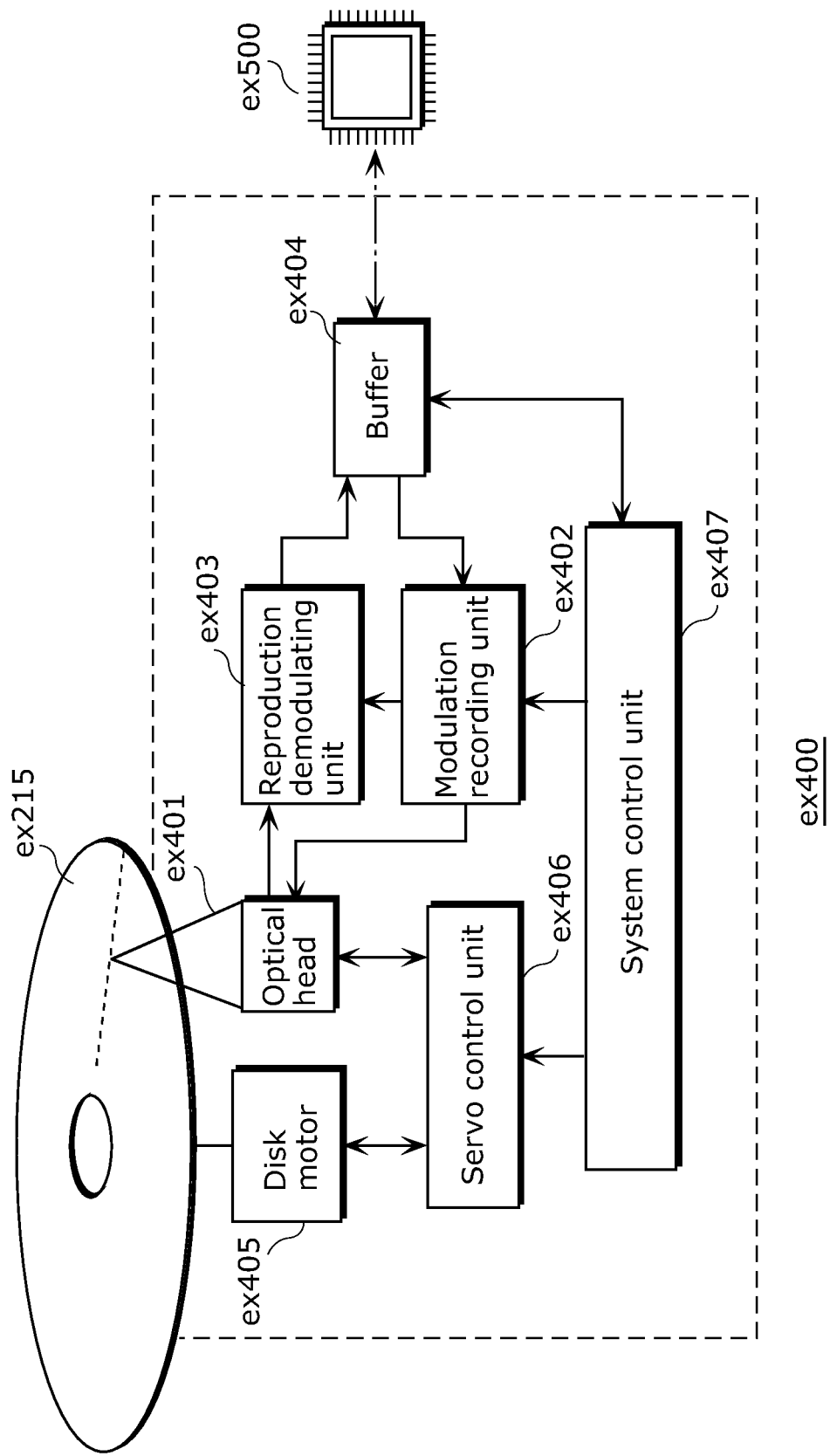
FIG. 28 is a block diagram illustrating an example of a configuration of an information reproducing/recording unit that reads and writes information from and on a recording medium that is an optical disk.

As an example, FIG. 28 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 29:
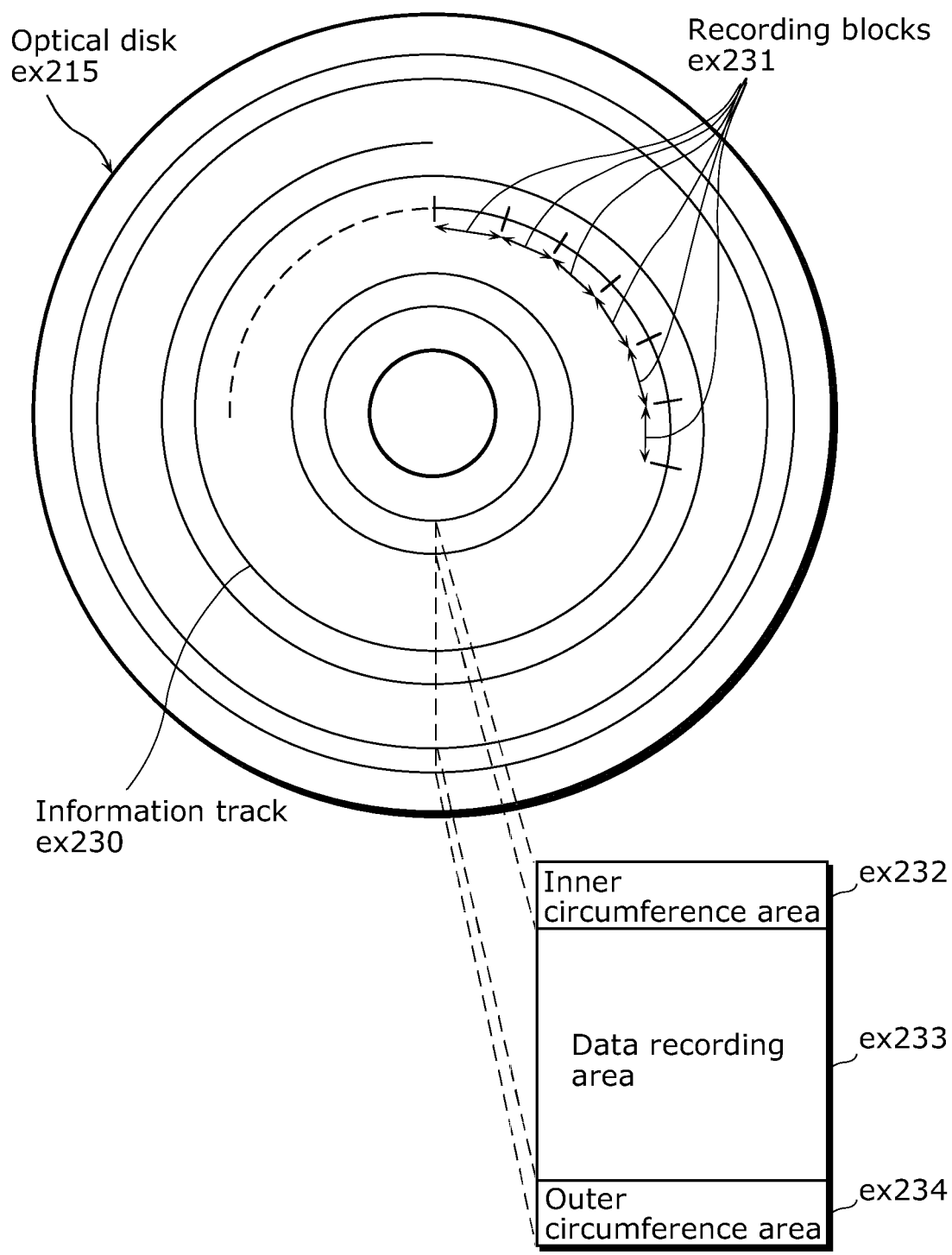
FIG. 29 shows an example of a configuration of a recording medium that is an optical disk.

FIG. 29 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 27. The same will be true for the configuration of the computer ex111, the cellular phone ex114, and others.

Figure 30A:
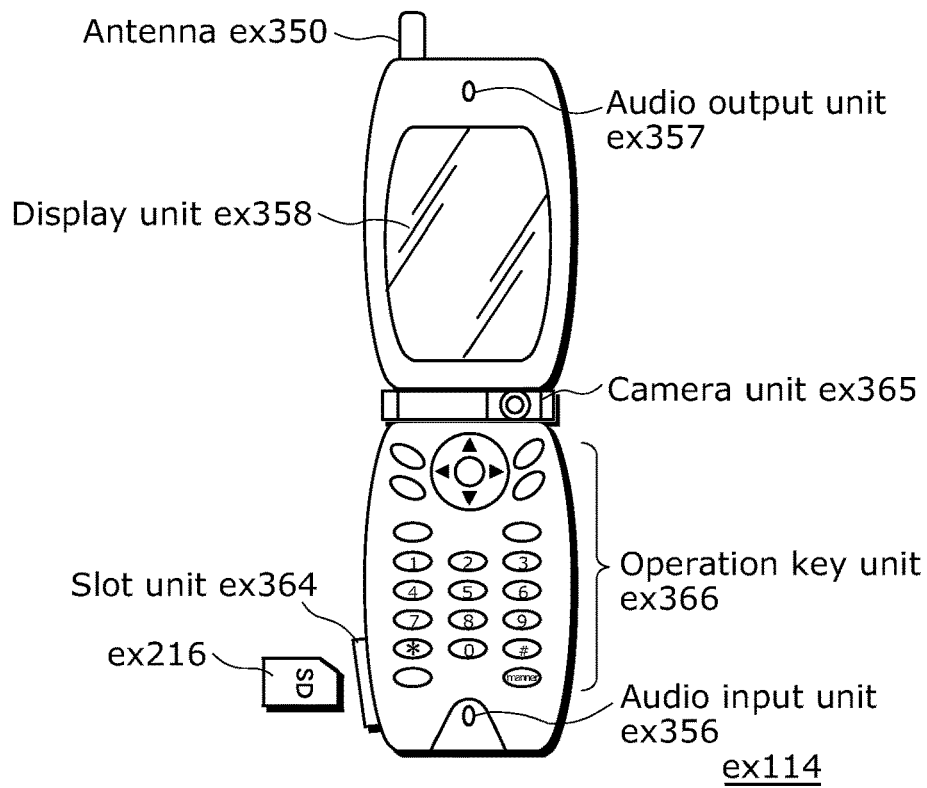
FIG. 30A shows an example of a cellular phone.

FIG. 30A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 30B:
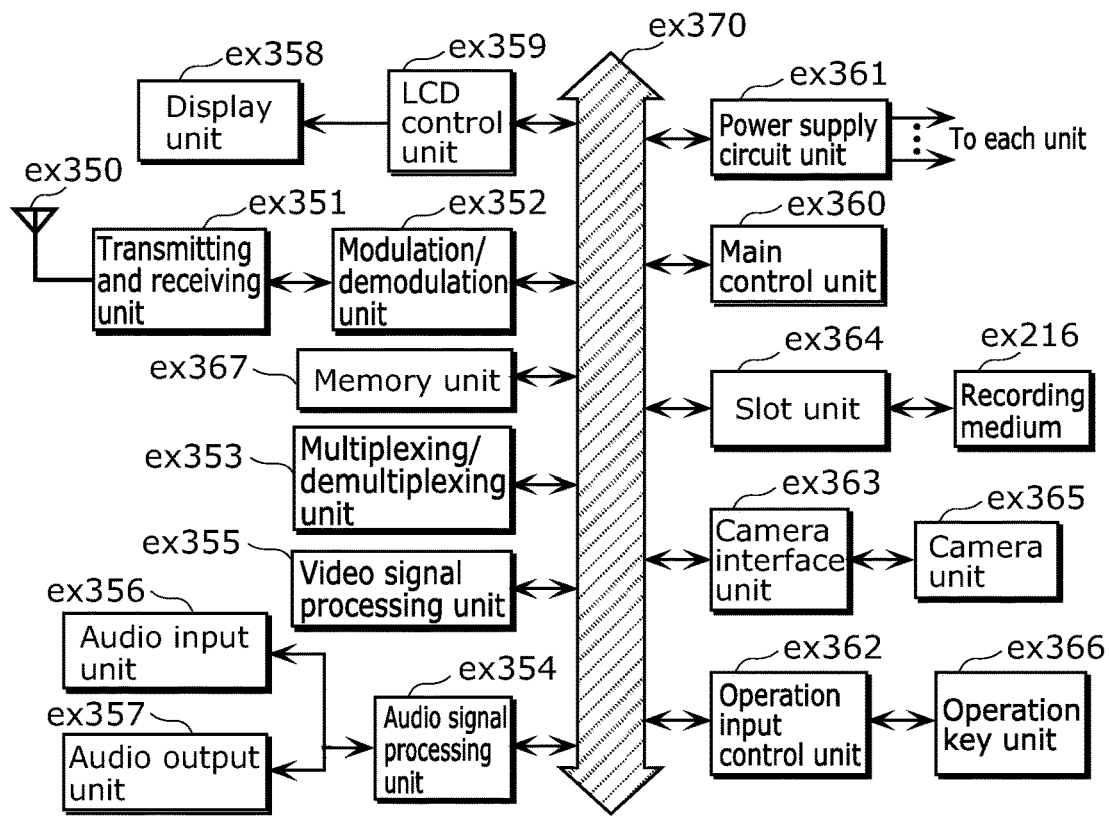
FIG. 30B is a block diagram showing an example of a configuration of a cellular phone.

Next, an example of a configuration of the cellular phone ex114 will be described with reference to FIG. 30B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bitstream and an audio data bitstream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 31 illustrates a structure of the multiplexed data. As illustrated in FIG. 31, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 32:
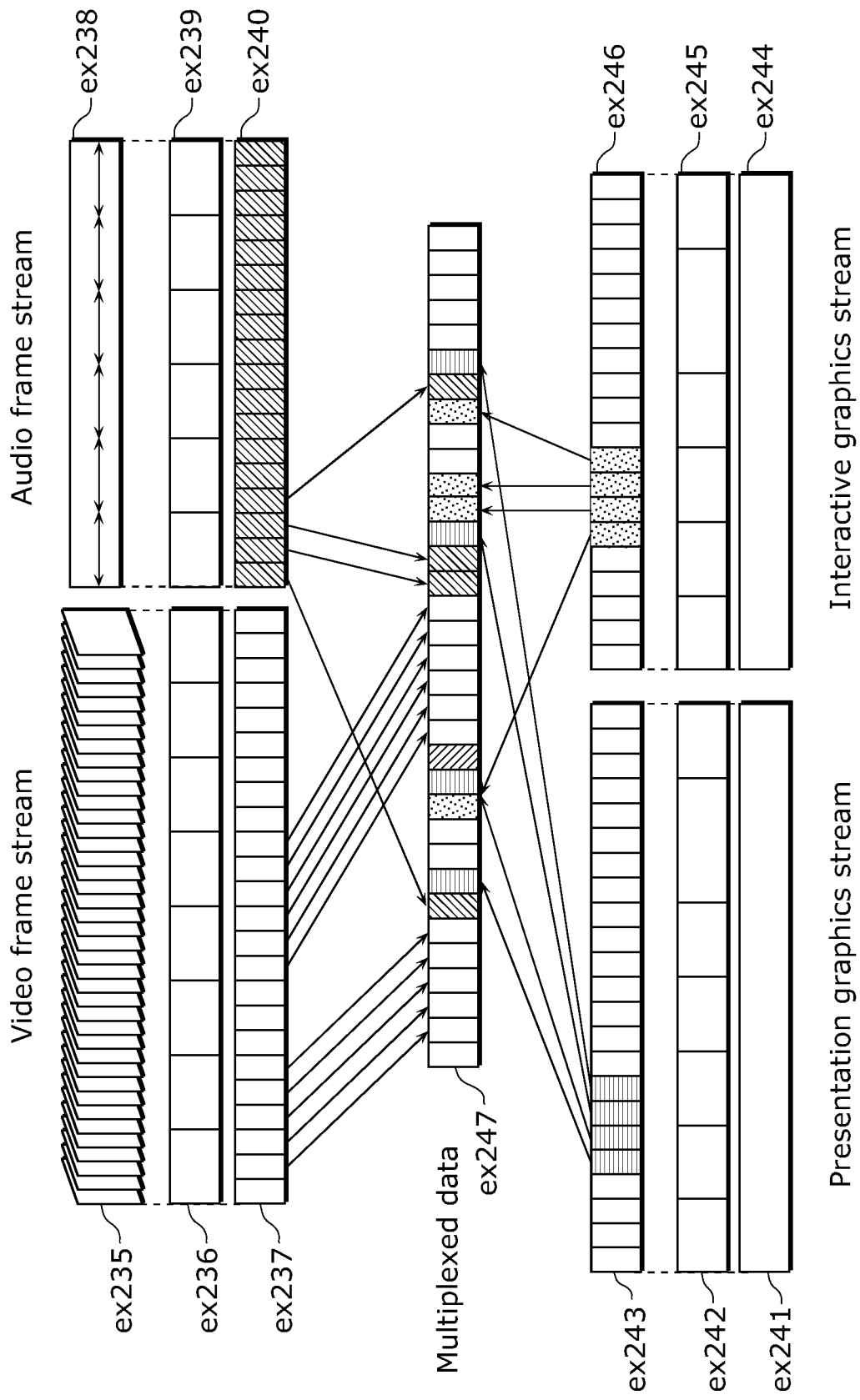
FIG. 32 schematically shows how each stream is multiplexed in multiplexed data.

FIG. 32 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 33:
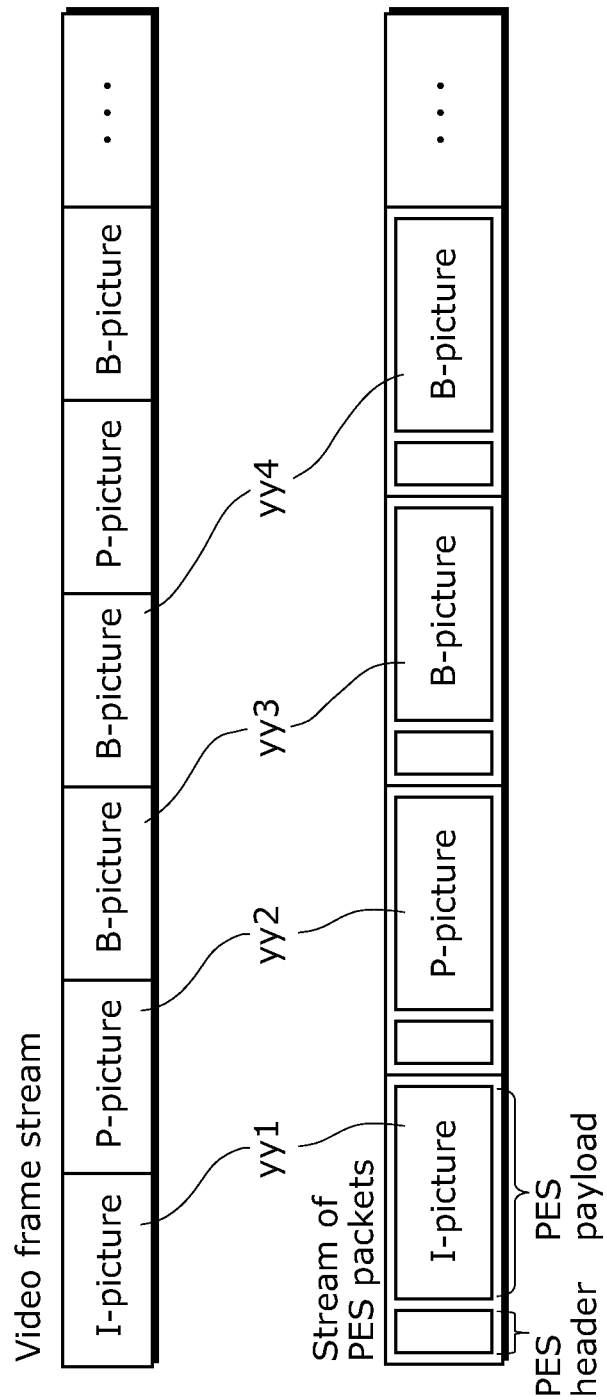
FIG. 33 shows how a video stream is stored in a stream of PES packets in more detail.

FIG. 33 illustrates how a video stream is stored in a stream of PES packets in more detail. The first bar in FIG. 33 shows a video frame stream in a video stream. The second bar shows the stream of PES packets. As indicated by arrows denoted as yy1, yy2, yy3, and yy4 in FIG. 33, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 34 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 34. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 35 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 36:
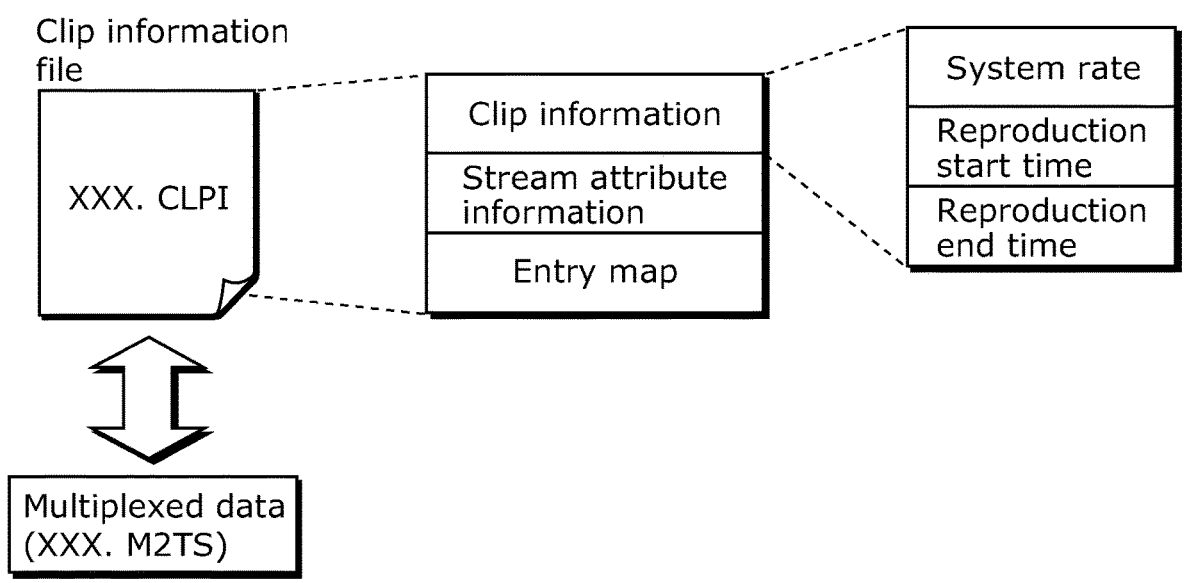
FIG. 36 shows an internal structure of multiplexed data information.

Each of the multiplexed data information files is management information of the multiplexed data as shown in FIG. 36. The multiplexed data information files are in one to one correspondence with the multiplexed data, and each of the files includes multiplexed data information, stream attribute information, and an entry map.

As illustrated in FIG. 36, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 37:
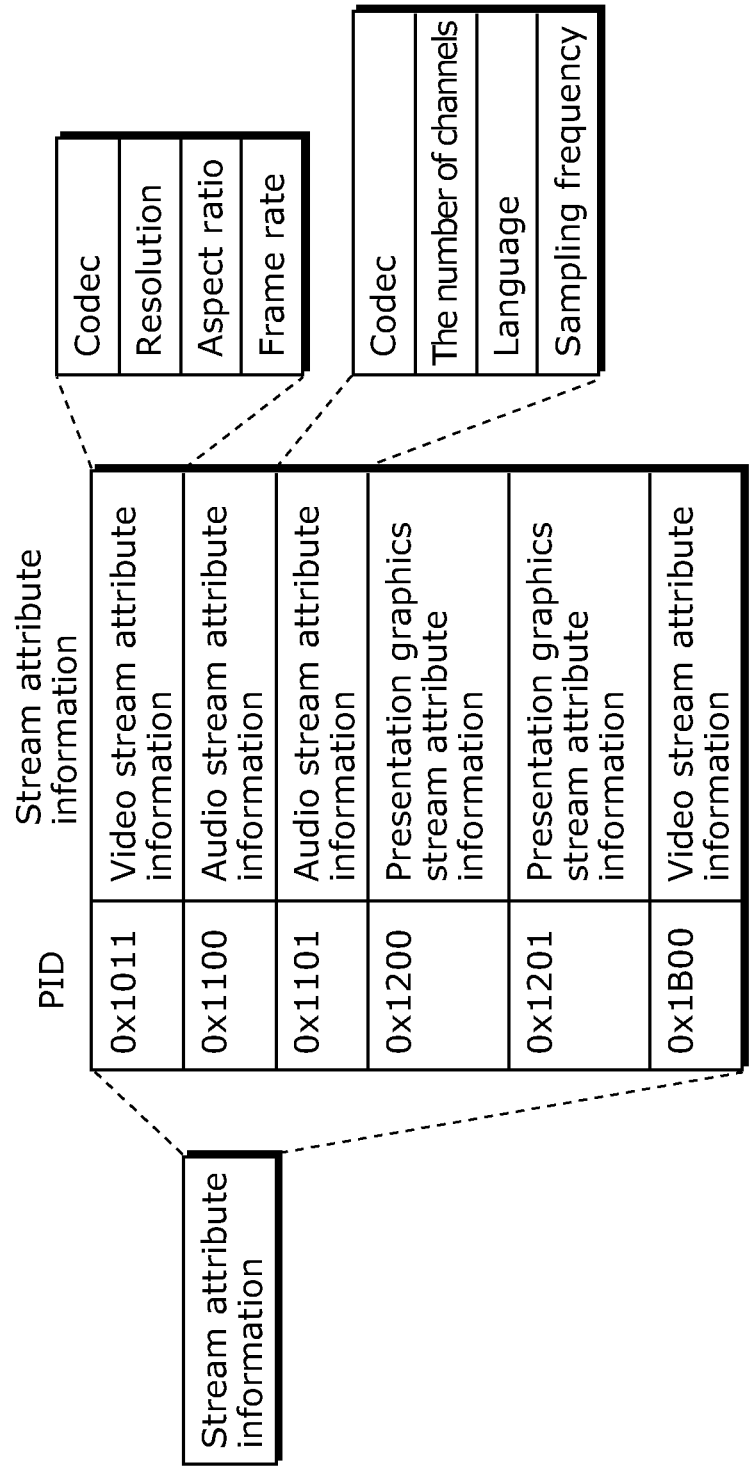
FIG. 37 shows an internal structure of stream attribute information.

As shown in FIG. 37, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 38:
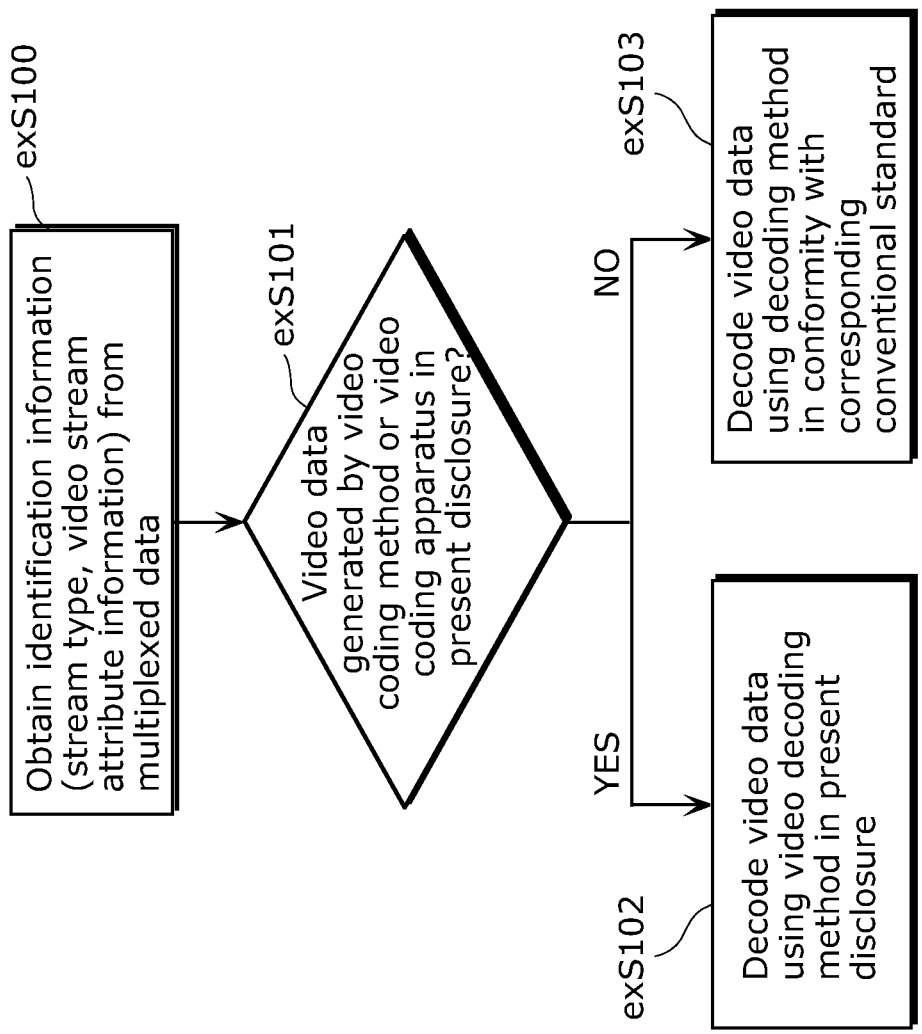
FIG. 38 shows steps for identifying video data.

Furthermore, FIG. 38 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 39:
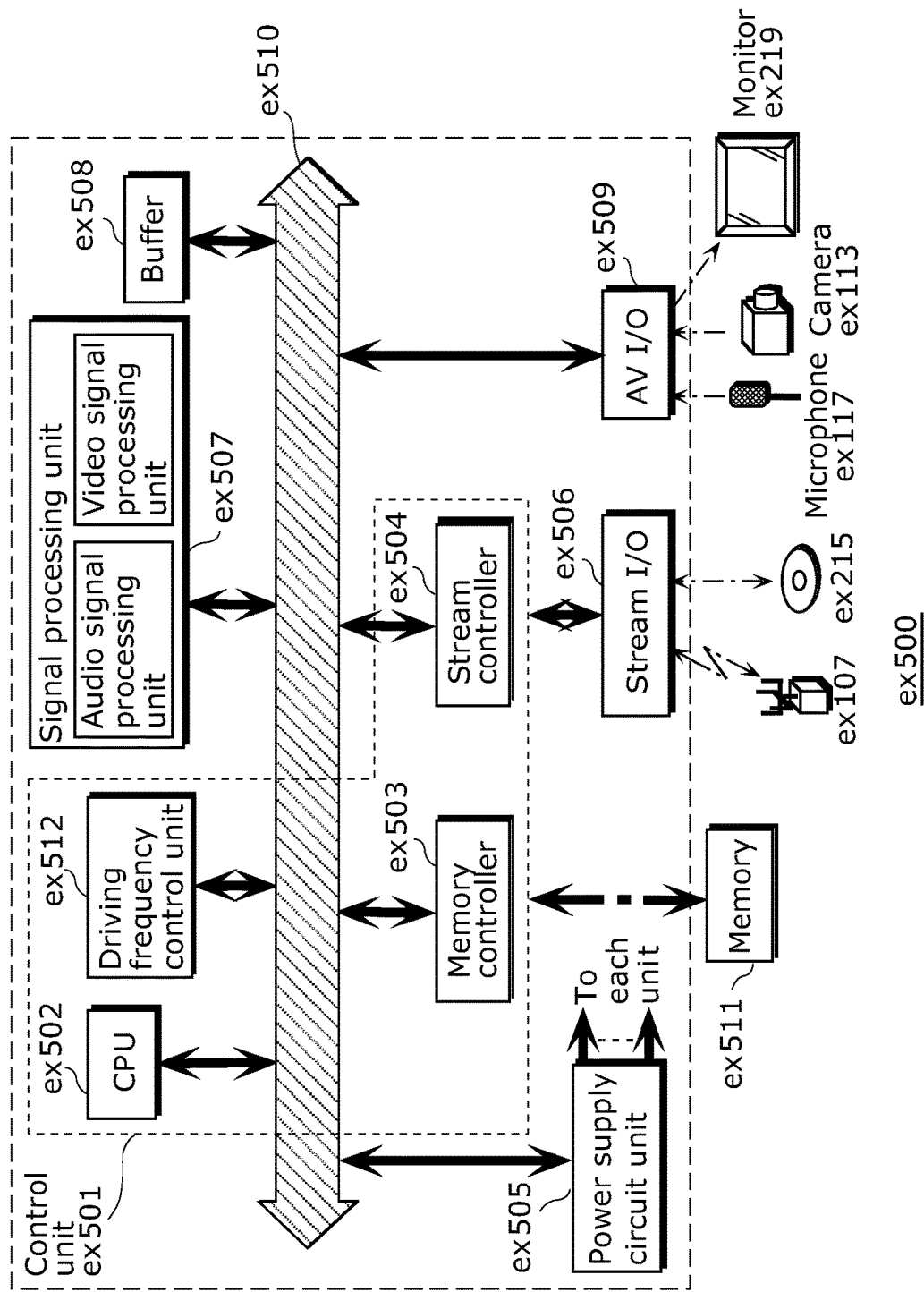
FIG. 39 is a block diagram showing an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 39 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 40:
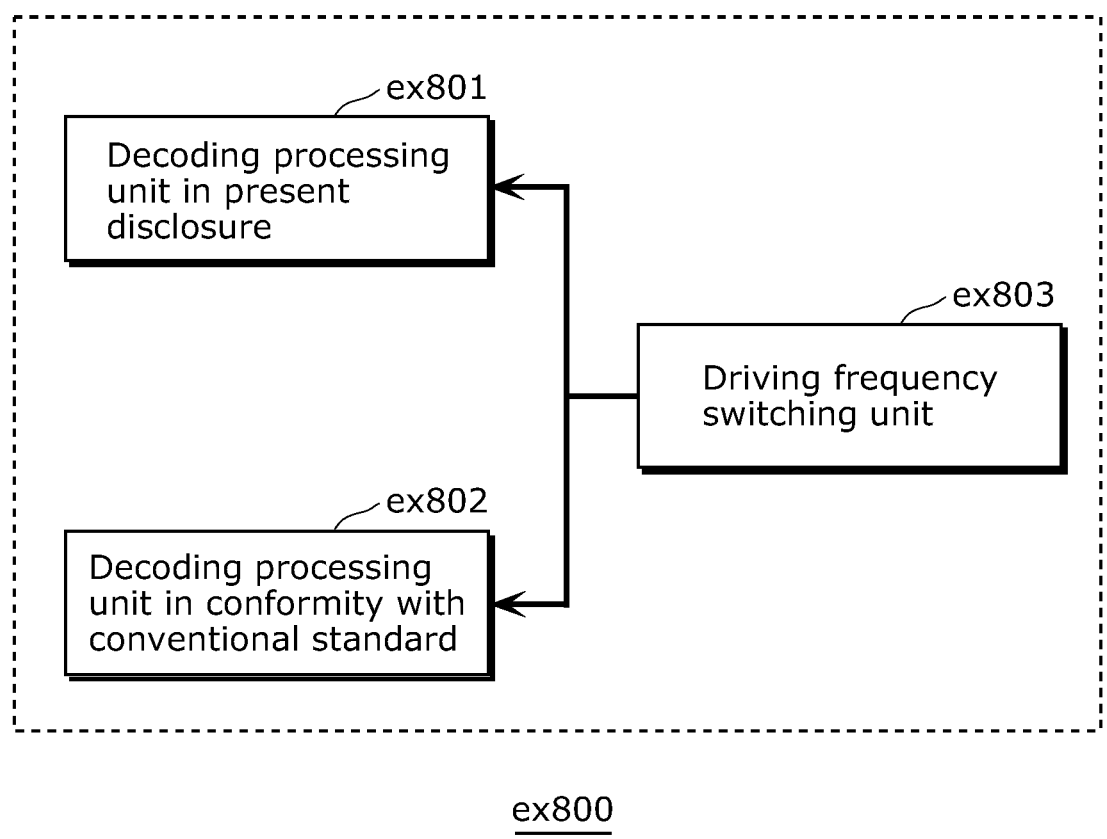
FIG. 40 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 40 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 39. Here, each of the decoding processing unit ex801 that executes the moving picture decoding method described in each of embodiments and the decoding processing unit ex802 that conforms to the conventional standard corresponds to the signal processing unit ex507 in FIG. 39. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 42. The driving frequency can be selected by storing the look-up table in the buffer ex508 and in an internal memory of an LSI, and with reference to the look-up table by the CPU ex502.

Figure 41:
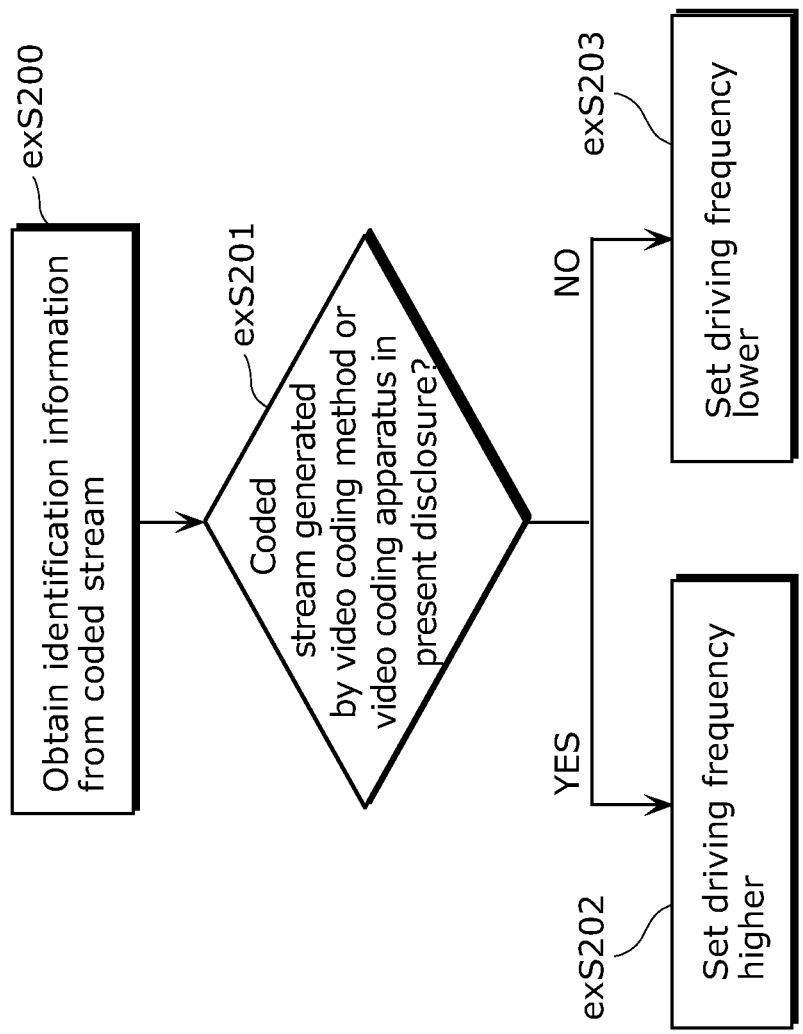
FIG. 41 shows steps for identifying video data and switching between driving frequencies.

FIG. 41 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 43A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 43B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image decoding method and image coding method according to an aspect of the present disclosure is advantageously applicable to a moving picture coding method and a moving picture decoding method.

The invention claimed is:

1. An image decoding method for decoding a current block included in a picture, the image decoding method comprising:
deriving a plurality of candidates of a first type from adjacent blocks adjacent to the current block, wherein each of the plurality of the candidates of the first type has a first motion vector and a first reference picture index;
adding, into a candidate list, the plurality of candidates of the first type;
deriving two or more candidates of a third type when a total number of the plurality of candidates of the first type is less than a maximum candidate number, wherein each of the two or more candidates of the third type corresponds to one of referable reference pictures, each of the two or more candidates of the third type has a second motion vector and a second reference picture index, and the second reference picture index is different for each of the two or more candidates of the third type;
adding, into the candidate list, two or more candidates of the third type;
deriving a candidate of a second type when a total number of the plurality of candidates of the first type and the third type is less than the maximum candidate number, wherein the candidate of the second type has a fixed motion vector and a fixed reference picture index, the fixed motion vector having a value of zero, and the fixed reference picture index having a value of zero;
adding, into the candidate list, the candidate of the second type until a total number of the plurality of candidates of the first type, third type, and the second type reaches the maximum candidate number;
selecting a candidate from the candidate list;
predicting the current block using a motion vector corresponding to the selected candidate; and
generating and outputting an image using the predicted current block,
wherein the picture includes slices, and the maximum candidate number is fixed for each of the slices in the picture,
the two or more candidates of the third type are derived when the total number of the plurality of candidates of the first type is less than the maximum candidate number and added to the candidate list to increase coding efficiency, and
the candidate of the second type is derived when a total number of the plurality of candidates of the first type and the third type is less than the maximum candidate number and added to the candidate list until a total number of the plurality of candidates of the first type, third type, and the second type reaches the maximum candidate number to enhance error resistance.

2. An apparatus which decodes a current block included in a picture, the apparatus comprising:
a processor; and
a non-transitory memory,
wherein the processor performs, using the non-transitory memory, processes including:
deriving a plurality of candidates of a first type from adjacent blocks adjacent to the current block, wherein each of the plurality of the candidates of the first type has a first motion vector and a first reference picture index;
adding, into a candidate list, the plurality of candidates of the first type, wherein each of the plurality of candidates of the first type has a motion vector and a reference picture index, and each of the plurality of candidates of the first type is derived from an adjacent block to the current block;
deriving two or more candidates of a third type when a total number of the plurality of candidates of the first type is less than a maximum candidate number, wherein each of the two or more candidates of the third type corresponds to one of referable reference pictures, each of the two or more candidates of the third type has a second motion vector and a second reference picture index, and the second reference picture index is different for each of the two or more candidates of the third type;
adding, into the candidate list, the two or more candidates of the third type;
deriving a candidate of a second type when a total number of the plurality of candidates of the first type and the third type is less than the maximum candidate number, wherein the candidate of the second type has a fixed motion vector and a fixed reference picture index, the fixed motion vector having a value of zero, and the fixed reference picture index having a value of zero;
adding, into the candidate list, the candidate of the second type until a total number of the plurality of candidates of the first type, third type, and the second type reaches the maximum candidate number;
selecting a candidate from the candidate list;

predicting the current block using a motion vector corresponding to the selected candidate; and generating and outputting an image using the predicted current block, wherein the picture includes slices, and the maximum candidate number is fixed for each of the slices in the picture, the two or more candidates of the third type are derived when the total number of the plurality of candidates of the first type is less than the maximum candidate number and added to the candidate list to increase coding efficiency, and the candidate of the second type is derived when a total number of the plurality of candidates of the first type and the third type is less than the maximum candidate number and added to the candidate list until a total number of the plurality of candidates of the first type, third type, and the second type reaches the maximum candidate number to enhance error resistance.

* * * * *